United States Patent
Waikar et al.

(10) Patent No.: US 11,750,124 B2
(45) Date of Patent: Sep. 5, 2023

(54) LOW-SPEED SENSORLESS BRUSHLESS MOTOR CONTROL IN A POWER TOOL

(71) Applicant: Black & Decker Inc., New Britain, CT (US)

(72) Inventors: Shailesh P. Waikar, Perry Hall, MD (US); Zhi Qu, Bellevue, WA (US); Wing Lin, Bel Air, MD (US); John C. Vanko, Timonium, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/846,485

(22) Filed: Jun. 22, 2022

(65) Prior Publication Data

US 2022/0329180 A1 Oct. 13, 2022

Related U.S. Application Data

(63) Continuation of application No. 16/853,123, filed on Apr. 20, 2020, now Pat. No. 11,374,514.

(Continued)

(51) Int. Cl.

| H02P 6/182 | (2016.01) |
|---|---|
| H02P 6/17 | (2016.01) |
| B25D 11/06 | (2006.01) |
| B25F 5/02 | (2006.01) |
| H02P 6/06 | (2006.01) |

(Continued)

(52) U.S. Cl.
CPC ............ *H02P 6/182* (2013.01); *B25D 11/064* (2013.01); *B25F 5/02* (2013.01); *H02P 6/06* (2013.01); *H02P 6/17* (2016.02); *H02P 6/186* (2013.01); *H02P 6/28* (2016.02); *H02P 2203/03* (2013.01); *H02P 2203/09* (2013.01); *H02P 2209/07* (2013.01)

(58) Field of Classification Search
CPC ...... H02P 2209/07; H02P 6/157; H02P 6/182; H02P 27/04; H02P 6/186; H02P 6/28; H02P 2203/03

See application file for complete search history.

(56) References Cited

U.S. PATENT DOCUMENTS

| 10,594,237 B2 * | 3/2020 | Buckley | H02P 6/17 |
| 2010/0237809 A1 * | 9/2010 | Ogahara | H02P 6/157 |
| | | | 318/400.34 |
| 2016/0056740 A1 * | 2/2016 | Nondahl | H02P 6/182 |
| | | | 318/400.11 |

FOREIGN PATENT DOCUMENTS

| EP | 1764904 A2 * | 3/2007 | ............ H02P 21/34 |
| JP | 2004147430 A * | 5/2004 | |
| WO | WO-2018214979 A1 * | 11/2018 | ............ H02P 23/03 |

* cited by examiner

*Primary Examiner* — Bickey Dhakal

(57) ABSTRACT

A control unit for a brushless DC motor of a power tool having a rotor and a stator is provided. The control unit detects an initial position of the rotor, commutates the motor beginning at the initial position of the rotor using a low-speed motor commutation scheme until an output speed of the rotor exceeds a speed threshold, and commutates the motor based on a back-electromotive force (back-EMF) voltage of the motor after the output speed of the rotor exceeds the speed threshold. In the low-speed commutation scheme, the control unit applies a first set of voltage pulses to a present sector and a second set of voltage pulses to a next sector, and detects a transition of the rotor from the present sector to the next sector based on motor current measurements associated with the first set of voltage pulses and the second set of voltage pulses.

14 Claims, 37 Drawing Sheets

Related U.S. Application Data

(60) Provisional application No. 62/955,586, filed on Dec. 31, 2019, provisional application No. 62/838,560, filed on Apr. 25, 2019.

(51) Int. Cl.
*H02P 6/18* (2016.01)
*H02P 6/28* (2016.01)

| Voltage Pulse | (S1a,S2a,S3a) | (S1b,S2b,S3b) | Sector | Angle (Deg) | Vdc (V) | Pulse Duration (us) |
|---|---|---|---|---|---|---|
| V1 | (1,0,0) | (0,1,1) | 1 | 0 | 169 | 50 |
| V2 | (1,1,0) | (0,0,1) | 2 | 60 | 169 | 50 |
| V3 | (0,1,0) | (1,0,1) | 3 | 120 | 169 | 50 |
| V4 | (0,1,1) | (1,0,0) | 4 | 180 | 169 | 50 |
| V5 | (0,0,1) | (1,1,0) | 5 | 240 | 169 | 50 |
| V6 | (1,0,1) | (0,1,0) | 6 | 300 | 169 | 50 |
FIG. 10
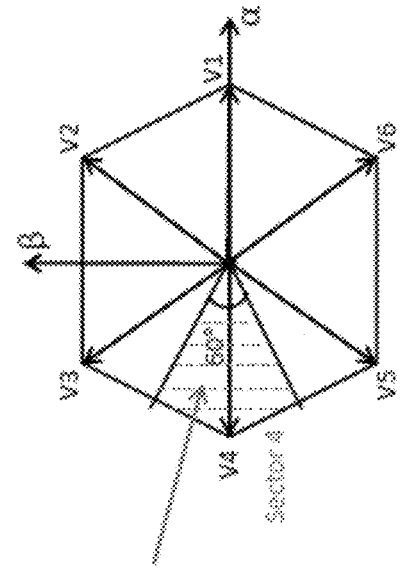
FIG. 12
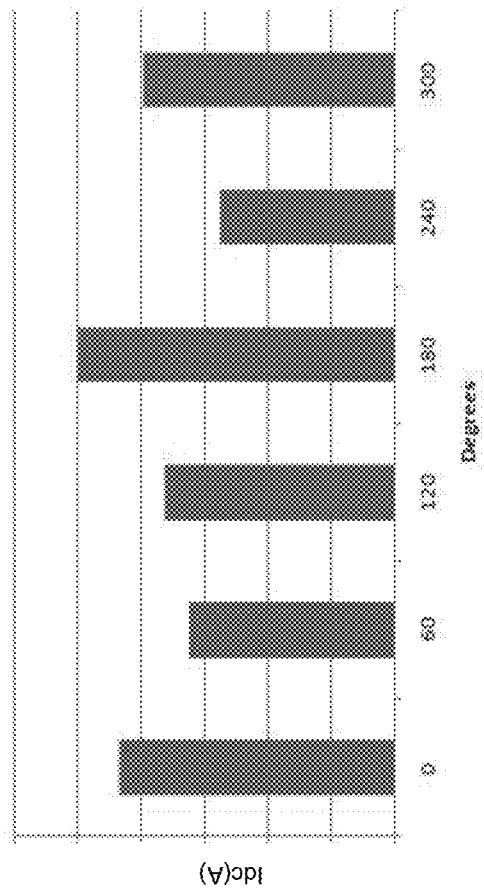
FIG. 11

| Rotor Position (Elec. Degree) | Sector | High Side | Low Side | Present sequence | Previous sequence | Next sequence |
|---|---|---|---|---|---|---|
| 0~60 | 1 | U | V | UH, VL | WH, VL | UH, WL |
| 60~120 | 2 | U | W | UH, WL | UH, VL | VH, WL |
| 120~180 | 3 | V | W | VH, WL | UH, WL | VH, UL |
| 180~240 | 4 | V | U | VH, UL | VH, WL | WH, UL |
| 240~300 | 5 | W | U | WH, UL | VH, UL | WH, VL |
| 300~360 | 6 | W | V | WH, VL | WH, UL | UH, VL |

FIG. 13

LOW-SPEED SENSORLESS BRUSHLESS MOTOR CONTROL IN A POWER TOOL

RELATED APPLICATION

This application is a continuation of U.S. application Ser. No. 16/853,123 filed Apr. 20, 2020, which claims the benefit of U.S. Provisional Application No. 62/838,560 filed Apr. 25, 2019, and U.S. Provisional Application No. 62/955,586 filed Dec. 31, 2019, contents of both of which are incorporated herein by reference in their entireties.

FIELD

This disclosure relates to sensorless motor controls, and in particular to sensorless control of brushless motors in power tools.

BACKGROUND

Power tools may be of different types depending on the type of output provided by the power tool. For example, a power tool may be a drill, hammer, grinder, impact wrench, circular saw, reciprocating saw, and so on. Some power tools may be powered by an alternating current (AC) power source while others may be portable and may be powered by a direct current (DC) power source such as a battery pack. Power tools may use AC or DC motors.

Some power tools have a movable switch such as a trigger or a speed dial that can be used to vary the speed of the motor or the power output by the tool. The switch can be moved from a resting position where the power output of the tool is minimum (e.g., zero), and a fully activated (e.g., pulled) position where the power output of the tool is maximum. Thus, the tool can output the maximum power only when the trigger is fully activated. Also, after the trigger is fully activated, the tool's power output cannot be increased beyond its maximum power. The present disclosure addresses these and other issues related to power tools as described below in the detail.

Use of Brushless Direct-Current (BLDC) motors in power tools has become common in recent years. A typical BLDC motor includes a stator including a series of windings that form three or more phases, and a rotor including a series of magnets that magnetically interact with the stator windings. As the phases of the windings are sequentially energized, they cause rotation of the rotor. BLDC motors generate more power and are more efficient that similarly-sized conventional brushes DC motors and universal motors. BLDC motors are electronically commutated, requiring a controller to commutate proper phases of the motor based on the angular position of the rotor. Conventionally, the motor is provided with a series of Hall sensors that detect a magnetic field of the rotor and provide signals to the controller indicative of the rotor position.

Known techniques for sensorless control of BLDC motors are available in applications such as outdoor products where the motor operates at predictable speed ranges. One such technique involves monitoring the motor induced voltage generated by the back-electromotive force (back-EMF) of the motor in the motor windings to detect a rotational position of the motor. Specifically, as the rotor rotates it induces current through a non-active phase of the motor, which can be detected by the controller to estimate a rotary location of the rotor. Such techniques are suitable for motor applications designed to operate at high speed. For many power tool applications such as drills, impact drivers, etc. that operate over various speed and torque ranges, however, use of such techniques alone may not be suitable. This is particularly true for power tools operating at very low speed, where the user may turn the tool in a direction opposite the intended motor rotation, causing the rotor to rotate in an unexpected direction. What is thus needed is a sensorless control technique suitable for use with power tools that operate at low speed/high torque ranges.

Additionally, various techniques are known for increasing and optimizing power output of a BLDC motor. One such technique involves increasing a conduction band of the phase voltages applied to the motor. Typically, in trapezoidal motor control for a three-phase BLDC motor, the conduction band is set to 120 electrical degrees and only two phases conduct at a given time. It has been found, however, that increasing the conduction band to more than 120 electrical degrees, thus allowing some overlap between the phases of the motor, increasing the motor power output. A similar technique involves increasing an advance angle by which each phase current of the motor is shifted relative to the rotor position. A variable conduction band and/or advance angle control can be implemented relative to the rotor position with relative ease when using Hall sensors. What is needed is a technique for implementation of variable conduction band and/or advance angle control in a sensorless control scheme.

Moreover, in BLDC control system, the motor control is prone to defects and errors due to electromechanical faults or software bugs. US Patent Publication No. 2017/0373614 discloses a secondary controller for redundancy control responsible for shutting off power to the motor in the event of motor overspeed or incorrect rotor rotation. The secondary controller in this system receives the Hall signals to calculate motor speed and direction of rotation. What is needed is a secondary controller capable of protecting the motor against overspeed or incorrect rotor rotation in a sensorless control scheme.

SUMMARY

According to an embodiment of the invention, a power tool is provided including a brushless motor having a stator defining a plurality of phases, a rotor rotatable relative to the stator, and power terminals electrically connected to the phases of the motor. A power unit is provided including power switches connected electrically between a power source and the motor terminals and operable to deliver power to the motor, and a control unit is interfaced with the power unit to output a drive signal to one or more of the plurality of motor switches to drive the plurality of phases of the motor over a plurality of sectors of the rotor rotation. In an embodiment, the control unit is configured to detect an initial position of the rotor, commutate the motor beginning at the initial position of the rotor using a low-speed motor commutation scheme until an output speed of the rotor exceeds a speed threshold, and commutate the motor based on a back-electromotive force (back-EMF) voltage of the motor after the output speed of the rotor exceeds the speed threshold. In the low-speed commutation scheme, the control unit applies a first set of voltage pulses to a present sector and a second set of voltage pulses to a next sector, and detects a transition of the rotor from the present sector to the next sector based on motor current measurements associated with the first set of voltage pulses and the second set of voltage pulses.

BRIEF DESCRIPTION OF THE DRAWINGS

The drawings described herein are for illustration purposes only and are not intended to limit the scope of this disclosure in any way.

FIG. 10 depicts a table of sequence of voltage pulses injected during Initial Position Detection (IPD), according to an embodiment;

FIG. 11 depicts an exemplary diagram showing the measured current corresponding to each voltage pulse, according to an embodiment;

FIG. 12 depicts an exemplary sector diagram of the motor showing the identified sector corresponding to the initial position based on the measured current pulses, according to an embodiment;

FIG. 13 depicts an exemplary table representing commutation sequence data used by the controller for controlling the motor commutation, according to an embodiment;

DETAILED DESCRIPTION

Figure 1:
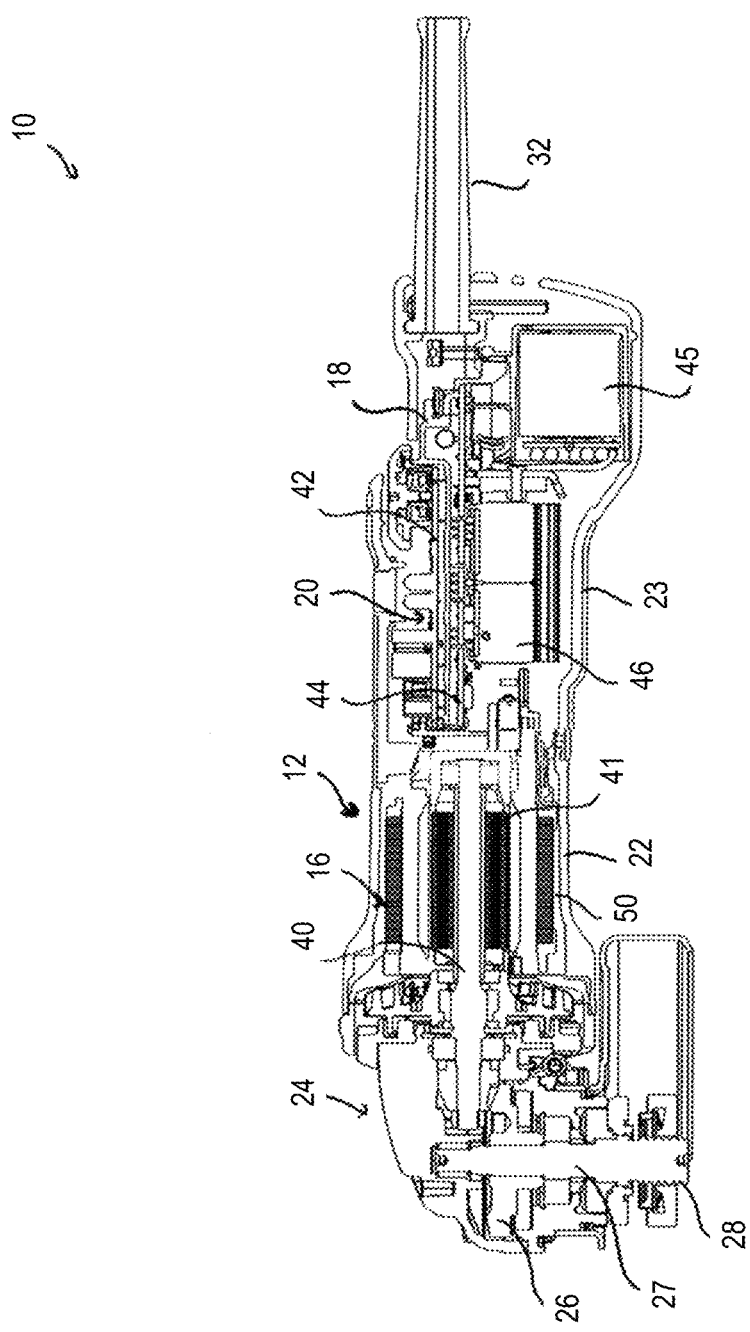
FIG. 1 depicts a side cross-sectional view of a power tool, according to an embodiment of the invention.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Power Tool Employing Sensorless Control Scheme Using Motor Back-EMF

Referring to FIG. 1, a side cross-sectional view of a power tool 10 is provided. In an embodiment, power tool 10 includes a housing 12, a motor 16 housed therein, a module casing 18, and a planar circuit board 20. The housing 12 includes a motor case 22 that supports the motor 16 and a handle portion 23.

A gear case 24 is secured to an end of the motor case 22 opposite the handle portion 23. The gear case 24 includes at least one gearset 26, an output shaft 27, and a threaded opening 28 to which an accessory tool is secured, either directly or via a nut (not shown). The gearset 26 is positioned within the gear case 24 and is drivably coupled to the motor 16. The output shaft 27 is drivably connected to the gearset 26 within the gear case 24 and extends perpendicular to the longitudinal axis of the housing 12. A trigger or sliding switch (not shown) is positioned on a side of the motor case 22 and allows for the user to turn the power tool 10 ON and OFF.

The handle portion 23 extends axially from the motor case 22 toward a second end of the housing 12 and includes two clamp shells or housing covers that mate with the module casing 18 around the planar circuit board 20. An alternative-current (AC) power cord 32 is attached to the handle portion 23 at the second end of the housing 12 to supply AC electric power to the power tool 10, though it should be understood that power tool 10 may include a battery receptacle at the end of the handle portion 23 for removeably receiving a battery pack to supply direct-current (DC) power to the power tool 10.

Planar circuit board includes a control circuit board 42 and a power circuit board 44 arranged along the axis of the power tool 10 substantially in parallel. Control circuit board 42 accommodates a controller (not shown) and associated circuitry for controlling the speed and other operation of the motor 16. Power circuit board 44 accommodates a series of power switches (not shown), which may be configured as, for example, a multi-phase inverter switch circuit, that are controlled by the controller and regulate the supply of power from the power cord 32 to the motor 16. Power circuit board 44 further includes one or more capacitors 46 as well as a rectifier (not shown) that generate a DC voltage on a DC bus line supplied to the power switches.

Additionally, an auxiliary capacitor 45 may be housed at the end of the handle portion 23 that can be switchably connected to the DC bus line when the AC voltage includes large voltage ripples, as described in detail in U.S. Pat. No. 10,050,572 filed Jun. 15, 2017, which is incorporated herein by reference in its entirety.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw bit, thereby allowing the power tool 10 to be used as a power drill or a power screwdriver. For more detail of an exemplary power tool described above, reference is made to U.S. Pat. No. 10,226,849 filed Sep. 12, 2016, which is incorporated herein by reference in its entirety.

In an embodiment, motor 16 is a brushless direct-current (BLDC) motor including a rotor including rotor shaft 40 on which a rotor lamination stack 41 accommodating a series of permanent magnets (not shown) is mounted. The motor 16 further includes a stator including a stator lamination stack 50 on which a series of stator windings 52 are wound. The rotor lamination stack 41 is received within the stator lamination stack 50 and magnetically interacts with the stator windings 52 to cause rotation of the rotor shaft 40 around a longitudinal axis of the tool 10. In an embodiment, as described in detail in this disclosure, motor 16 is a sensorless BLDC motor, meaning it includes no sense magnet or positional sensor to help the controller control the commutation of the motor 16.

Figure 2:
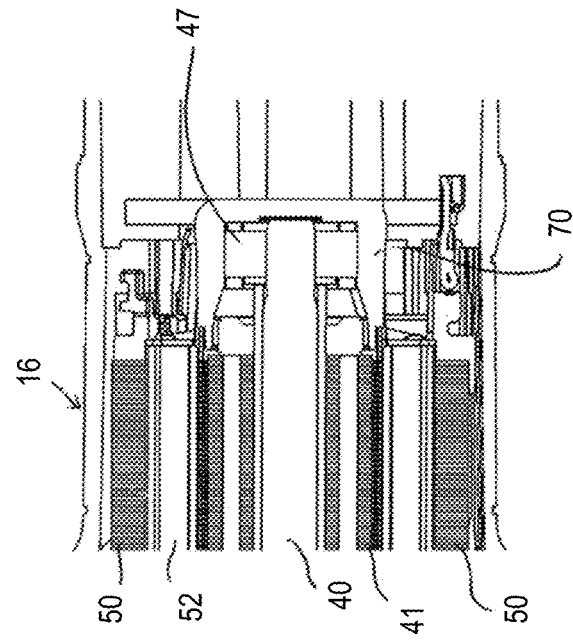
FIG. 2 depicts a partial cross-sectional view of a conventional motor with positional sensors, according to an embodiment.

Referring to FIG. 2, a partial cross-sectional view of a conventional motor with positional sensors is depicted. As shown here, motor 16 is provided with a radial wall or end cap 56 with an opening 58 that receives the rotor shaft 40 therethrough. The end cap 56 forms a bearing pocket 54 around the rotor shaft 40 opposite the rotor lamination stack 41. Bearing pocket 54 securely receives and support a rotor bearing 47 therein to structurally support the rotor with respect to the stator. Additionally, bearing pocket 54 houses a sense magnet ring 43 that is also mounted on the rotor shaft 40. A radial slot 66 formed in the bearing pocket 54 allows for insertion of a positional sensor board 64 in close proximity to the sense magnet ring 43. Positional sensor board 64 supports a series of Hall sensors 60, which sense the position of the sense magnet ring 43 and provide the angular position of the rotor to the controller.

Figure 3:
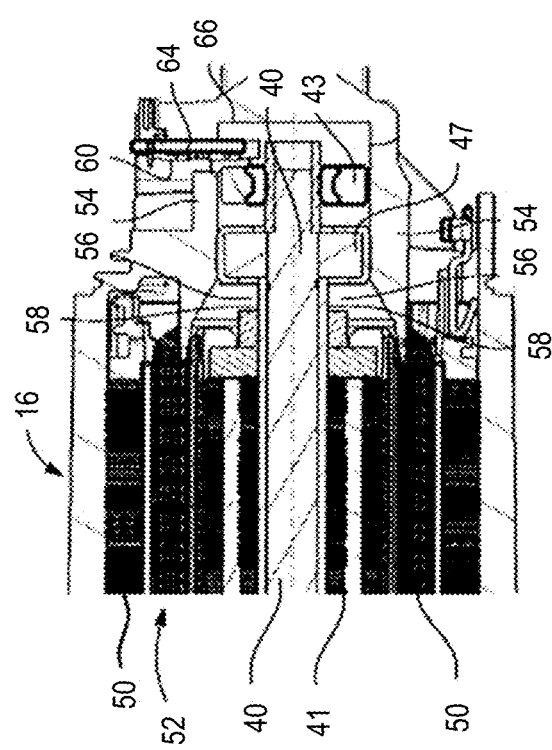
FIG. 3 depicts a partial cross-sectional view of a sensorless BLDC motor, according to an embodiment.

FIG. 3 depicts a partial cross-sectional view of a sensorless BLDC motor according to embodiments of this disclosure. In an embodiment, motor 16 is similar to the motor of FIG. 2 but does not include a sense magnet and a positional sensor board. Bearing pocket 70 in this embodiment includes a recess facing the motor 16 that is large enough to receive and support the rotor bearing 47. The bearing pocket 70 need not have the length to receive a sense magnet and a positional sensor board and is therefore at most 50% smaller in width than bearing pocket 54 of FIG. 2. This decrease contributes to an overall reduction of 5-20 millimeters from the length of the motor. It also reduces manufacturing costs and eases the assembly process.

Figure 4:
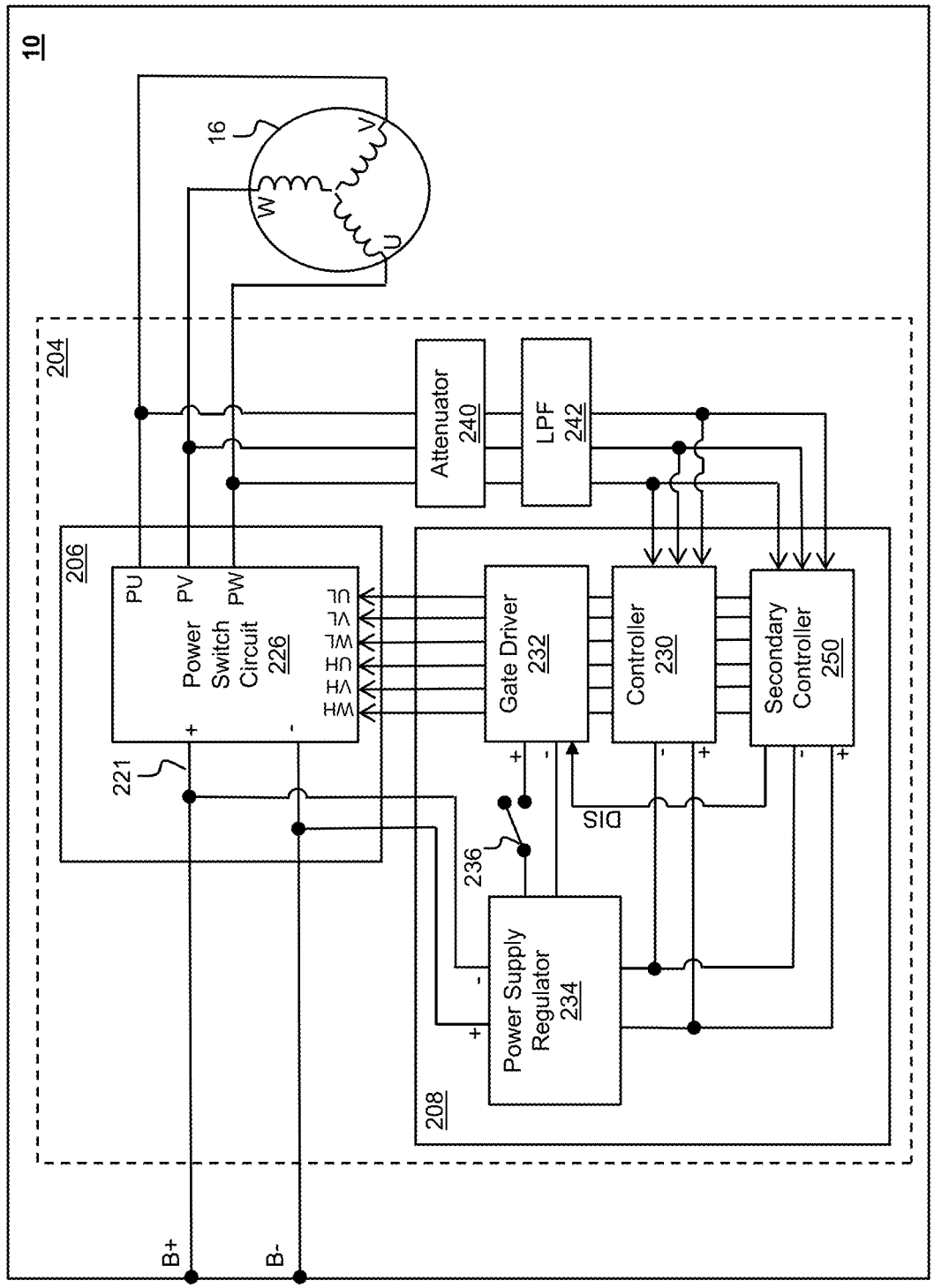
FIG. 4 depicts a circuit block diagram of a battery-powered power tool including a motor and a motor control circuit, according to an embodiment.

Referring to FIG. 4, a circuit block diagram of battery-powered power tool 10 including a motor 16 and a motor control circuit 204 is depicted, according to an embodiment. In an embodiment, motor control circuit 204 includes a power unit 206 and a control unit 208. Components of power unit 206 and control unit 208 may be respectively mounted on power circuit board 44 and control circuit board 42 of FIG. 1. In FIG. 4, power tool 10 received DC power from a DC power source such as a battery pack, such as a removeable battery pack, via B+ and B− terminals, on a DC bus line 221.

In an embodiment, power unit 206 may include a power switch circuit 226 coupled to between the DC bus line 221 and motor windings to drive BLDC motor 16. In an embodiment, power switch circuit 226 may be a three-phase bridge driver circuit including six controllable semiconductor power devices, e.g. Field-Effect Transistors (FETs), Bipolar Junction Transistors (BJTs), Insulated-Gate Bipolar Transistors (IGBTs), etc.

In an embodiment, control unit 208 may include a controller 230, a gate driver 232, a power supply regulator 234, and a power switch 236. In an embodiment, controller 230 is a programmable device arranged to control a switching operation of the power devices in power switching circuit 226. In an embodiment, controller 230 calculates the rotational position of the rotor using a variety of method, including by measuring the inductive voltage of the motor 16, also referred to as the motor back-EMF (Electro-Motive Force) voltage, as discussed later in detail. Controller 230 may also receive a variable-speed signal from variable-speed actuator or a speed-dial. Based on the calculated rotor position and the variable-speed signal, controller 230 controls commutation sequence of the motor 16. This is done by outputting drive signals UH, VH, WH, UL, VL, and WL through the gate driver 232, which provides a voltage level needed to drive the gates of the semiconductor switches within the power switch circuit 226. By control a PWM switching operation of the power switch circuit 226 via the drive signals, the controller 230 controls the direction and speed by which the motor windings are sequentially energized, thus electronically controlling the motor 16 commutation.

In an embodiment, power supply regulator 234 may include one or more voltage regulators to step down the power supply to a voltage level compatible for operating the controller 230 and/or the gate driver 232. In an embodiment, power supply regulator 234 may include a buck converter and/or a linear regulator to reduce the power voltage of the power supply to, for example, 15V for powering the gate driver 232, and down to, for example, 3.2V for powering the controller 230.

In an embodiment, power switch 236 may be provided between the power supply regulator 234 and the gate driver 232. Power switch 236 may be a current-carrying ON/OFF switch coupled to the ON/OFF trigger or the variable-speed actuator to allow the user to begin operating the motor 16, as discussed above. Power switch 236 in this embodiment disables supply of power to the motor 16 by cutting power to the gate drivers 232. It is noted, however, that power switch 236 may be provided at a different location, for example, within the power unit 206 between the rectifier circuit 220 and the power switch circuit 226. It is further noted that in an embodiment, power tool 128 may be provided without an ON/OFF switch 236, and the controller 230 may be configured to activate the power devices in power switch circuit 226 when the ON/OFF trigger (or variable-speed actuator) is actuated by the user.

Figure 5:
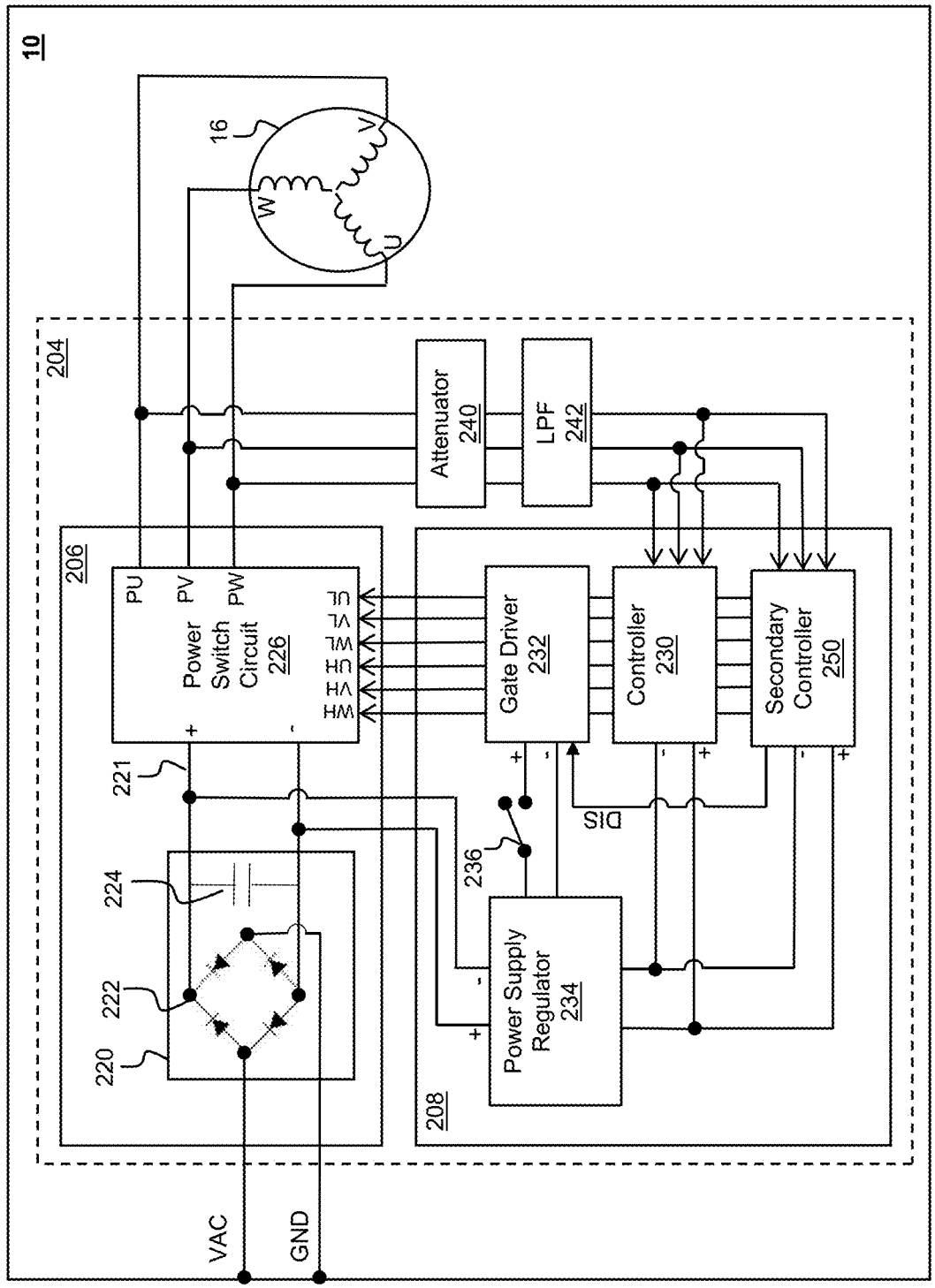
FIG. 5 depicts a circuit block diagram of a corded power tool, according to an embodiment.

FIG. 5 depicts a block circuit diagram of a corded power tool 10 that received powers from an AC power supply such as, for example, an AC power generator or the power grid. As the name implies, BLDC motors are designed to work with DC power. Thus, in an embodiment, power unit 206 is provided with a rectifier circuit 220 on between the power supply and the power switch circuit 226. In an embodiment, power from the AC power lines as designated by VAC and GND is passed through the rectifier circuit 220 to convert or remove the negative half-cycles of the AC power, thus providing a DC voltage on the DC bus line 221. In an embodiment, rectifier circuit 220 may include a full-wave bridge diode rectifier 222 to convert the negative half-cycles of the AC power to positive half-cycles. Alternatively, in an embodiment, rectifier circuit 220 may include a half-wave rectifier to eliminate the half-cycles of the AC power. In an embodiment, rectifier circuit 220 may further include a bus capacitor 224 provided on the DC bus line 221. In another embodiment, active rectification may be employed, e.g., for active power factor correction. In an embodiment, bus capacitor 224 may have a relatively small value to reduce voltage high-frequency transients on the AC power supply, without significantly smoothening the AC voltage waveform.

Figure 6:
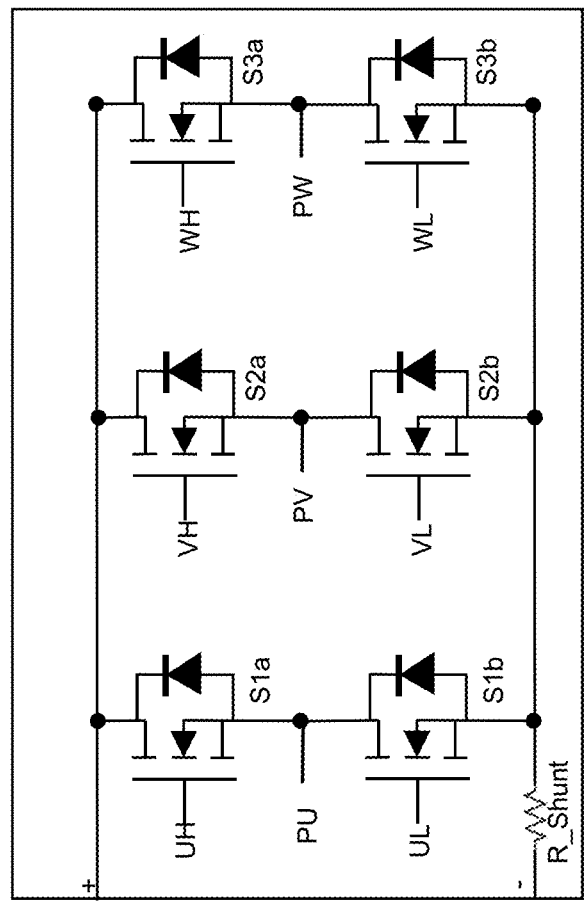
FIG. 6 depicts an exemplary power switch circuit configured as a three-phase inverter bridge circuit, according to an embodiment.

FIG. 6 depicts an exemplary power switch circuit 226 configured as a three-phase inverter bridge circuit, according to an embodiment. This circuit corresponds to a three-phase motor including, for example, 3 sets of windings pairs, with each pair wound on two opposite stator teeth. It should be understood that the inverter bridge circuit may include more phases corresponding to a higher number of phases of the motor. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL. In an embodiment, the drains of the high-side FETs are coupled to the sources of the low-side FETs to output power signals PU, PV, and PW for driving the BLDC motor 16.

In an embodiment, a resistor R_Shunt is disposed in series with the negative terminal of the power supply. Resistor R_Shunt is used by the controller 230 to measure the instantaneous current through the motor 16, for the purposes described later in this disclosure.

Figure 7:
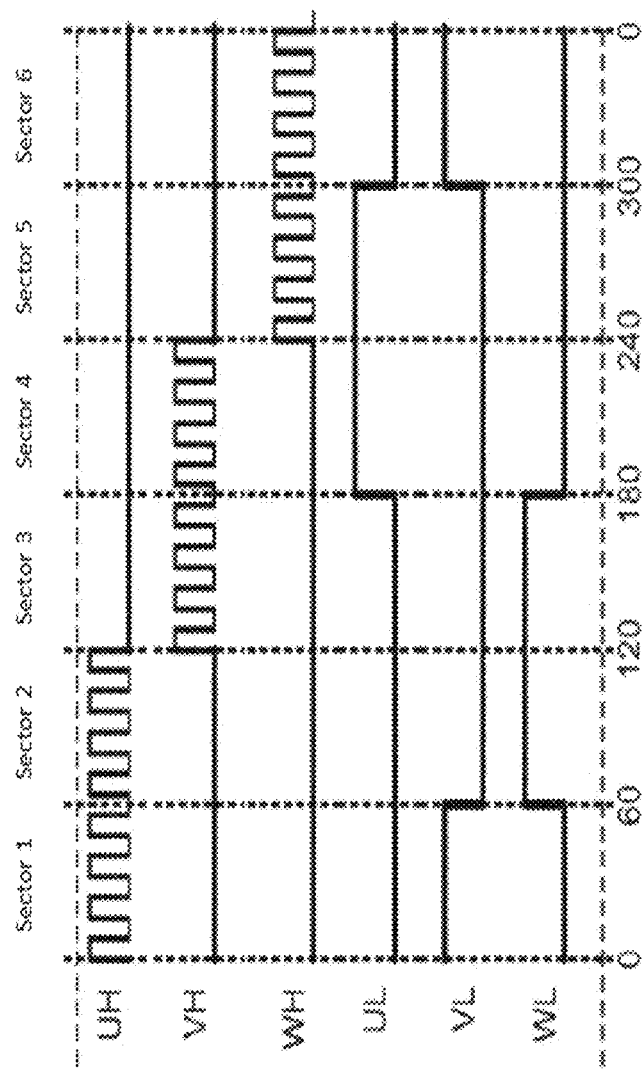
FIG. 7 depicts an exemplary waveform diagram of a pulse-width modulation (PWM) drive sequence of the three-phase inventor bridge circuit within a full 360-degree conduction cycle, according to an embodiment.
Figure 8:
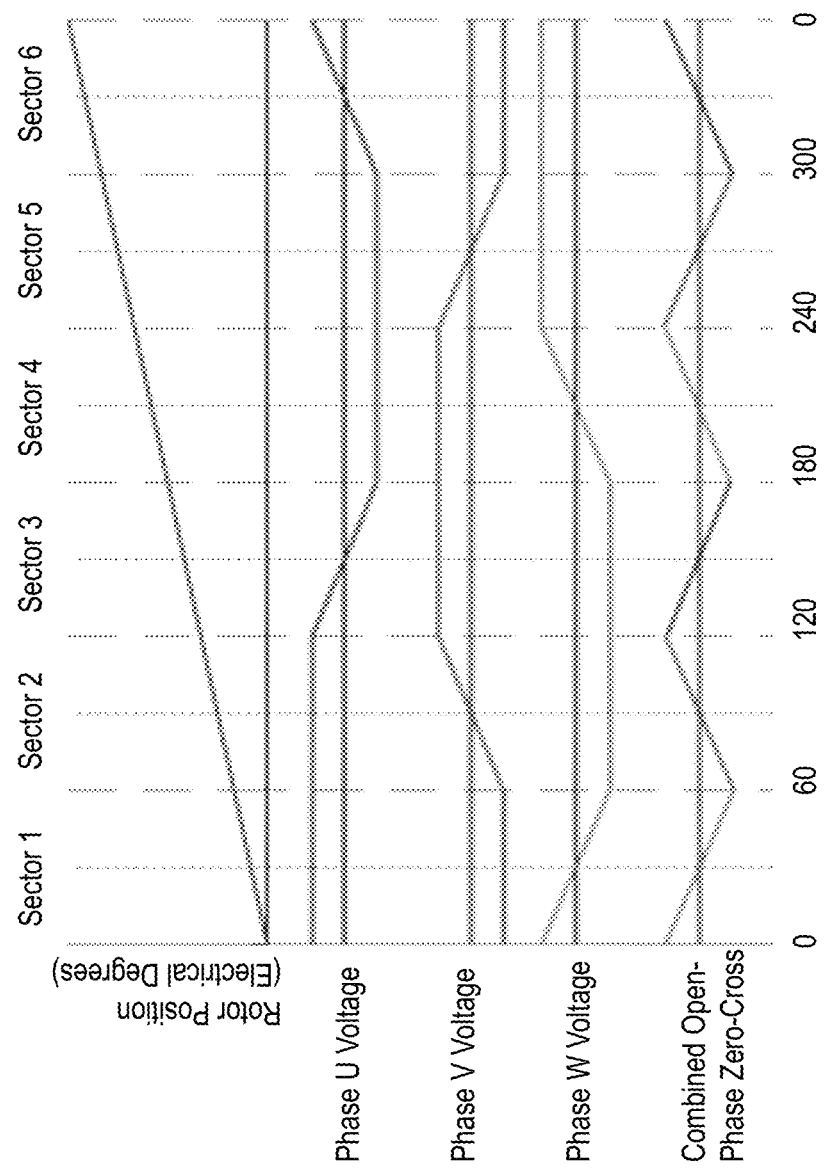
FIG. 8 depicts an exemplary waveform diagram of the detected motor phase voltages during a full 360-degree rotation of the motor, according to an embodiment.

FIG. 7 depicts an exemplary waveform diagram of a pulse-width modulation (PWM) drive sequence of the three-phase inventor bridge circuit of FIG. 8 within a full 360-degree conduction cycle. In an embodiment, controller 230 controls power switch circuit 226 to supply trapezoidal voltage waveforms to each phase of the motor 16. In an embodiment where motor 16 is a three-phase motor, each trapezoidal waveform includes a conduction band (or conduction angle) of 120 degrees during normal operation, for a total of 360 degrees of rotor rotation. Specifically, as shown in this figure, within a full 360° cycle, each of the drive signals associated with the high-side and low-side power switches is activated during a 120° conduction band ("CB"). In this manner, each associated phase of the motor is energized by activating a high-side switch and a low-side switch, which create a current path through the associated phase of the motor. In this example, the high-side switches are pulse-width modulated by the control unit 208 as a function of the desired motor 16 rotational speed, while the low-side switches are active-high for the duration of their conduction band. It should be noted, however, that low-side switches may alternatively be synchronously rectified. During the CB of a high-side switch, the corresponding low-side switch is kept low, but the other two low-side switches are activated for half the CB of the high-side switch to provide a current path between the power supply and the motor windings. For simplicity, the 360-degree of rotor rotation can be divided to six sectors of 60 degrees each, where within each sector, only one of the high-side switches and one of the low-side switches is active.

Referring back to FIGS. 4 and 5, controller 230 detects the angular position of the rotor using various methods described herein, and particularly using the motor back-EMF above a certain speed threshold. Motor back-EMF results from inductive current generated on the floating phase of the motor as a result of magnetic interaction between that phase and the rotor magnets as the rotor rotates. The voltage shape of the back-EMF signal waveform for each phase is indicative of the rotational location of the motor.

In an embodiment, to detect the motor back-EMF voltage, an attenuator 240 is electrically coupled to the U, V, and W terminals of the motor 16. Attenuator 240 is a voltage divider that, in an exemplary embodiment, includes two resistors, and simply divides the voltage by a constant in order to reduce the motor back-EMF voltage to a voltage that is within the operating voltage range of the motor (e.g., typically 3.3v or 5v). A Low-Pass Filter (LPF) 242 is coupled to the output of the attenuator 240 to remove impulse noise and, in an embodiment, convert the PWM pulse drain to an analog voltage by averaging the high and low periods of the back-EMF voltage signal.

The controller 230 receives three voltage output from the LPF 242 corresponding to the phases of the motor 16. As the motor 16 is commutated, the controller 230 monitors the motor back-EMF voltage on the open phase of the motor 16. The open phase refers to the phase that is not actively driven within a given sector. For example, within sector 1 shown in FIG. 7, where the controller 230 is driving UH and VL, the controller 230 monitors the voltage on phase W. By monitoring zero-crossing of the open-phase voltage, the controller 230 can determine when to commutate the next sector. Furthermore, by monitoring the frequency and sequence of the back-EMF phase voltages over a number of sectors, the controller 230 is able to determine speed and rotational direction of the rotor. Controller 230 can take corrective action when it determines that motor speed is too high, which may be caused by system failure, or the rotor is not rotation in the correct direction, which may occur at start-up or during normal due to the power tool accessory hitting a pinch on the workpiece. Such corrective action may include, but is not limited to, allowing the motor to coast, braking the motor, or correcting the commutation sequence of the motor to obtain the desired speed or rotation direction.

In an embodiment, in addition to controller 230, control unit 208 further includes a secondary controller 250 provided to determine motor speed and rotation direction. Secondary controller 250 may be of the same size and processing power as controller 230, or alternatively may be a relatively small and low power processor. For example, secondary controller 250 may be a microprocessor or microcontroller chip, for example an 8-bit micro-controller (such as a PIC10F200 Microchip®) that is smaller and less expensive than controller 230. Controller 230 and secondary controller 250 may be mounted on the same circuit board or separate circuit boards disposed in different parts of the power tool 10. In an embodiment, like controller 230, secondary controller receives a low-voltage supply of power from the power supply regulator 234. It also receives three voltage signals corresponding to phases of the motor 16 from the LPF 242. However, unlike controller 230, secondary controller 250, secondary controller 250 does not control motor commutation or other power tool control functions. Rather, secondary controller 250 is merely programmed to determine the speed and rotational direction of the motor 16 based on the voltage signals from the LPF 242, and to shut down power to the motor 16 in the event it detects an overspeed condition or incorrect rotation of the motor 16. In an embodiment, secondary controller 250 shuts down power to the motor 16 by activating a disable signal that disables the gate driver 232. Secondary controller 250 ensures, that in the event of electrical or software failure by the controller 230, the motor 16 does not continue operating at high speed or incorrect direction. Secondary controller 250 is discussed in greater detail later in this disclosure.

Sensorless Start-Up and Low-Speed Motor Commutation Control

An aspect of the invention is described herein with reference to FIG. 8-16, according to an embodiment.

FIG. 8 depicts an exemplary waveform diagram of the motor phase voltages detected by the controller 230 during a full 360-degree rotation of the motor, according to an embodiment. In sector 1, as discussed above, the controller 230 actively drives U and V phases and designates W phase as the open-phase on which the motor back-EMF is monitored. When the controller 230 detects a zero-crossing on the W phase within this sector, it determines that the rotor is in the middle of the present sector. If no advance angle is provided, controller 230 begins to commutate the next sector after a predetermined angle, e.g. in this example, 30 degrees. This sequence is continued in sector 2, where the V phase is monitored for motor back-EMF, and so on.

As discussed above, controller 230 relies primarily on the motor back-EMF to calculate the position of the rotor and determine the exact timing of the next commutation. While this execution is reliable at speeds above a certain threshold, the motor back-EMF voltage is not sufficiently steady and reliable for sensorless rotor position detection. Furthermore, at start-up, the controller 230 needs to know the position of the rotor to start commutation. Accordingly, the controller 230 is programmed and configured to perform three different algorithms based on the speed of the motor, as described here.

Figure 9:
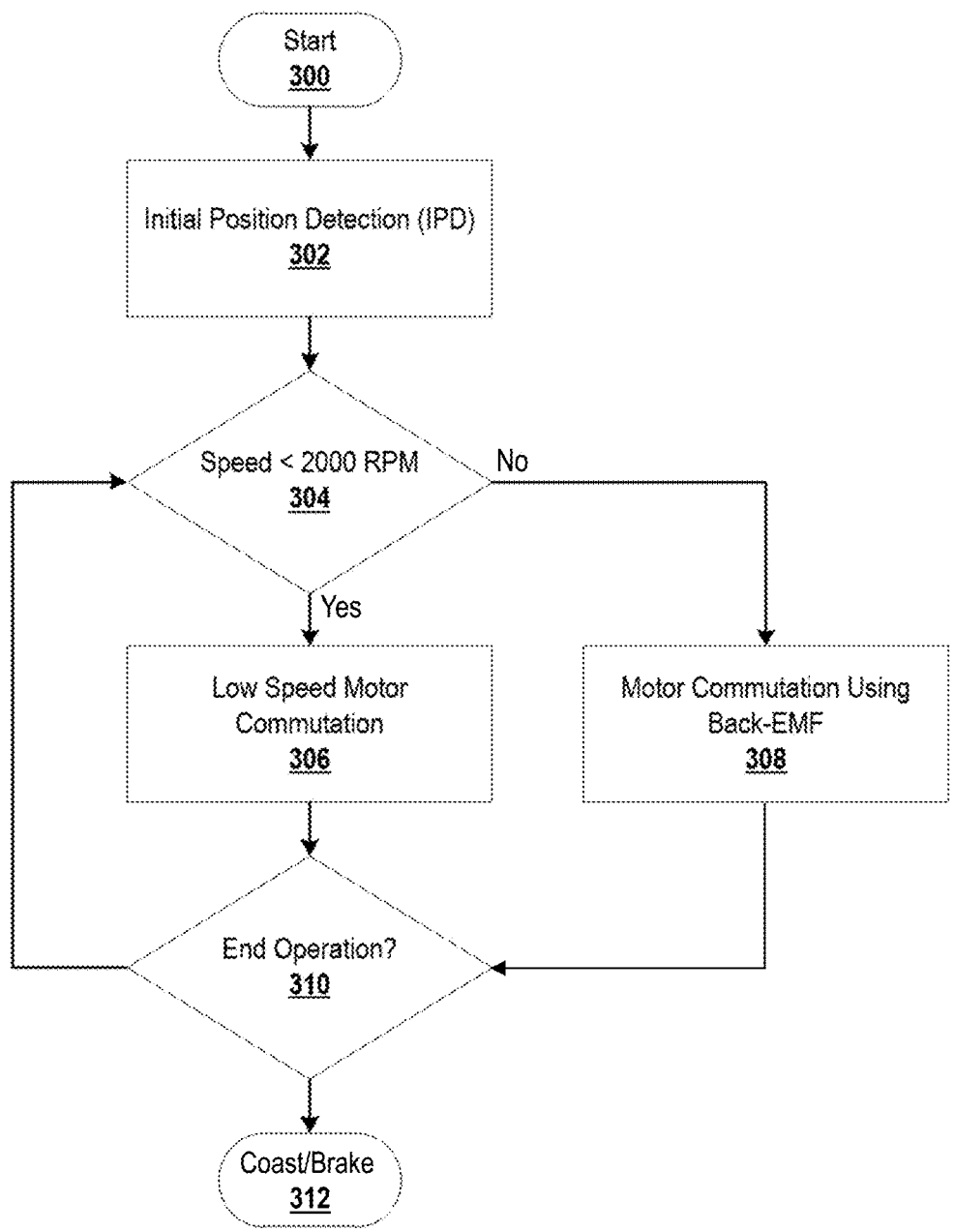
FIG. 9 depicts a simple flow diagram for sensorless motor commutation, according to an embodiment.

Referring now to FIG. 9, a flow diagram executed by the controller 230 for sensorless motor commutation is described, according to an embodiment. In an embodiment, the controller 230 starts at step 300 and proceeds to execute a process herein referred to as Initial Position Detection (IPD) at step 302. In this step, as described below in detail, the controller 230 detects the initial angular position of the rotor. In step 304, the controller 230 determines whether the rotor speed is below a transitory threshold. The transitory threshold in this example is 2000 RPM, but may be higher or lower depending on motor size, power output, etc. If the speed is below the transitory threshold, which it is immediately after IPD, controller 230 proceeds to execute a process herein referred to as Low Speed Motor Commutation (LSMC) at step 306. This process is used an as alternative to commutation using motor back-EMF and will be described below in detail. If the rotor speed is equal to or greater than the transitory threshold, the controller 230 executed commutation using motor back-EMF, as described above with reference to FIG. 8. In executing either process, the controller 230 monitors a condition indicative of tool shut down to determine whether to end motor operation in 310. Such condition may include, but is not limited to, user release of the power tool trigger switch or a fault condition such as motor over-voltage, over-current, over-temperature, etc. If such condition occurs, the controller 310 either brakes the motor or shuts off power to the motor to allow it to coast down. Otherwise, it repeats this process beginning at step 304.

The process of Initial Position Detection (IPD) is described herein with reference to FIGS. 10-12, according to an embodiment.

FIG. 10 depicts a table of sequence of voltage pulses injected during Initial Position Detection (IPD), according to an embodiment. In IPD, the controller 230 sequentially injects a series of voltage pulses to each sector of the motor as shown in this table. For example, voltage V1 is applied to sector 1 by activating switches S1a, S2b and S3b (FIG. 6) of the power switch circuit 226; voltage V1 is applied to sector 1 by activating switches S1a, S2a and S3b of the power switch circuit 226; etc. In an embodiment, each pulse has a 50 μsec duration.

After each voltage pulse, the controller 230 measures the current across the shunt resistor R_Shunt (FIG. 6). The sector corresponding to the position of the rotor generates the highest inductive current in response to the voltage pulse. FIG. 11 depicts an exemplary diagram showing the measured current corresponding to each voltage pulse. The sector corresponding to the larger current measurement—in this example sector 4—is identified by the controller 230 as the initial position of the rotor, as shown in FIG. 12.

The Low Speed Motor Commutation (LSMC) process is described herein with reference to FIGS. 13-16, according to an embodiment. In LSMC, the controller 230 relies on injection of voltage test pulses to the present sector and the next expected sector to determine the timing of when commutation should transition to the next sector, as described here in detail.

FIG. 13 exhibits an exemplary table representing commutation sequence data stored in a memory (not shown) accessible by the controller 230 for controlling the motor commutation. Within each sector, controller 230 can look up the present sector commutation sequence, as well as the previous sector and next sector commutation sequence. For example, if the rotor is currently in sector 4, controller 230 can look up the previous sector commutation sequence (VH, WL) and next sector commutation sequence (WH, UL) from the table.

Figure 14:
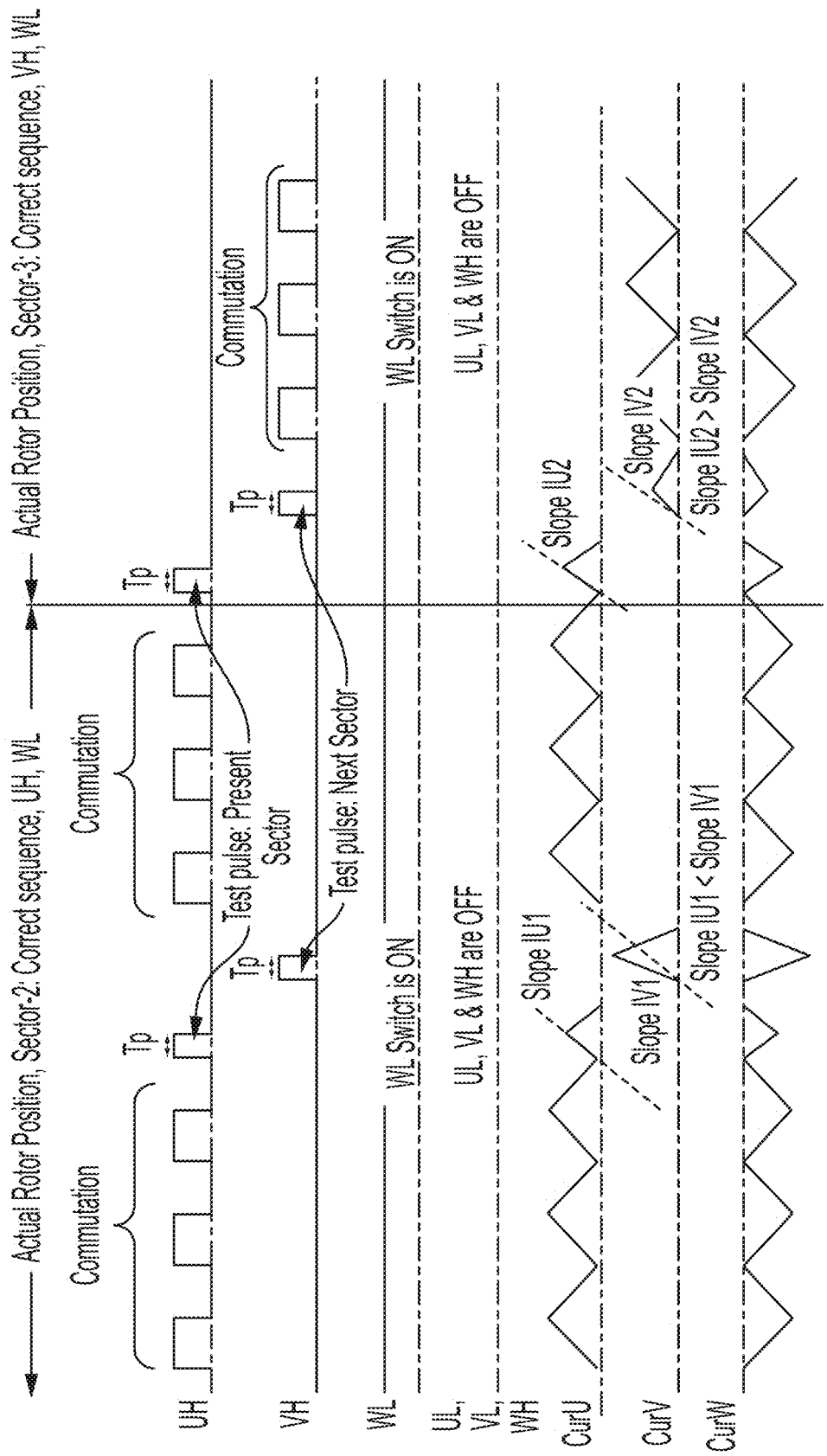
FIG. 14 depicts an exemplary waveform diagram including voltage test pulses injected to consecutive sectors to determine commutation timing of the next sector, according to an embodiment.

FIG. 14 depicts an exemplary waveform diagram including voltage test pulses injected to consecutive sectors to determine commutation timing of the next sector, according to an embodiment. In this example, the rotor is presently in sector 2, and therefore the present sector commutation sequence is UH (which is pulse-width modulated) and WL (which is kept HIGH for the duration of the sector). In an embodiment, controller 230 controls the drive signals such that, the PWM drive is periodically paused after every set number of cycles. Two test voltage pulses having the same width ($T_p$) are injected on (UH, WL) (for the present sector) and (VH, WL) (for the next sector) in sequence. The controller 230 also monitors the motor current via R_Shunt (FIG. 6) and determines the slope of the motor current corresponding to the two test voltage pulses. If the motor determines that the $\Delta I<0$, where $\Delta I=\Delta I_U$ (Slope of the present sector current)$-\Delta I_V$ (Slope of the next sector current), it continues to commutate the present sector. This process is repeated for as long as $\Delta I<0$. Once controller 230 detects that $\Delta I>0$, it designates sector 3 as the present sector, and process is continued by periodically injecting test voltage pulses into sector 3 (present sector) and sector 4 (next sector).

It is noted that FIG. 14 merely depicts a transition period between sectors 2 and 3, and actual number of PWM cycles and test pulses within each sector is much greater than shown.

In an embodiment, instead of comparing slopes of the current measurements, the applied voltage pulses may be of fixed width and the rise in amplitude in the measured motor currents may be compared instead. Alternatively, voltage pulses may be applied until the associated measured current increases to a predetermined amplitude, and the width of the voltage pulses may be compared.

In an embodiment, the controller may execute PWM control of the power switch circuit 226 at a lower frequency below a low-frequency speed threshold. In an embodiment, this low-frequency speed threshold may be the same as the transitory threshold (for example 2,000 rpm) discussed above for transitioning between the LSMC commutation and commutation using motor back-EMF. Alternatively, this low-frequency threshold may be set to a lower or higher speed value. In an embodiment, below the low-frequency speed threshold, the controller 230 executes PWM control at a lower frequency to allow itself more time to inject test pulses and measure the associated motor currents. Once motor speed reaches and/or exceeds the low-frequency speed threshold, the controller reverts to its normal operating frequency for PWM control.

In an alternative embodiment, the PWM control of the power switch circuit 226 remains the set at the normal operating frequency, even at low speed, while the motor is being commutated, and the frequency is set to a lower value during periods in which the PWM drive is paused and test pulses are being injected. For example, in FIG. 14, the operating frequency may be set to a lower value (e.g., 10 kHz) while the two test pulses are being injected on (UH, WL) (for the present sector) and (VH, WL) (for the next sector), and to a normal operating frequency value (e.g., 20 kHz) for execution of PWM drive.

In an embodiment, the lower frequency value may be 40% to 60% of the normal operating frequency. In an example, where normal operating frequency is 20 kHz, the lower frequency value may be approximately 10 kHz.

A challenge that arises at very low speed operation of power tools is that the rotor may inadvertently rotate in the incorrect direction due to outside forces. This may occur, for example, when encountering a pinch on the workpiece, where the inertia of the tool may cause the tool to rotate after the tool accessory gets stuck in the workpiece. Also, the user's attempts to disengage the accessory from the workpiece by turning the tool opposite to the intended direction may attribute to this condition. It is important for the controller 230 to be able to detect when the rotor is rotating in the incorrect direction to take corrective action and adjust the commutation sequence accordingly.

To address this problem, according to an embodiment of the invention, controller 230 subdivides each sector to two halves, and injects test voltage pulses as described above only in the latter half of the respective segment. In the first half of the segment, instead of injecting test voltage pulses in the present sector and the next sector, controller 230 injects test voltage pulses in the present sector and the previous sector. This is because incorrect rotation of the rotor is likely problematic in the first half of the sector, where movement of the rotor to the incorrect sector can have devastating effects on commutation control. In this manner, if the controller 230 can detect if the rotor is inadvertently moved to the previous sector and adjust the commutation sequence accordingly to correct the rotational direction of the motor.

Figure 15:
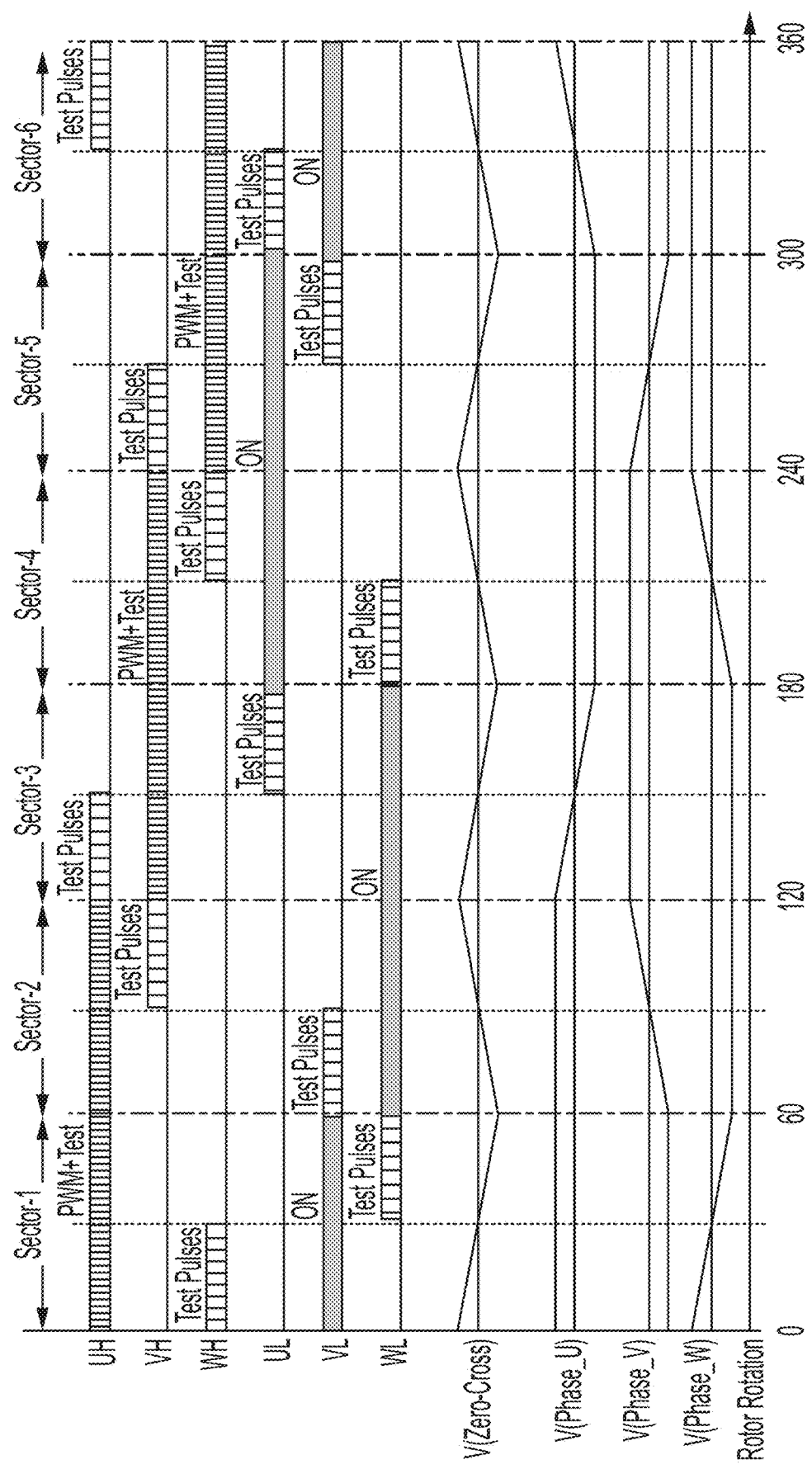
FIG. 15 depicts an exemplary waveform diagram showing motor commutation sequence within a full 360 degree of rotor rotation and test pulses for each sector, according to an embodiment.

FIG. 15 depicts an exemplary waveform diagram showing motor commutation sequence within a full 360 degree of rotor rotation and test pulses for each sector, according to an embodiment. As shown here, within each sector, a first set of pulses are injected in the present sector for the entirety of the sector. Within the first half of each sector, a second set of test pulses are injected in the previous sector in order to detect inadvertent rotation of the rotor to the previous sector. The slopes of current measurements corresponding to the respective first and second sets of test pulses are compared in a manner described above with respect to FIG. 14, and if it is determined that $\Delta I > 0$, where $\Delta I$=(Slope of the present sector current)−(Slope of the previous sector current), the controller 230 determines that the rotor has rotated inadvertently to the previous sector and takes corrective action. Within the second half of the sector, a third set of test pulses are injected in the next sector and slopes of current measurements corresponding to the respective first and third sets of test pulses are compared to determine commutation of the next sector, as described with reference to FIG. 14.

By way of example, if the rotor is currently in sector 2 (i.e., present sector=UH, WL), within the first half of sector 2 (i.e., 60-90 degrees), the injection of test pulses occur on the present sector (UH, WL) and the previous sector (UH, VL). If the slope of the current measurement corresponding to the test pulse of the present sector is greater than the slope of the current measurement corresponding to the test pulse of the previous sector, the controller 230 determines that the rotor has rotated incorrectly to sector 1. Within the second half of sector 2 (i.e., 90-120 degrees), the injection of test pulses occurs on the present sector (UH, WL) and the next sector (VH, WL). If the slope of the current measurement corresponding to the test pulse of the present sector is greater than the slope of the current measurement corresponding to the test pulse of the next sector, the controller 230 determines that the rotor has rotated to sector 3 and begins commutation of sector 3.

Similarly, if the rotor is currently in sector 3, within the first half of sector 3 (i.e., 120-150 degrees), the injection of test pulses occur on (VH,WL) for the present sector and (VH, WL) for the previous sector. Within the second half of sector 3 (i.e., 150-180 degrees), the injection of test pulses occurs on (VH, WL) for the present sector and the (VH, WL) for the next sector.

In an embodiment, controller 230 monitors the open-phase voltage within each sector and, as shown in FIG. 15, transitions between the first half of the sector and the second half of the sector when it detects a zero-crossing of the open-phase voltage. In an embodiment, although the back-EMF voltage is generally unreliable at low speed for detecting the timing of commutation of the next sector, it is sufficiently reliable for detecting, at least to close proximity, the halfway point of each sector where the controller 230 should begin monitoring the next sector instead of the previous sector.

In an embodiment, controller 230 determines a half-way point of the DC bus voltage waveform (e.g., 60V for a power tool powered by a 120V nominal voltage power supply) and compares the open-phase voltage to the DC bus halfway point (half_bus). If the BEMF is falling for the present sector and open-phase voltage>half_bus, controller 230 determines that the actual rotor position is in the first half of the present sector and check for transition to the previous sector to detect a possible bounce back. If the BEMF is falling for the present sector and open-phase voltage<half_bus, controller 230 determines that the actual rotor position is in the second half of the present sector and check for transition to the next sector.

In an embodiment, controller 230 applies fix-width test pulses to the present sector and the previous and/or next sectors. Alternatively, controller 230 may apply variable-width pulses as suited. In that case, rather than comparison of the change of current amplitude, controller 230 compares the slopes of the two current measurements—$(\Delta I_1/TP1)$ to $(\Delta I_2/TP2)$, where TP1 and TP2 are widths of voltages pulses applied to present sector and the previous and/or next sector respectively—to determine whether the sector has moved from the present sector.

In an embodiment, the frequency at which test pulses are applied may vary depending of the rotational speed of the motor. For example, at output speeds of below 1000 RPM, controller 230 may apply test pulses at a 667 Hz frequency (i.e., every 1.5 ms), and at output speeds of over 1000 RPM, controller 230 may apply test pulses at 1250 Hz frequency (i.e., every 800 us).

In an embodiment, controller 230 may further normalize the current curves to compensate for variations in the DC bus voltage, as discussed here. As shown in FIG. 14, the DC bus voltage may fluctuate due to, for example, voltage ripples in an AC power source or high impedance of a battery pack. These variations in the DC bus voltage affect the amount of voltage supplied to the motor via the test pulses and thus compromise the effectiveness of directly comparing the associated current measurements. To overcome this issue, in an embodiment, controller 230 measures the DC bus voltage at the time the test pulses are injected to the present sector ($V_{dc1}$) and the adjacent (i.e., previous or next) sector ($V_{dc2}$). Controller 230 then normalizes the current measurements $\Delta I_1$ and $\Delta I_2$ according to the DC bus voltage and compares $(\Delta I_1 \times V_{dc1})$ and $(\Delta I_2 \times V_{dc2})$ to determine whether and when to commutate the adjacent sector.

Figure 16:
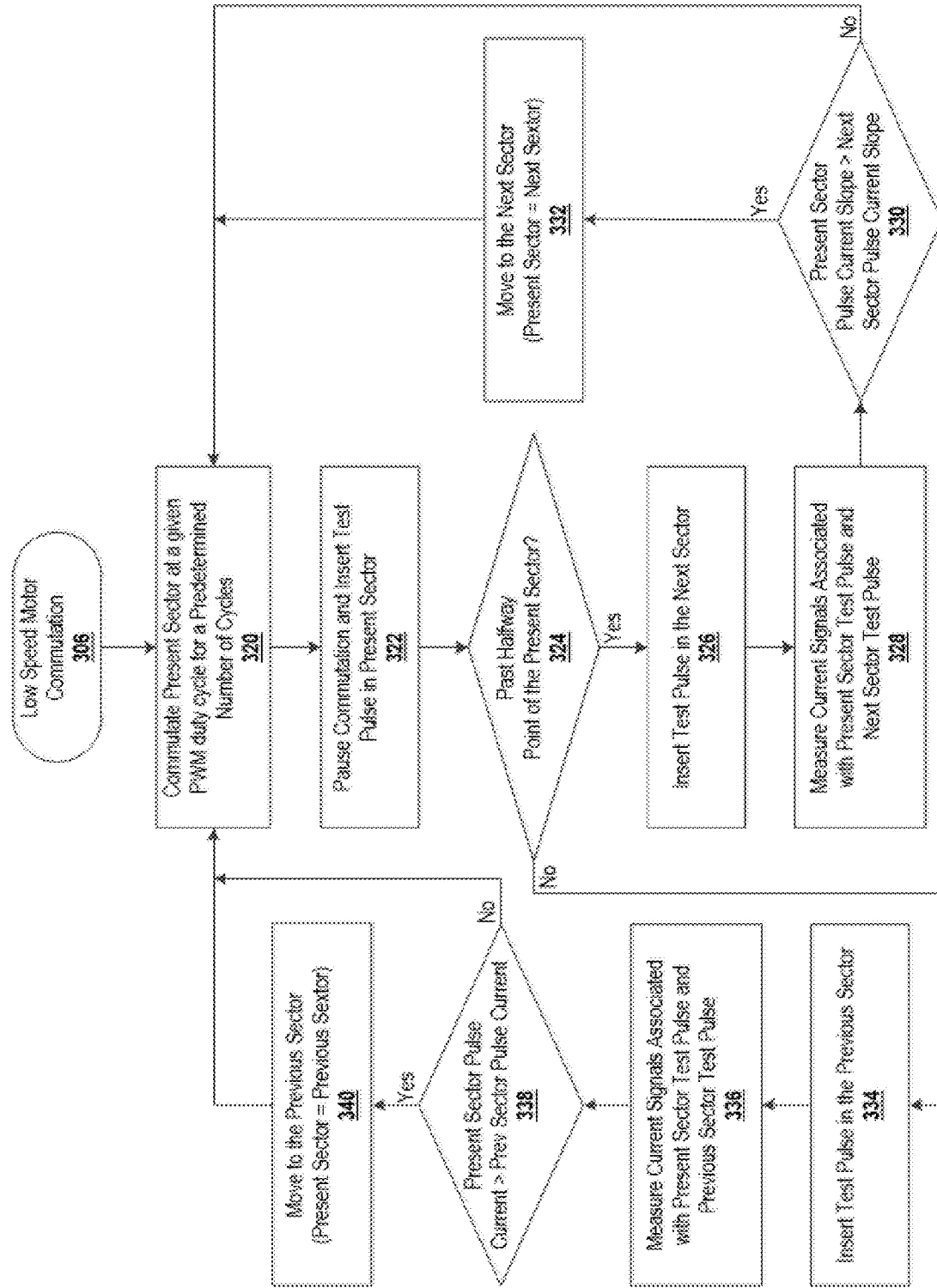
FIG. 16 depicts a flow diagram for Low-Speed Motor Commutation (LSMC), according to an embodiment.

Referring now to FIG. 16, a flow diagram executed by the controller 230 for Low-Speed Motor Commutation (LSMC) is described, according to an embodiment. In an embodiment, to execute LSMC at step 306, controller 230 commutates the present sector at a given PWM duty cycle for a predetermined number of cycles at step 320. At step 322, controller 230 provisionally pauses commutation of the present sector and insert a test pulse in the present sector. At step 324, controller 230 determines if the sector is past its halfway point. Controller 230 may do so by setting a flag once it detects a zero-crossing of the open-phase voltage. If it is past the halfway point, at step 326, controller 230 inserts a test pulse in the next sector, as determined by the table of FIG. 13. Controller 230 measures current signals associated with the present sector test pulse and the next sector test pulse at step 328. At step 330, controller 230 determines whether the present sector pulse current slope>next sector pulse current slope, and if so, it moves to the next sector (i.e., sets next sector as the present sector) at step 332. Controller 230 then repeats this process beginning at step 320.

If controller 230 determines at step 324 that the present sector is not past its halfway point, it proceeds to insert a test pulse in the previous sector as determined by the table of FIG. 13 at step 334. Controller 230 measures current signals associated with the present sector test pulse and the previous sector test pulse at step 336. At step 338, controller 230 determines whether the present sector pulse current slope>previous sector pulse current slope, and if so, it moves to the previous sector (i.e., sets previous sector as the present sector) at step 340 in order to correct the commutation sequence and get the rotor rotating in the correct direction. Controller 230 then repeats this process beginning at step 320.

Zero-Cross Detection of Motor Back-EMF

As previously discussed, at speeds higher than the transitory threshold (for example at above 2,000 rpm for some power tools) discussed above, the motor back-EMF can be reliably used by controller 230 to detect the rotor position. Controller 230 does this by detecting the zero-crossing of the open-phase voltage within each sector and commutating the next sector accordingly.

One way for the controller to determine the zero-cross is to continuously sample and monitor the open phase voltage. However, such continuous sampling takes a lot of processing power.

Figure 17:
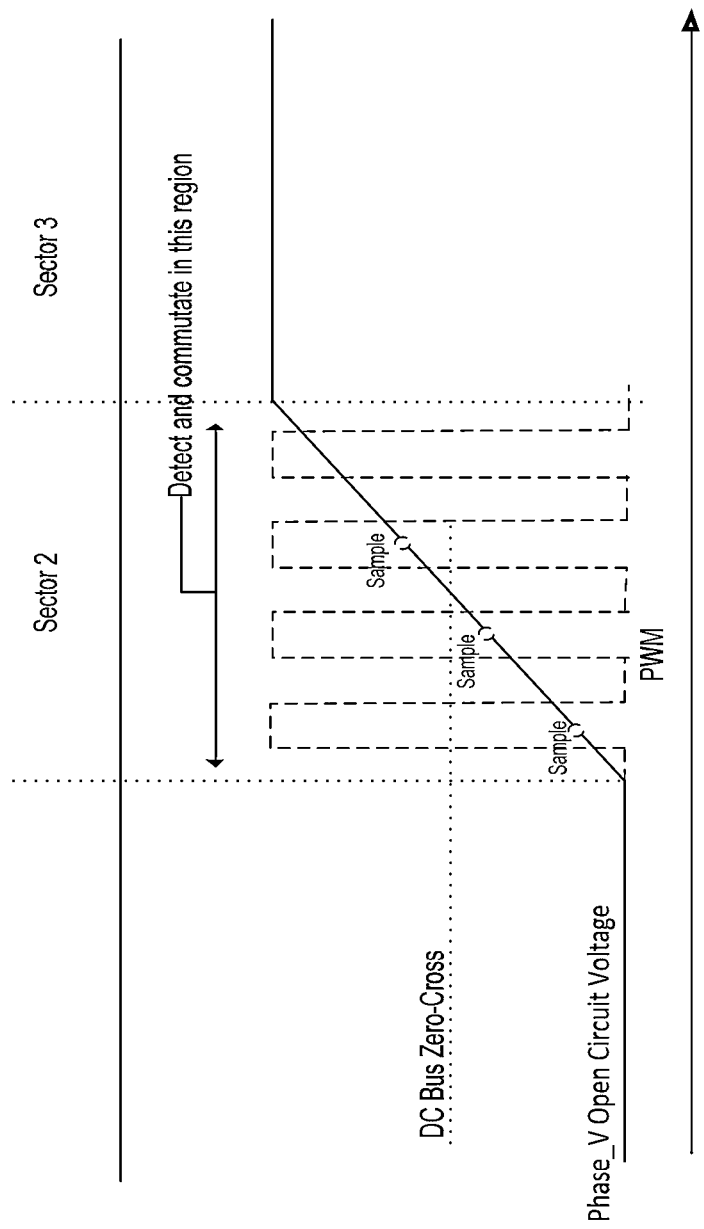
FIG. 17 depicts an exemplary waveform diagram showing sampling of the open phase voltage for detection of a zero-crossing, according to an embodiment.
Figure 18:
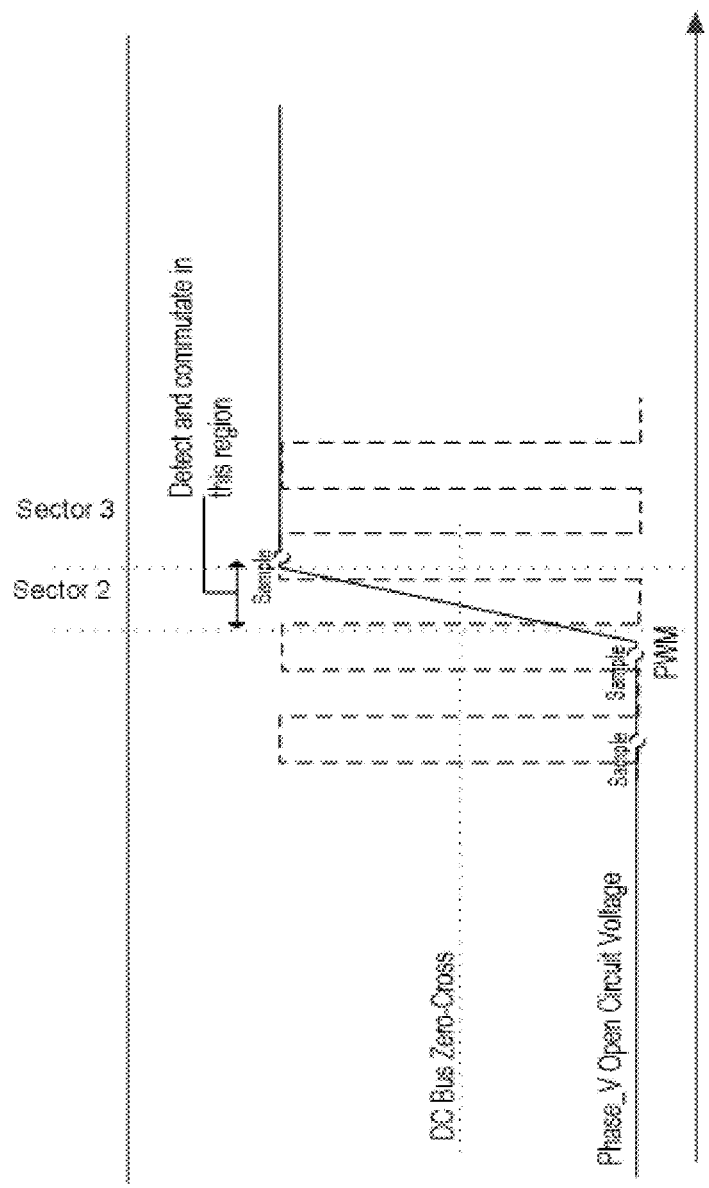
FIG. 18 depicts an exemplary waveform diagram showing the sampling technique of FIG. 17 at high speed, according to an embodiment.
Figure 19:
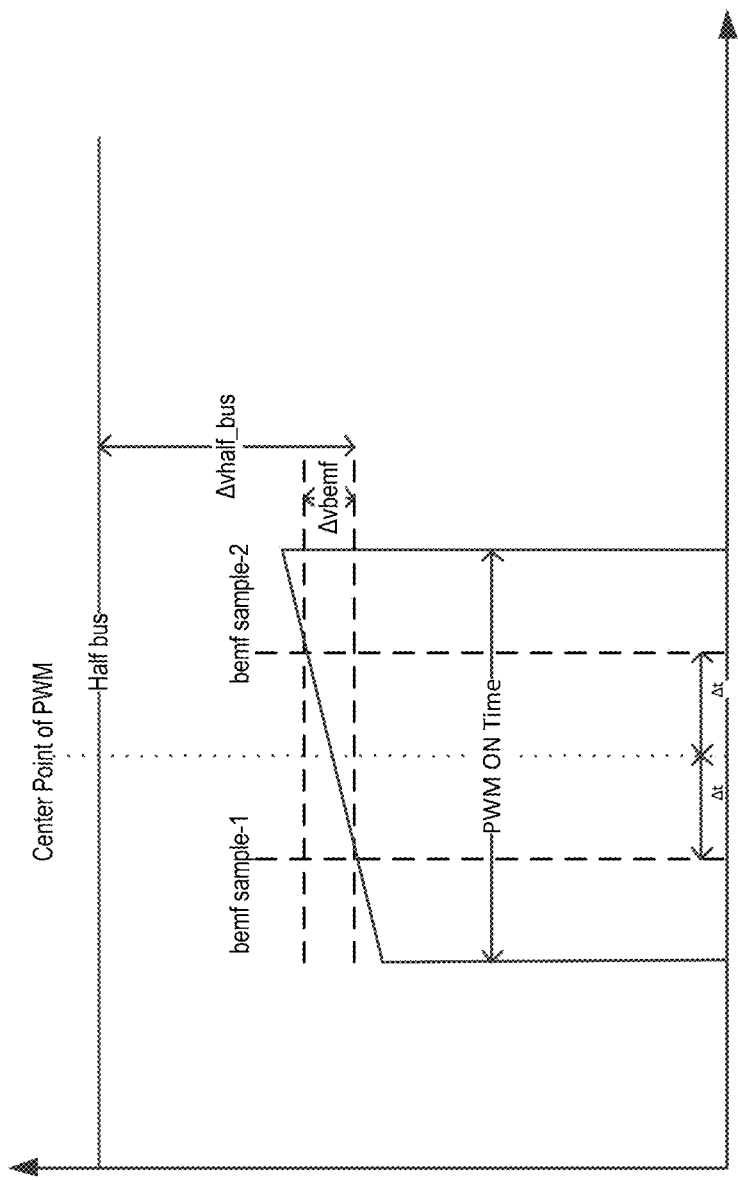
FIG. 19 depicts an exemplary waveform diagram showing an improved sampling technique at high speed, according to an embodiment.

An improved technique for detecting the zero-crossing is described herein with reference to FIGS. 17-19, according to an embodiment.

In an embodiment, controller 230 conducts sampling of the open phase voltage periodically at a rate of one sample per PWM duty cycle. FIG. 17 depicts an exemplary waveform diagram depicting the sampling of the open phase voltage, which in this example is the V-phase during sector 2. As the V-phase voltage begins to rise, controller 230 samples the V-phase voltage once for every PWM duty cycle applied to the U phase. Once controller 230 detects that the sampled V-phase voltage is greater than or equal to the DC bus zero-cross (i.e., halfway point of the DC bus voltage, which is approximately equal to half the power supply voltage), it determines that an open-phase zero-cross has occurred. Controller 230 uses the open-phase zero-cross detection to commutate the adjacent cycle (e.g., in these examples, with a 30-degree phase shift).

Sampling at the rate explained above is suitable for relatively low speeds, e.g., between 2000 RPM to 18000 RPM in some power tools. In the given example, the sampling of the V-phase open voltage once it exceeds the DC bus zero-cross occurs a short time after the actual zero-cross, giving the controller 230 ample time to prepare for commutating the next sector (sector 3) before the rotor moved to the next sector. However, sampling the open phase voltage at the rate of once per PWM duty cycle at higher speed levels may result in delayed and inaccurate detection of a zero-crossing event. For example, as shown in FIG. 18, sampling the V-phase open voltage at the rate of once per PWM duty cycle results in detection of the V-phase zero-cross event after the rotor has already moved to the next sector (sector 3), causing the controller 230 commutation control to lag behind the actual rotor position.

In order to avoid this issue, according to an embodiment of the invention, as shown in FIG. 19, at relatively high rotor speed (e.g., above 18,000 RPM in some power tool applications), controller 230 is configured to sample the open-phase voltage twicer per PWM duty cycle. The controller identifies a mid-way point of the PWM duty cycle, takes a first sample of the open circuit voltage prior to (e.g., 5 µs before) the midpoint of PWM duty cycle, and a second sample after (e.g., 5 µs after) the midpoint of PWM. In an embodiment, using these sampling points, controller 230 constructs a profile of the open-phase voltage and predicts based on the difference between the two voltage samples ($\Delta V_{bemf}$) and the difference between the first sample and the DC bus voltage zero-cross point ($\Delta V_{half\_bus}$), and uses the profile to predict the timing of the open-phase voltage zero-crossing. In an embodiment, this determination may be made as:

Predicted commutation time=$(\Delta t * \Delta V_{half\_bus})/\Delta V_{bemf}$

Figure 20:
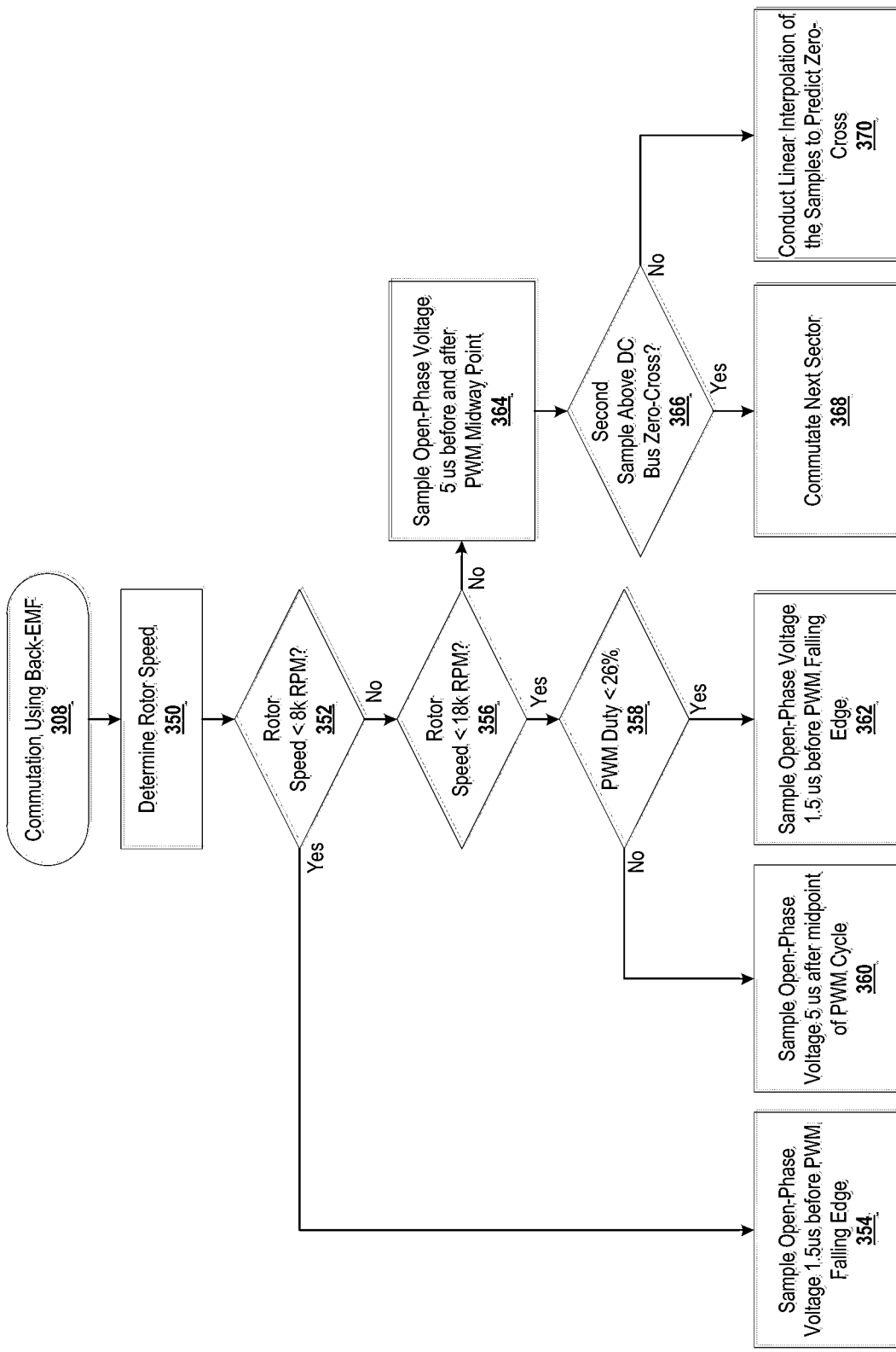
FIG. 20 depicts an exemplary flow diagram for detecting the zero-crossing of the open-phase voltage at different motor speed ranges during execution of commutation using motor back-EMF, according to an embodiment.

FIG. 20 depicts an exemplary flow diagram executed by the controller 230 for detecting the zero-crossing of the open-phase voltage at different motor speed ranges during execution of commutation using motor back-EMF, according to an embodiment. In an embodiment, in the process of commutation using back-EMF 308 (see FIG. 9), controller 230 proceeds to determine rotor rotational speed at step 350 and compare the rotor speed to a first threshold (in this example, 8,000 RPM) at step 352. If rotor speed is less than the first threshold, at step 354, controller 230 samples the open-phase voltage once per PWM duty cycle, at 1.5 us before the falling edge of the PWM cycle applied to the active phase. This sampling point is effective due to the small duty of the PWM cycles within this speed range. If the first voltage sample indicates that (sampled open circuit voltage−half_bus) has a different polarity as compared to the previous sample, the controller immediately determines that the rotor has moved to a new a new sector and begins to commutate the next sector.

If rotor speed is greater than or equal to the first threshold, at step 356, controller 230 determines whether the speed is less than a second threshold (in this example, 18,000 RPM). If rotor speed is less than the second threshold, controller may designate the sampling time of the open-voltage based on the PWM duty cycle, i.e., whether the PWM duty cycle is below a threshold (in this example, 26%) at step 358. If PWM duty cycle is below the threshold, the open-phase voltage is sampled 1.5 µs before the falling edge of the PWM duty cycle at step 362. Otherwise, the open-phase voltage is sampled 5 µs after the midway point of the PWM duty cycle at step 360.

If rotor speed is greater than or equal to the second threshold, at step 364, controller 230 samples the open-phase voltage 5 µs before and after the PWM midway point. At step 366, controller 230 determines whether the second sample is above the DC bus zero-crossing, and if so, at step 368, it determines that the rotor has already rotated to the next sector and begins to commutate the next sector. Otherwise, at step 370, i.e., if both samples are below the half_bus, a linear extrapolation method is used to predict when the open phase voltage will exceed the half_bus, as shown in FIG. 19. If it is determined that the open phase voltage will exceed the half_bus prior to the next PWM duty cycle, the controller sets up a corresponding time delay and begins commutating the next sector at the end of that time delay, i.e., prior to the next PWM duty cycle.

Sensorless Control with Variable Conduction Band and/or Advance Angle

Another aspect of the invention is described herein with reference to FIGS. 21-32.

Figure 21:
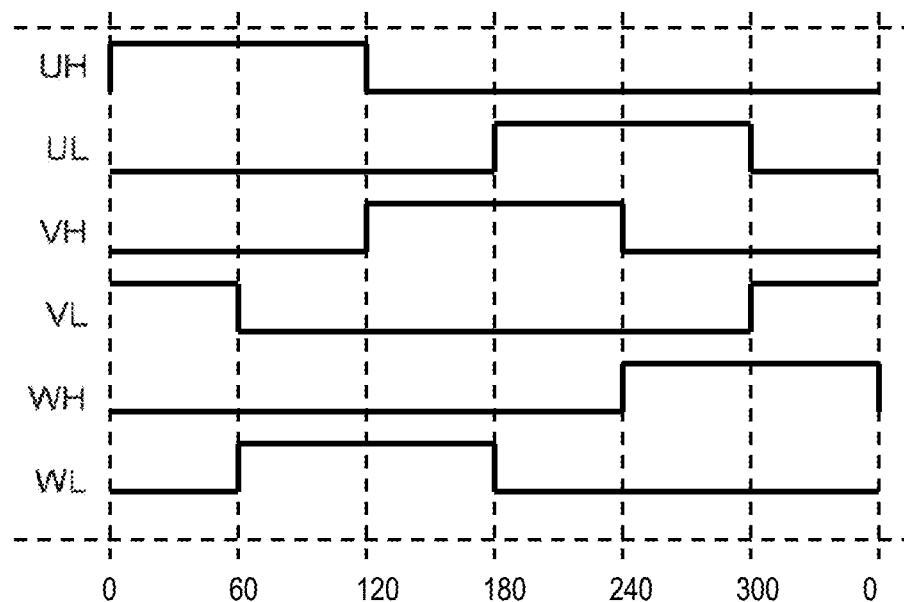
FIG. 21 depicts a waveform diagram of the control sequence of the three-phase inventor bridge operating at 100% PWM duty cycle, according to an embodiment.

FIG. 21 depicts a waveform diagram of the control sequence of the three-phase inventor bridge discussed above operating at 100% PWM duty cycle, according to an embodiment. In this figure, each of the three high-side FETs are active at a 120° conduction bands (abbreviated as "CB" herein). In other words, the full rotational range of the motor is divided by the number of phases of the motor (i.e., 120 degrees) to obtain the conduction band for each phase, and the phases of the motor are activated in sequence at that conduction band.

Figure 22:
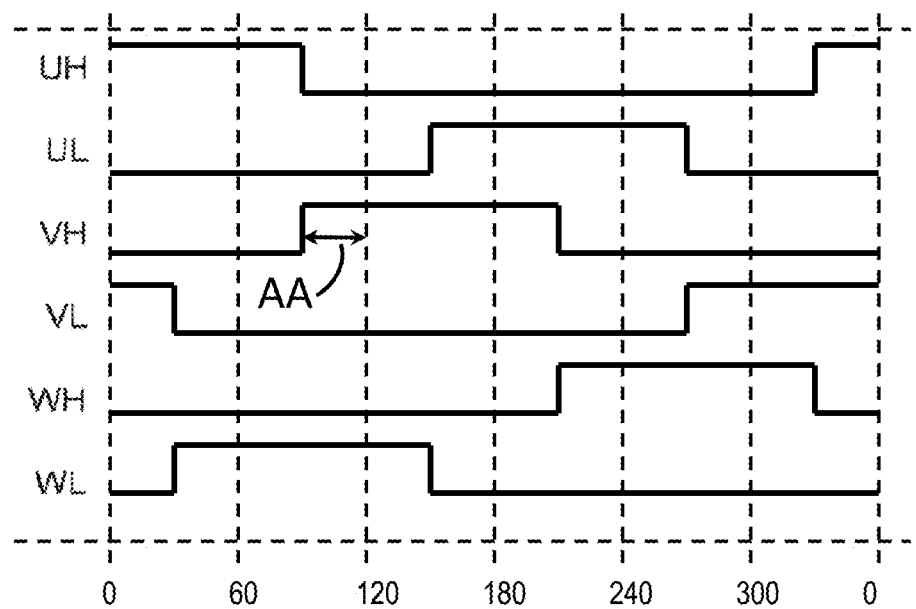
FIG. 22 depicts a waveform diagram of the control sequence of the three-phase inventor bridge operating at 100% PWM duty cycle with an advance angle of 30 degrees, according to an embodiment.

In BLDC systems, due to inefficiencies associated with the power switches and the inductance of the motor itself, the current waveform lags behind the back-EMF voltage waveform of the motor. As a result, when driving the motor as shown in FIG. 21, the BLDC motor does not produce the maximum torque that it is capable of. The ratio of the actual power absorbed by the load to the apparent power flowing in the circuit, referred to as power factor, is low when the current and voltage waveforms are not in synch. To overcome this issue, in most BLDC motors, the conduction bands of the power switches are shifted by an advance angle of, for example 30°, to maximize the power factor and the amount of torque that the motor is capable of producing. FIG. 22 depicts the waveform diagram of the control sequence of FIG. 21, shown with an advance angle (AA) of 30°, according to an embodiment.

Figure 23:
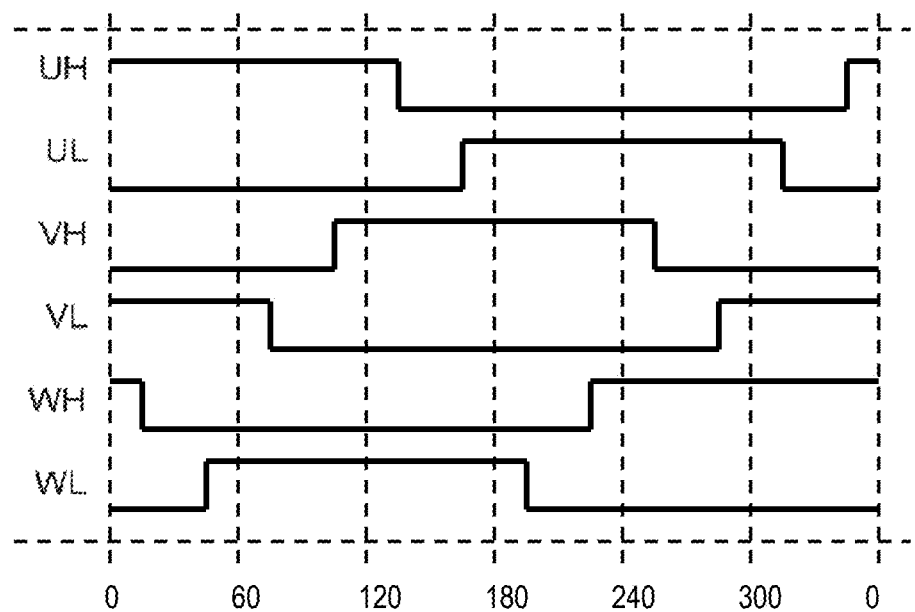
FIG. 23 depicts a waveform diagram of the control sequence of the three-phase inventor bridge operating at 100% PWM duty cycle with a conduction band of 150 degrees, according to an embodiment.

It has further been found that increasing the conduction band of the brushless motor phases to a value greater than the baseline 120° conduction band results in increased output power and increased speed for a given torque amount. To increase the conduction band, the centerline of each conduction band is maintained, and the leading and trailing edges of the conduction band are equally increased. FIG. 23 depicts a waveform diagram of the control sequence of the three-phase inventor bridge discussed above with a conduction band of 150°, according to an embodiment of the invention, where the leading and trailing edges of each conduction band are shifted by 15 degrees each as compared to FIG. 21.

Figure 24:
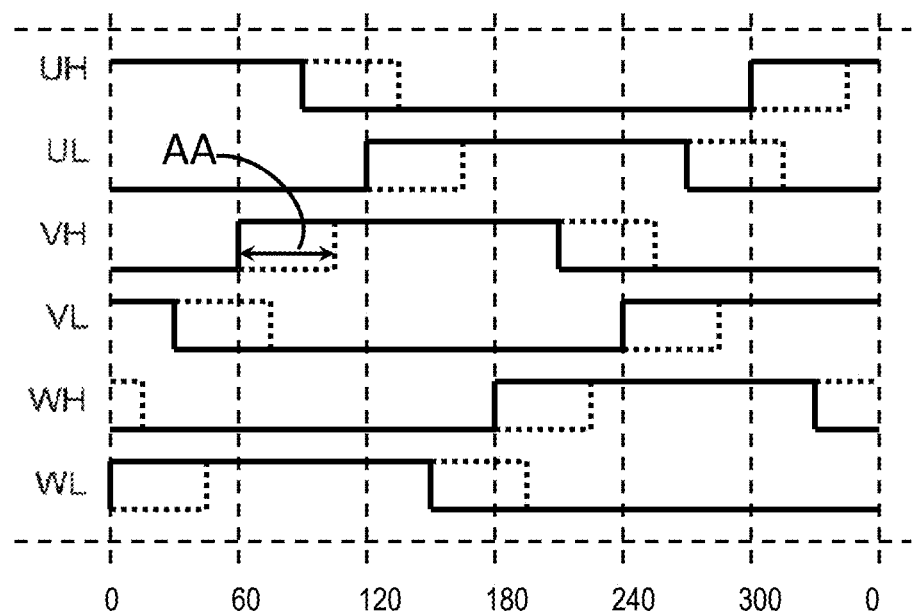
FIG. 24 depicts a waveform diagram of the control sequence of the three-phase inventor bridge operating at 100% PWM duty cycle with a conduction band of 150 degrees and an advance angle of 45 degrees, according to an embodiment.

It has further been found that increasing both the conduction band and the advance angle in tandem increases power output and system efficiency even more. For example, where the conduction band is 150 degrees, the motor efficiency increases by setting the advance angle to 45 degrees rather than the conventional 30 degrees. FIG. 24 depicts an embodiment of the invention where the advance angle of each phase of the brushless motor is varied depending on the conduction band. In the illustrative example, where the conduction band is at 150°, the advance angle is set to 45°. In an embodiment, various conduction band/advance angle (CB/AA) correlations may be programmed in the control unit 106 as a look-up table or an equation defining the relationship. The controller may set the CB/AA value based on the desired output speed or output power and drive the motor accordingly.

Increasing CB/AA beyond the baseline 120/30-degree level may provide many advantages to extending the power and speed range of the power tool. Reference is made by way of example to US Patent Publication Nos. 2018/0076652 and 2017/0366117, both of which are incorporated herein by reference in their entireties. These publications disclose power tool where variable CB/AA is utilized for closed-loop speed control to increase power to the motor as load increases; to operate the motor at a high operating range even when powered by a power supply having relatively low voltage; and to extend the operating range of the trigger switch.

In BLDC motors having Hall sensors, implementation of variable conduction band and/or advance angle control is conducted in relation to the position signals from the Hall sensors. The controller relies on position signals to identify what sector the rotor is located in and can advance the commutation angle relative to the centerline of the Hall sensor signals. Alternatively and/or additionally, the Hall sensors may be positioned offset relative to the sectors (for example by 30 degrees) such that the position signals already include a mechanical advance angle. The controller may also expand the conduction band by shifting the leading and trailing edges relative to the baseline commutation conduction band of 120 degrees.

According to an embodiment, in BLDC motors using a sensorless control scheme, controller 230 controls implementation of variable conduction band and/or advance angle relative to the beginning, zero-crossing, or an end of the open phase voltage signal within each sector, as described herein in detail.

Figure 25:
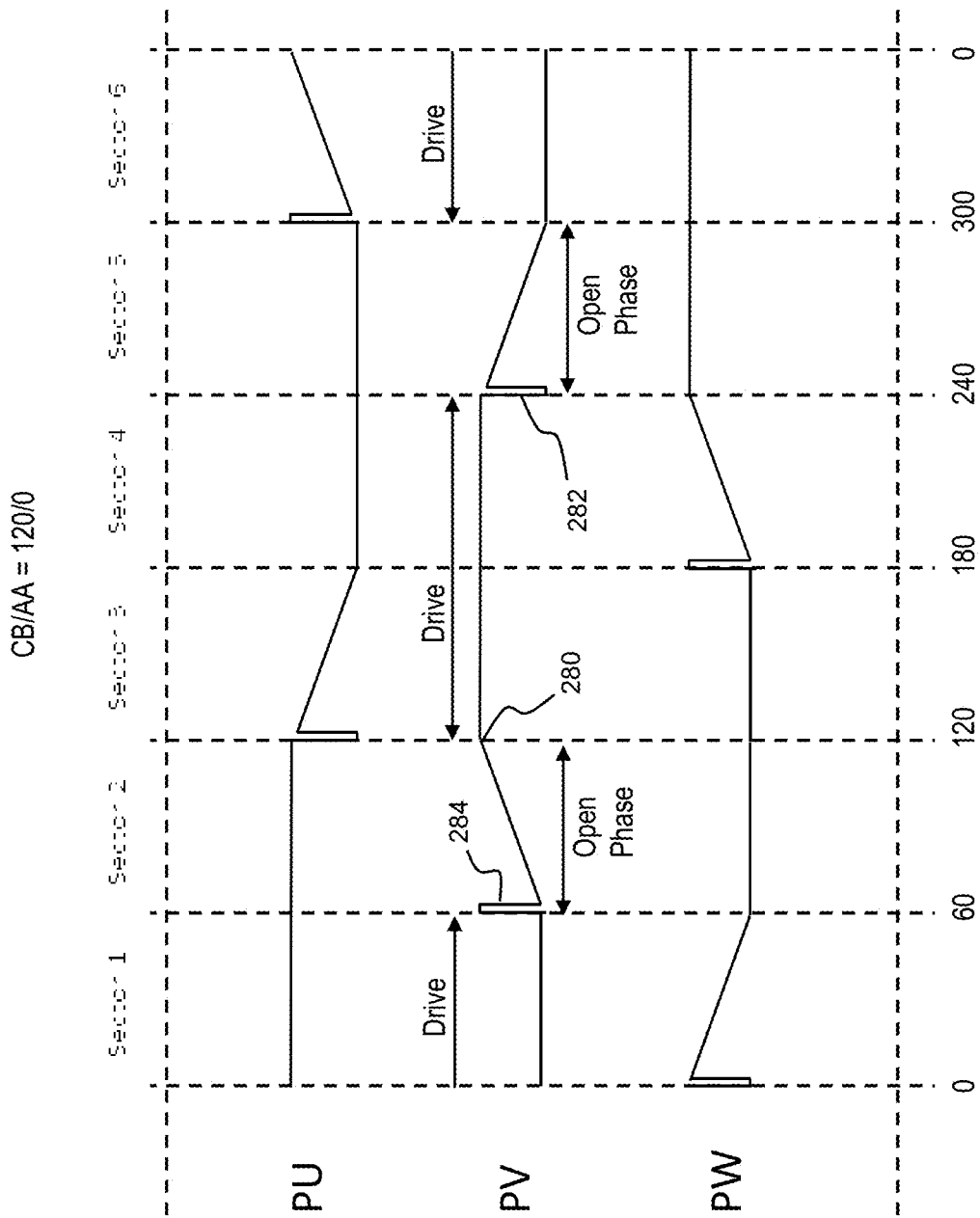
FIG. 25 depicts an exemplary waveform diagram showing the motor voltage signals used for sensorless motor control, according to an embodiment.

FIG. 25 depicts an exemplary waveform diagram showing the motor voltage signals PU, PV, and PW within a full 360 degree of motor rotation. The commutation drive sectors and open-phase sectors of the V phase only are labeled in this figure. In this figure, the controller 230 does not apply an advance angle or vary the conduction band from the baseline value (i.e., CB/AA=120/0 degrees). Thus, commutation rising edge of a next cycle takes place after the open-phase voltage has reached the bus voltage. For example, in transitioning from sector 2 to sector 3 of the V phase, controller 230 continues to sample the PV open-phase voltage within sector 2 as it ramps up until it reaches the bus voltage. Commutation rising edge 280 of the V phase thus takes place at 120 degrees. This ensures that commutation of sector 3 is in-line with the actual position of the rotor in sector 3. Similarly, the commutation trailing edge 282 of the V phase takes place when the PW open-phase voltage within sector 4 reaches the bus voltage, i.e., at 240 degrees.

Alternatively, controller 230 detects a zero-cross of the open phase and calculates, based on motor speed and/or by interpolating the open-phase voltage waveform, the commutation leading and trailing edges relative to the zero-cross of the open phase. For example, in transitioning from sector 2 to sector 3 of the V phase, controller 230 may detect the zero-cross of the PV open-phase voltage within sector 2 as it ramps up and sets the commutation leading edge 280 of sector 3 at 30 degrees thereafter.

In an embodiment, after each phase commutation cycle, a voltage pulse 284 is often detected immediately after the end of the commutation cycle, i.e., at the beginning of the open cycle of that phase, as shown in FIG. 25. This voltage pulse 284 is associated with a change in phase inductive current through the phase windings. Specifically, this voltage pulse results from a combination of three voltages: 1) the voltage developed in the stator windings between the open-phase and the preceding active-phase (e.g., U phase and W phase) terminals due to the decaying current on the open-phase, 2) the back-EMF voltage developed in the same windings as they interact with corresponding rotor magnets, and 3) the back-EMF voltage developed in the windings between the open-phase and the ensuing active phase (e.g., U phase and W phase) as they interact with the other rotor magnets. The voltage pulse period 284 ends when the current on the open-phase fully decays. The voltage pulse is nearly undetectable or has a very small magnitude at no load, and the magnitude of the voltage pulse increases as the load (and thus the current through the motor) increases.

Figure 26:
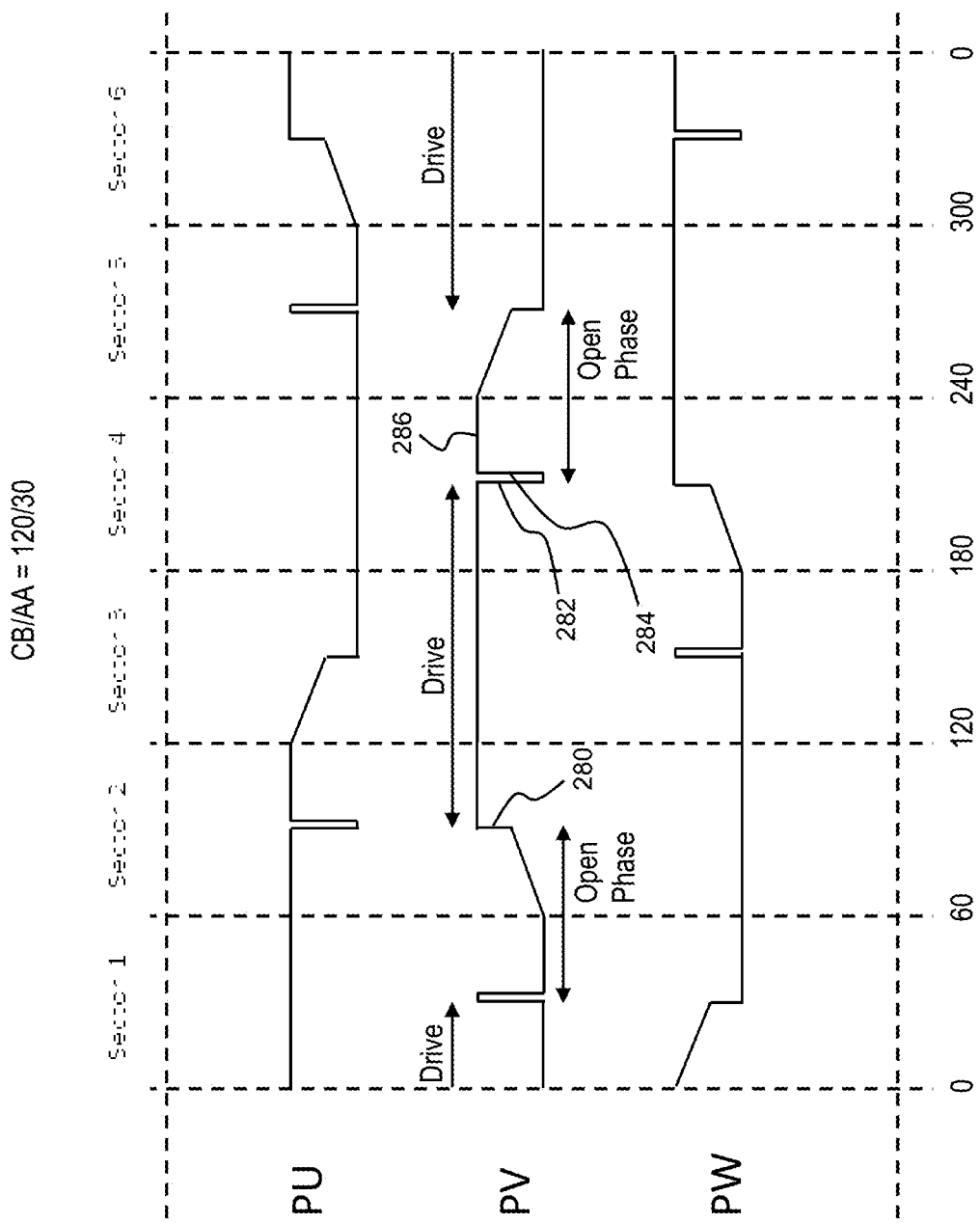
FIG. 26 depicts an exemplary waveform diagram showing the motor voltage signals with a conduction band/advance angle of 120/30 degrees used for sensorless motor control, according to an embodiment.

FIG. 26 depicts an exemplary waveform diagram similar to FIG. 25, but with a 30-degree advance angle (CB/AA=120/30). In this figure, rather than starting motor commutation of the next sector at the end of the open-phase cycle of the present sector, controller 230 begins commutating the next sector once it detects the zero-crossing of the open phase signal within the present sector. In other words, the 30-degree advance angle aligns the commutation of the next sector with the zero-cross of the open-phase voltage of the present sector. In an embodiment, controller 230 detects zero-cross of the open-phase voltage during any of the methods previously described, e.g., by sampling the open-phase voltage until it reaches ½ of the bus voltage value or ½ the power supply voltage. Once the zero-cross of the open-phase voltage is reached during the present sector, controller 230 sets the commutation leading edge 280 of the next sector, which cuts off the upward slope of the open-phase voltage. This is shown, for example, at 90 degrees for the PV phase signal, where the PV phase signal transitions instantly from an upward-sloping open-phase voltage signal to a drive voltage signal. PV is driven at a 120-degree conduction band, i.e., until controller 230 stops driving PV at 210 degrees, at which points the V phase becomes a floating open phase again. The commutation trailing edge 282 is set when the PW open-phase voltage reaches ½ of the bus voltage value or ½ the power supply voltage, i.e., at or approximately close to the leading edge of the W phase commutation.

At the beginning of the open phase beginning at 210 degrees, PV phase signal exhibits a voltage pulse 284 followed by a period 286 where its voltage is high. The duration of the voltage pulses 284 and period 286 are merely exemplary in this figure and may vary depending on the motor torque and power requirements. This voltage pulse 284 and the ensuing period 286 result from interaction of induced voltages between various stator windings described above. After the period 286, which in this example is at 240 degrees, the back-EMF voltage on the PV open-phase signal begins to fall. In an embodiment, controller 230 samples the PV open-phase voltage periodically to detect its zero-crossing. As discussed above, the zero-crossing is detected when the PV open-phase voltage becomes equal to or less than 50% of the bus voltage. This point corresponds to 270 degrees of rotor rotation. At this point the controller 230 begins commutating the next sector with a 30-degree advance angle, causing the PV phase signal to instantly transition from the downward-sloping open-phase voltage to zero.

The above embodiment discloses controlling motor commutation sensorlessly using the motor back-EMF voltage signals at a 30-degree advance angle. In an embodiment, controller 230 can implement variable advance angle of less than or greater than 30 degrees by varying the commutation of the following cycle relative to the open-phase voltage, as described below with reference to FIGS. 27 and 28. In each example, controller 230 sets the commutation leading edge as V_bus*a, where V_bus denotes the voltage of the DC bus line or the voltage of the power supply, and a is in the range of 0 to 1 and is calculated based on the desired advance angle and/or conduction band.

Figure 27:
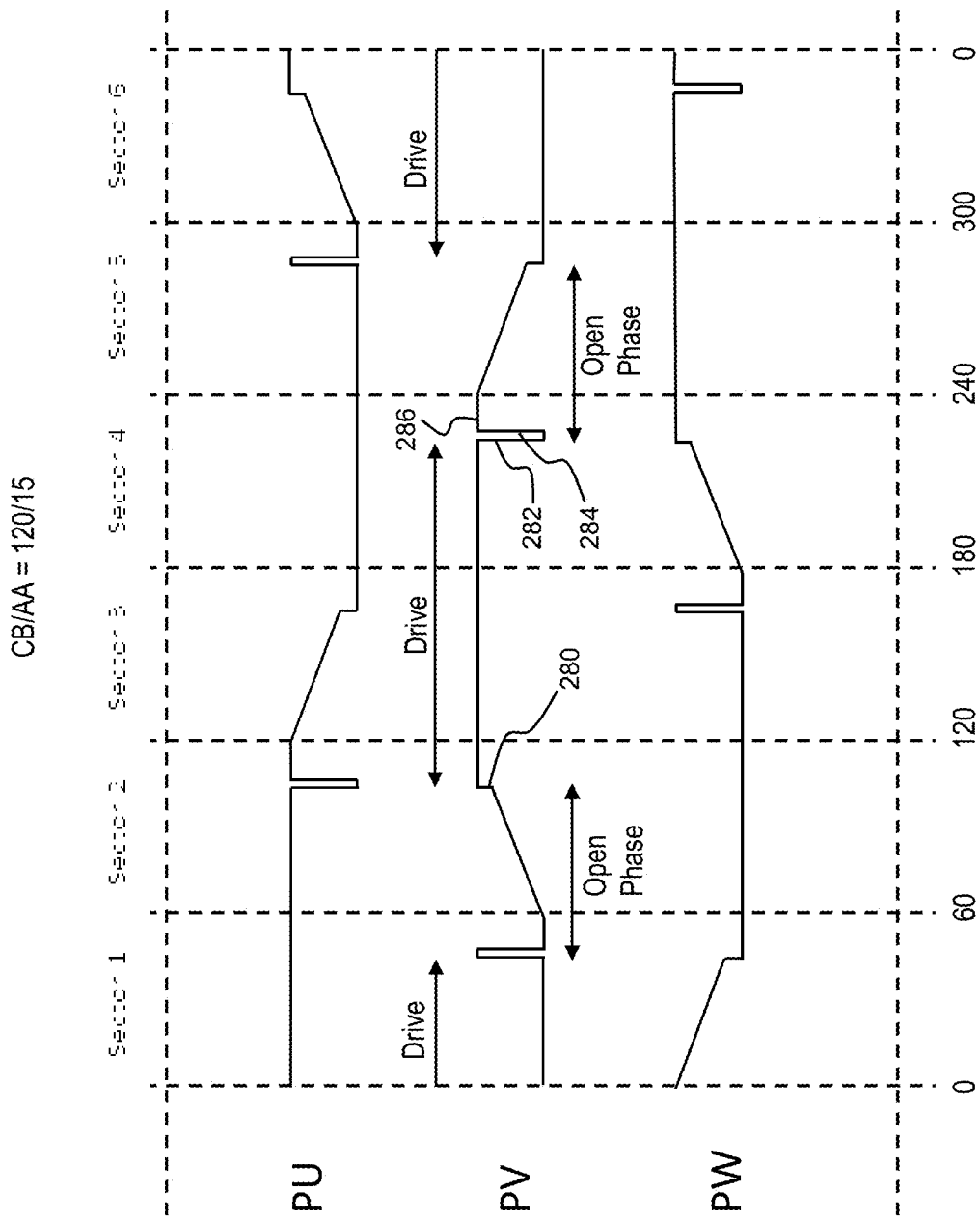
FIG. 27 depicts an exemplary waveform diagram showing the motor voltage signals with a conduction band/advance angle of 120/15 degrees used for sensorless motor control, according to an embodiment.

FIG. 27 depicts an exemplary waveform diagram similar to FIGS. 25 and 26, but with an advance angle of between 0 to 30 degrees, in this example 15-degrees (i.e., CB/AA=120/15), according to an embodiment. In an embodiment, to control the motor with an advance angle of x degrees where 0<x<30, the controller 230 transitions the open phase to active drive at (30−x) degrees after the zero-crossing. This is accomplished by setting the commutation rising edge 280 to V_bus*0.75. In the example of FIG. 27, the transition is made at 15 degrees after the zero-crossing, which results in a 15-degree advance angle relative to the beginning of the next sector.

Figure 28:
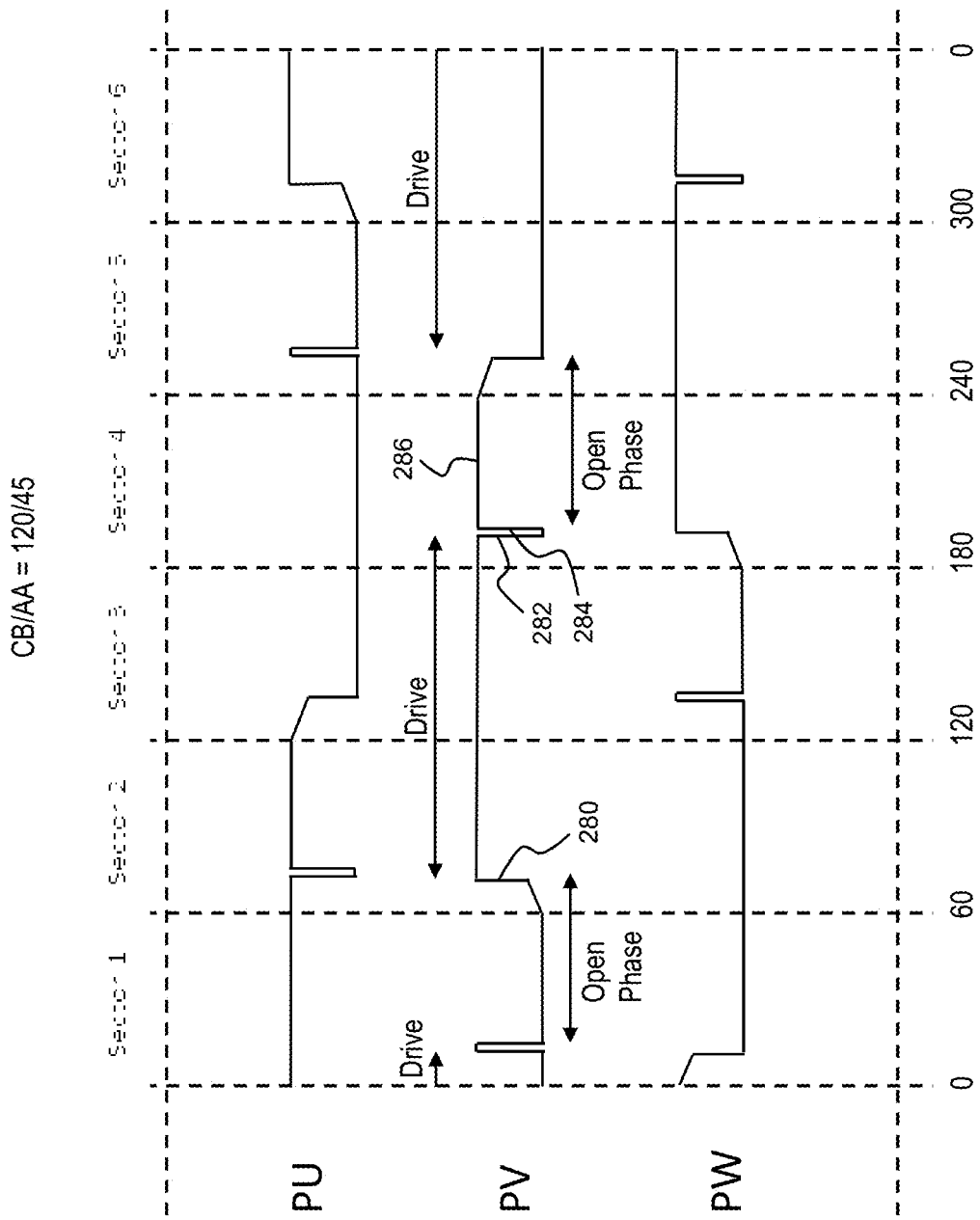
FIG. 28 depicts an exemplary waveform diagram showing the motor voltage signals with a conduction band/advance angle of 120/45 degrees used for sensorless motor control, according to an embodiment.

FIG. 28 depicts an exemplary waveform diagram similar to FIGS. 25 and 26, but with an advance angle of between 0 to 60 degrees, in this example 45-degrees (i.e., CB/AA=120/45), according to an embodiment. To control the motor commutation with an advance angle of x degrees where 0<x<60, the controller 230 transitions the open phase to active drive at (60−x) degrees after the beginning of the present sector, i.e., after the beginning of the upward-sloping or downward-sloping open phase voltage. This is accomplished by setting the commutation rising edge 280 to V_bus*0.25. In the example of FIG. 28, the transition is made at 15 degrees after the beginning of the present sector, which results in a 45-degree advance angle relative to the beginning of the next sector.

Figure 29:
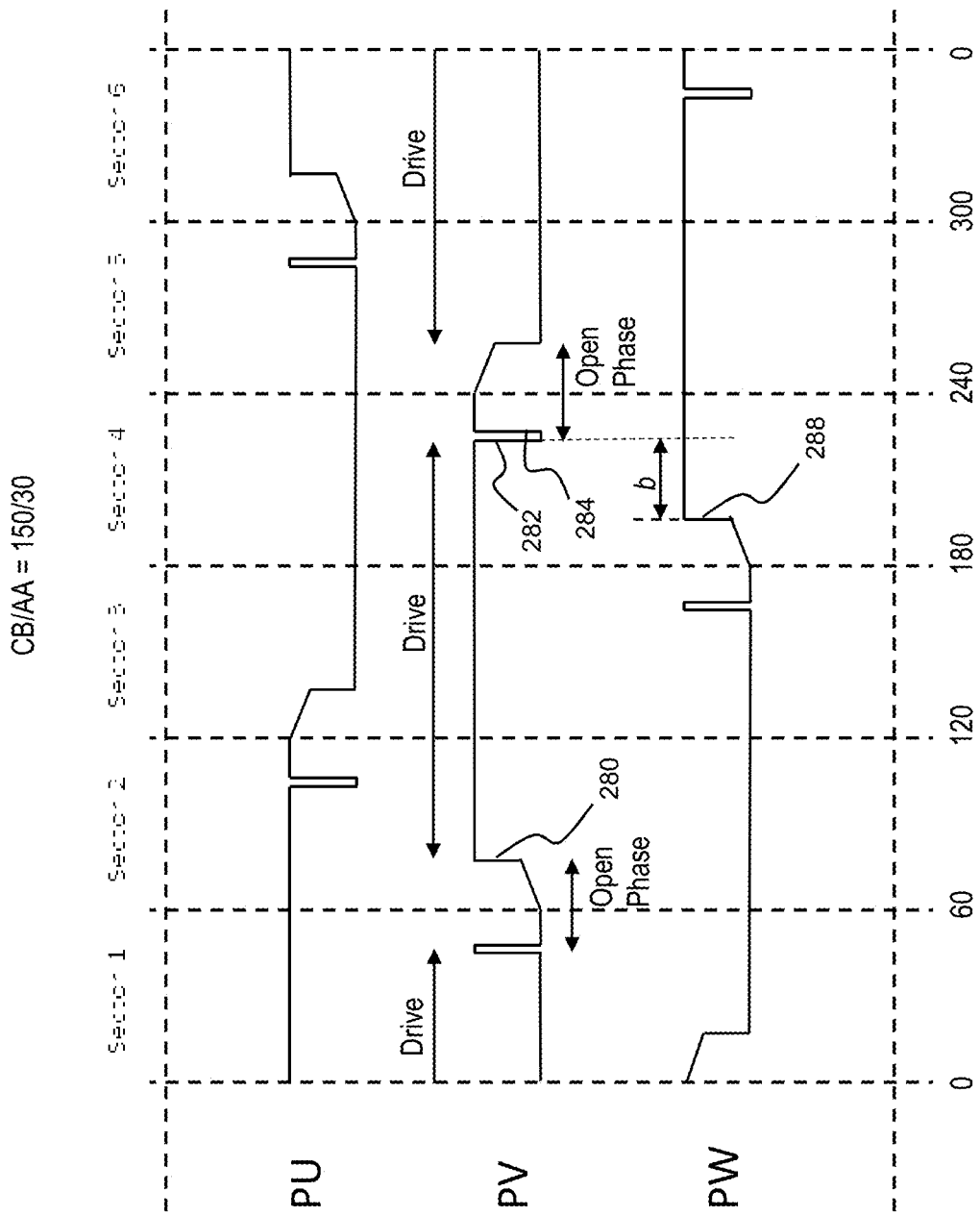
FIG. 29 depicts an exemplary waveform diagram showing the motor voltage signals with a conduction band/advance angle of 150/30 degrees used for sensorless motor control, according to an embodiment.

FIG. 29 depicts an exemplary waveform diagram similar to FIGS. 25 and 26, but with an increased conduction band of 150-degrees. In an embodiment, controller 230 expands the leading and trailing edges of each conduction band by an additional 15 degrees for a total of 150-degree conduction. Expanding the leading and trailing edges equally allows for maintaining the advance angle at 30 degrees despite the shift in the leading edge (i.e., CB/AA=150/30). In other words, while the leading and trailing edges of each conduction band are shifted in comparison to FIG. 26, the centerline of each conduction band remains the same, thus maintaining the same advance angle.

In an embodiment, to control motor commutation with expanded conduction band, controller 230 calculates the leading edge as a function of the open phase voltage relative to the bus voltage. For example, in FIG. 29, the commutation leading edge 280 of the V phase is set when the PV open-phase voltage is equal to or greater than V_bus*0.25, which corresponds to the 75 degree position within sector 2.

In an embodiment, controller 230 calculates the trailing edge as a function of the leading edge of the next phase commutation+b, where b=CB−120. For example, in FIG. 29, the leading edge 288 of the W phase commutation cycle is at 195 degrees, so the trailing edge 282 of the V phase is enforced at 195+(150−120)=225 degrees of rotation. Controller 230 may use a counter that is based on the rotational speed of the motor to apply the trailing edge of the V phase b degrees after the leading edge of the W phase.

In an alternative embodiment, controller 230 may calculate the trailing edge as a function of an extrapolation of the open phase voltage relative to the bus voltage. For example, in FIG. 29, the commutation trailing edge 282 of the V phase is set when an extrapolation of PW open-phase voltage is equal to or greater than V_bus*0.75, which corresponds to 225 degrees of rotation.

In an embodiment, controller 230 may set variable conduction band and/or advance angle as a function of an instantaneous measure of the open-phase voltage relative to its maximum values (i.e., bus voltage or power source voltage). Controller 230 may adjust the commutation leading edge as a function of V_bus*a, where a becomes smaller as a combination of conduction band and advance angle requires shifting the leading edge 280 closer to the beginning of the open phase. In an embodiment, the conduction band and advance angle may be expanded as long as the sampling frequency of the open-phase voltage enables the controller 230 to detect a slope on the open-phase voltage waveform before the open-phase voltage reaches V_bus*a. The value a may be calculated as a mathematical function of conduction band and/or advance angle, or using a look-up table as exemplified in Table 1 below.

TABLE 1

| a | CB | AA |
|---|---|---|
| 1 | 120 | 0 |
| 0.75 | 120 | 15 |
| 0.5 | 120 | 30 |
| 0.25 | 120 | 45 |
| 0.25 | 150 | 30 |
| 0.125 | 150 | 37.5 |
| 0.125 | 165 | 30 |

In an embodiment, variable conduction band and/or advance angle may be used to increase power to the motor. One such application is closed-loop speed control, where the motor conduction band and/or advance angle is varied as the loan on the motor increases in order to minimize the differential between the actual output speed and a target speed of the motor (e.g., as set by a trigger switch or speed dial in variable-speed power tools).

Figure 30:
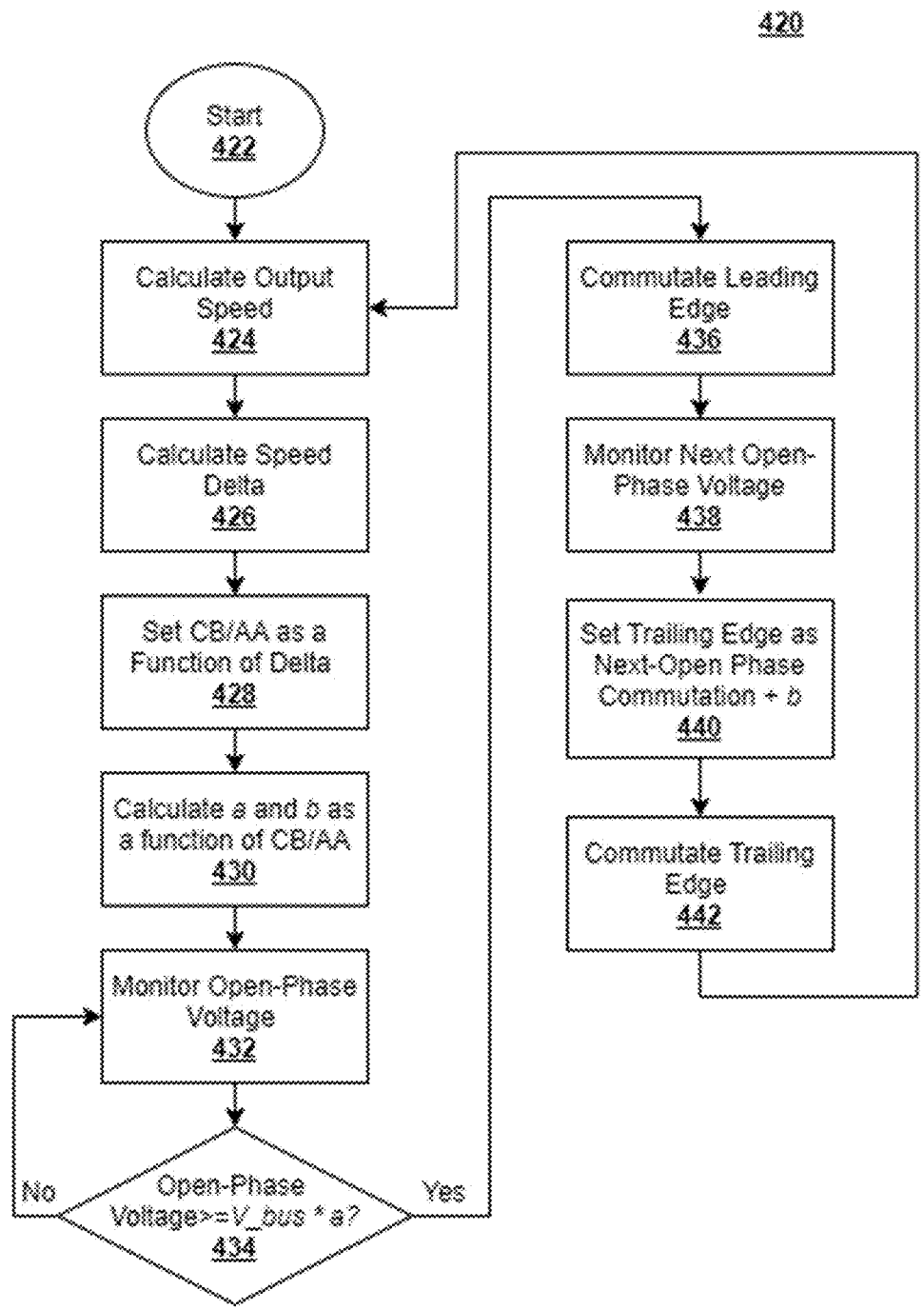
FIG. 30 depicts an exemplary flow diagram for process executed by controller to apply variable conduction band and/or advance angle in sensorless trapezoidal motor control of a multi-phase motor, according to an embodiment.

FIG. 30 depicts an exemplary flow diagram for process 420 executed by controller 230 to apply variable conduction band and/or advance angle in sensorless trapezoidal motor control of a multi-phase motor, according to an embodiment. In an embodiment, starting at 422, controller 230 calculates motor output speed using the methods disclosed above at 424. In an embodiment, controller 230 calculates a different (delta) between the calculated motor speed and a target motor speed at 426. In an embodiment, controller 230 sets a conduction band/advance angle (CB/AA) value based on the calculated delta at 428. The CB/AA may be set to a value greater than a baseline value of 120/30 degrees in order to supply more power to the motor, thus increasing the rotational speed of the motor to match the target speed. In an embodiment, controller 230 calculates values a and b as functions of the set CB/AA at 430. Value a, as described above, denotes a fraction of the open-phase voltage and is in the range of 0 to 1, preferably greater than or equal to ⅛, more preferably greater than or equal to 1/16, and even more preferably greater than or equal to 1/32. The value b, as described above, is equal to CB−120.

In an embodiment, controller 230 monitors the open-phase voltage at 432 and compares the instantaneous measure of open-phase voltage to v_bus*a at 434. If the open-phase voltage is greater than or equal to v_bus*a, controller 230 sets the commutation leading edge to begin commutating at 436. Controller 230 begins to monitor the next open-phase voltage at 438. Controller 230 sets the trailing edge of the commutation cycle within b degrees of the leading edge of the next phase commutation cycle at 440. The b degree period is enforced using a counter that operates as a function of the motor output speed at 442. The process continues at 424.

Figure 31:
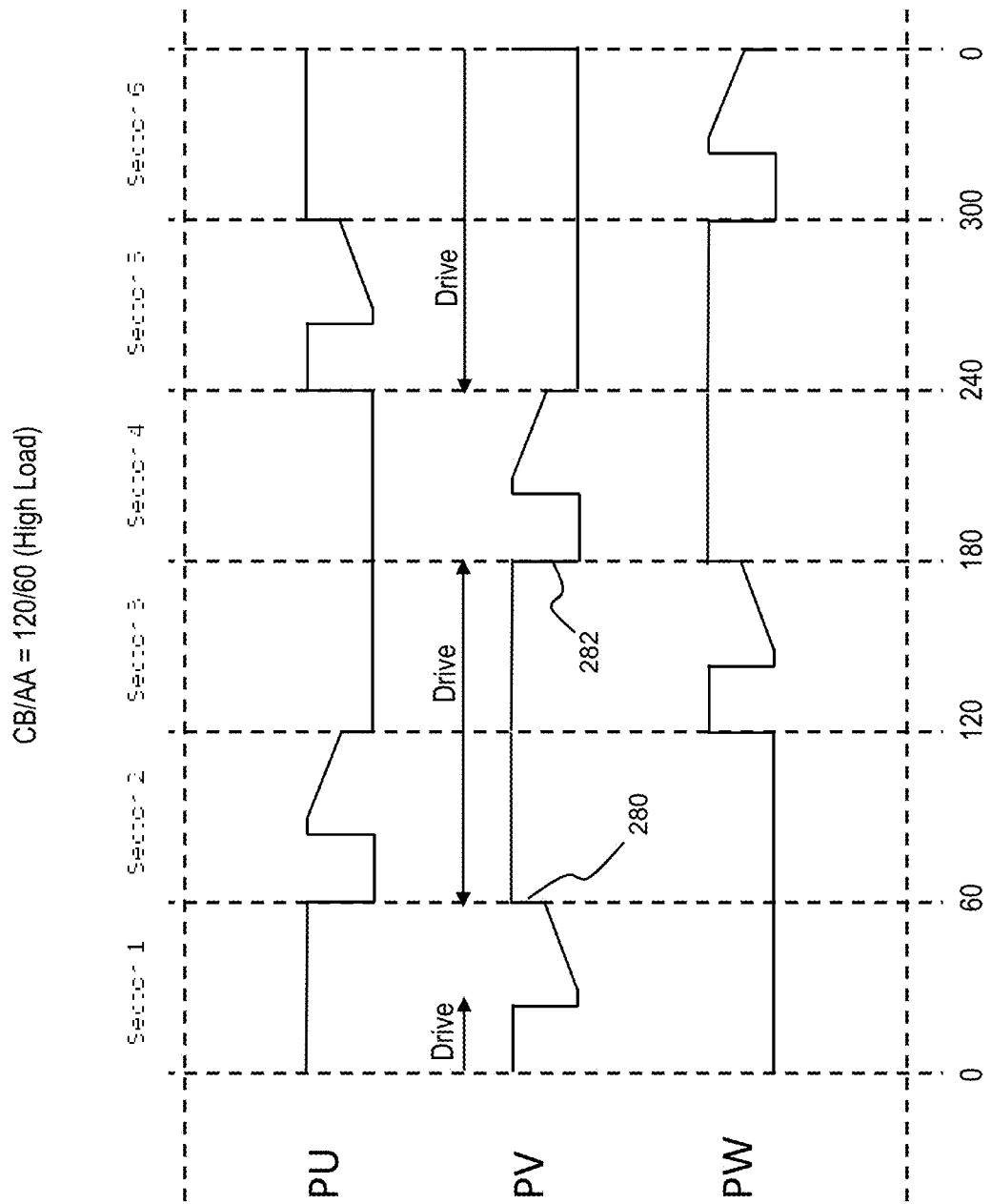
FIG. 31 depicts an exemplary waveform diagram showing the motor voltage signals with a conduction band/advance angle of 120/30 degrees at high load, according to an embodiment.

FIG. 31 depicts an exemplary waveform diagram showing the motor voltage signals exhibiting a conduction band/advance angle of 120/60 degrees, where high current yields an additional 30 degree of advancing, according to an embodiment. In this embodiment, controller 230 drives the motor at a CB/AA of 120/30 degrees. As explained above, due to higher currents in the stator windings at higher load, the current in the open phase takes longer to fully decay, resulting in greater time of the voltage pulses in comparison to FIG. 26. It was found that by the inventors of this applications that in some power tools, under heavy load, a combination of larger voltage pulses and other motor characteristics lead to an additional advance angle of up to 30 degrees. This can be seen in FIG. 31, where the open-phase voltage waveforms exhibit a 30-degree shift in comparison to FIG. 26. Thus, even though controller 230 intends to drive the motor at CB/AA of 120/30 degrees, motor is inadvertently driven at CB/AA of 120/60 degrees at high load.

If controller 230 intends to drive the motor at CB/AA of over 120/30 degrees, for example at 150/45, the effective advance angle on the motor will be 75 degrees. This means the controller 230 begins commuting, for example, sector 3 while the rotor is still physically in sector 1. In an embodiment, advance angle of more than 60 degrees is not practical. What is needed is a scheme to increase the conduction band, particularly at high load where it is desirable to increase power input into the motor, while avoiding the associated increase in advance angle beyond 60 degrees.

Accordingly, in an embodiment of the invention, in order to avoid advancing the rotor by more than 60 degrees under heavy load, controller 230 is configured to increase the conduction band by maintaining the leading edge of the conduction band and shifting only the trailing edge of the conduction band to increase the conduction band from 120 degrees.

Figure 32:
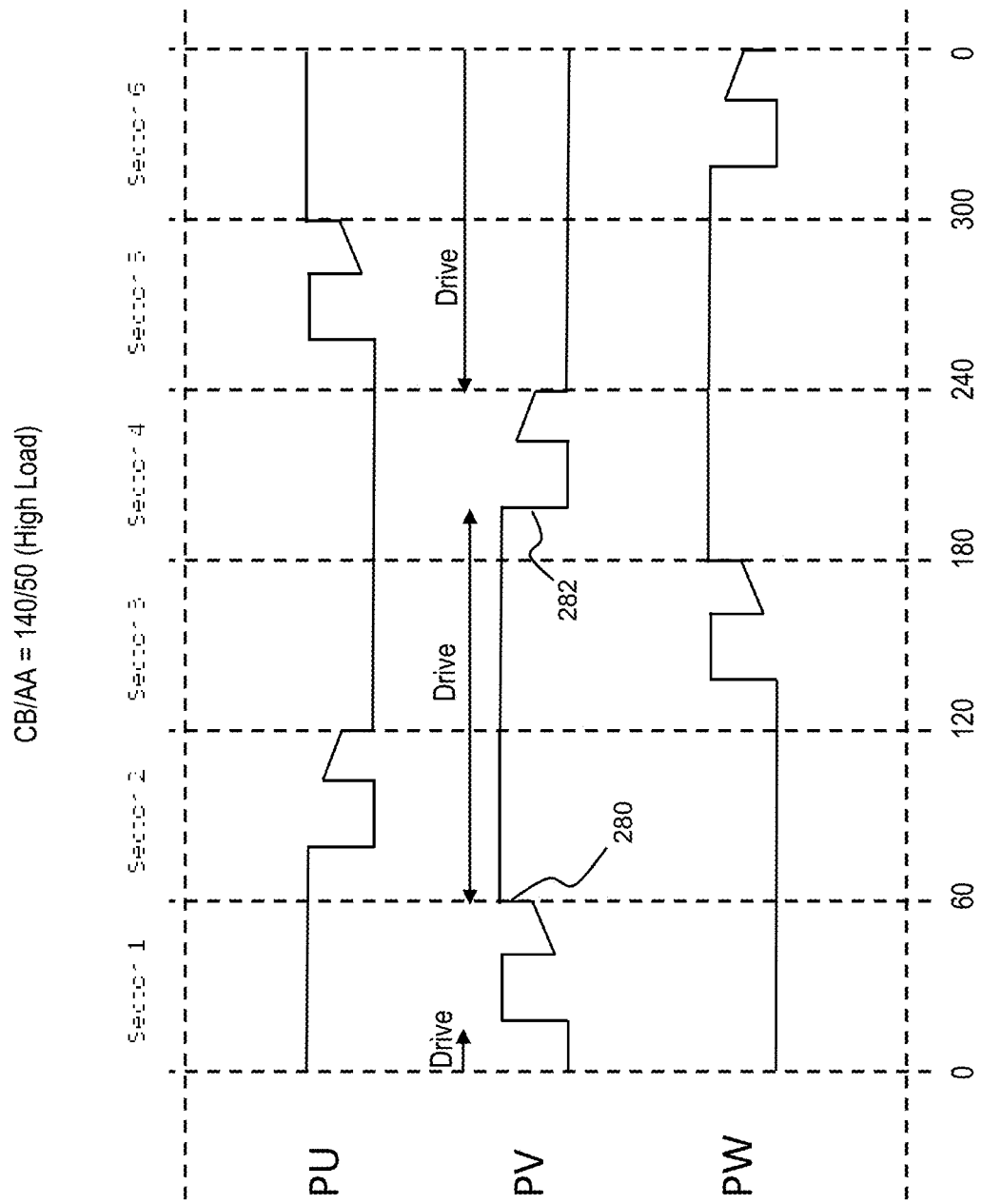
FIG. 32 depicts an exemplary waveform diagram similar to FIG. 32, but with the trailing edge of the conduction band shifted by 20 degrees to achieve a conduction band/advance angle of 150/30 degrees, according to an embodiment.

FIG. 32 depicts an exemplary waveform diagram similar to FIG. 31, but with the trailing edge of the conduction band shifted by 20 degrees to achieve a conduction band of 140 degrees, in an embodiment. In this embodiment, a total CB/AA of 140/50 degrees is exhibited. As shown, the leading edge 280 (e.g., 60 degrees for the V phase) remains unchanged in FIGS. 31 and 32, but the trailing edge 282 is shifted by 20 degrees (e.g., from 180 degrees in FIG. 31 to 200 degrees in FIG. 32). The trailing edge 282 is succeeded by an open-phase period including wider voltage pulse, followed by a shortened voltage slope that begins at a lower magnitude than the drive voltage signal and ends at the point of zero-cross detection. This configuration ensures that the leading edge is not advanced more than 60 degrees in spite of the motor's inherent added angle advancing of up to 30 degrees under high load.

Secondary Controller for Sensorless Detection of Speed and/or Direction

As described above with reference to FIGS. 4 and 5, in an embodiment of the invention, a secondary controller 250 is provided in addition to controller 230. Secondary controller 250 senses speed and/or direction of the motor and acts as a secondary safety check to protect the tool and the user against inadvertent high motor speed and incorrect direction of rotation. The secondary controller 250 is described here in detail.

In an embodiment, as described above, secondary controller 250 may be a microprocessor or microcontroller chip, for example an 8-bit micro-controller (such as a PIC10F200 Microchip®) that is smaller and less expensive than controller 230. Controller 230 and secondary controller 250 may be mounted on the same circuit board or separate circuit boards disposed in different parts of the power tool 10.

With continued reference to FIGS. 4 and 5, in an embodiment, like controller 230, secondary controller receives a low-voltage supply of power from the power supply regulator 234. It also receives three voltage signals corresponding to phases of the motor 16 from the LPF 242. However, unlike controller 230, secondary controller 250, secondary controller 250 does not control motor commutation or other power tool control functions. Rather, in an embodiment, secondary controller 250 is merely programmed to determine the speed and rotational direction of the motor 16 based on the voltage signals from the LPF 242, and to shut down power to the motor 16 in the event it detects an overspeed condition or incorrect rotation of the motor 16. In an embodiment, secondary controller 250 is provided with a pre-set upper speed threshold which, when exceeded, causes the secondary controller 250 to take corrective action to shut off power to the motor 16. Alternatively, secondary controller 250 may receive a speed signal from a speed dial or trigger switch of the power tool 10, sets a target speed according to the speed signal, and takes corrective action to shut off power to the motor 16 when the speed of the motor exceeds the target speed. In an embodiment, secondary controller 250 shuts off power to the motor 16 by activating a disable signal that disables the gate driver 232. Secondary controller 250 ensures, that in the event of electrical or software failure by the controller 230, the motor 16 does not continue operating at high speed or incorrect direction.

In an embodiment, secondary controller 250 is programmed to determine which of the three voltage signals is the open-phase voltage based on the shape of the three voltage signals. A phase signal that is in pulse-width modulation is being actively driven by the controller 230, whereas a phase signal that is sloped is the open-phase signal carrying the motor back-EMF. Secondary controller 250 in this manner monitors the motor back-EMF and, based on the frequency of the back-EMF zero-crossings, and the sequence of the open phases, it determines the speed and direction of rotation of the motor 16. Secondary controller 250 may also monitor the zero-crossing on only one of the three signals to determine the speed of the motor, and on two of the signals to determine its direction of rotation.

In an embodiment, instead of detecting the zero-crossings of the voltage waveforms, the secondary controller may detect other characteristics of the voltage signals as they transition from high to low or low to high. this manner, secondary controller 250 protects the power tool 10 from system failure without commutating the motor 16 or even receiving the motor commutation signals.

Figure 33:
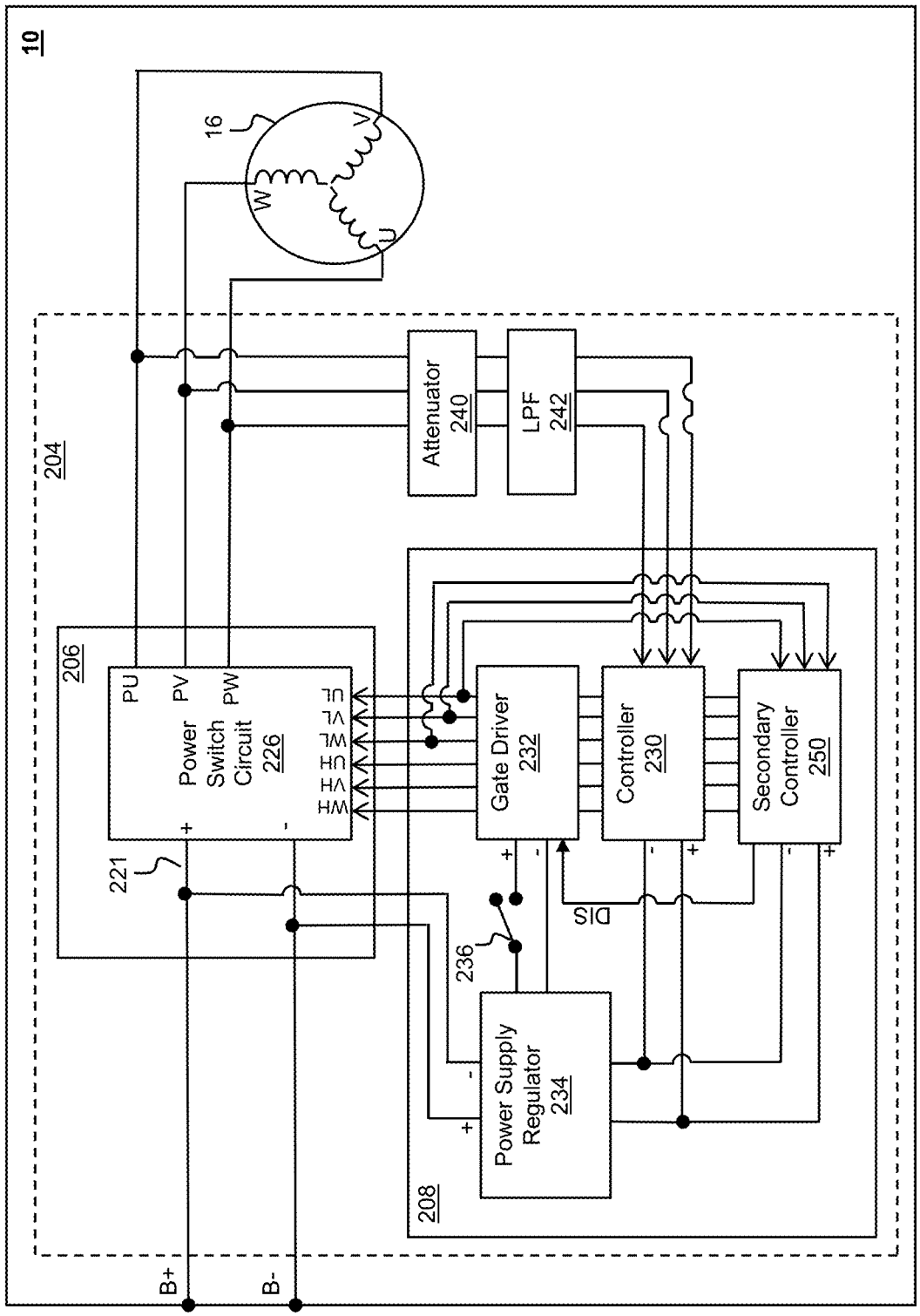
FIG. 33 depict an exemplary circuit block diagram of power tool similar to FIG. 5 but including an alternative secondary controller connectivity, according to an embodiment.

FIG. 33 depict an exemplary circuit block diagram of power tool 10 that similar in many aspects to FIG. 5 above, except that secondary controller 250 does not detect motor speed or direction of rotation based on back-EMF signals. Rather, in this embodiment, secondary controller 250 receives at least two (or more) of the motor drive signals (i.e., controller 230 output signals or gate driver 232 output signals) and determines motor speed and rotation direction based on the frequency and sequence of said signals. It is noted that at least two drive signals are needed to determine the direction of rotation of the motor, though motor speed alone can be calculated based on a single drive signal.

In an exemplary embodiment as shown in FIG. 33, secondary controller 250 receives two gate driver signals UL and VL, which as shown in FIG. 6 are the gate drive inputs to low-side power switches S1b and S2b. Since the high-side gate drivers are used for PWM control, the low-side gate drivers are better suited for monitoring the transition points between adjacent sectors.

In an embodiment, one of the two gate driver signals UL or VL is used for monitoring the speed. For example, secondary controller 250 may be programmed to monitor the rising edge of the UL signal and determine the motor speed based on the frequency of the monitored rising edges.

The technique described above is most suitable when the low-side gate driver signals are not subject to PWM control. However, when using synchronous rectification (as described later in detail) or other de facto PWM control on the low-side gate drivers, secondary controller 250 may be unable to detect the correct leading edge of the gate drive signals uniformly from one electrical period to the next as a result of high frequency of the PWM signals. This affects the reliability of speed and/or direction determination by the secondary controller 250. Thus, in an embodiment, secondary controller 250 uses a filtering and processing technique to enhance its ability to detect accurate speed and direction and rotation, as described here. In this technique, secondary controller 250 receives all three high-side gate driver signals, or all three low-side gate driver signals, outputted from the gate driver 232.

Figure 34:
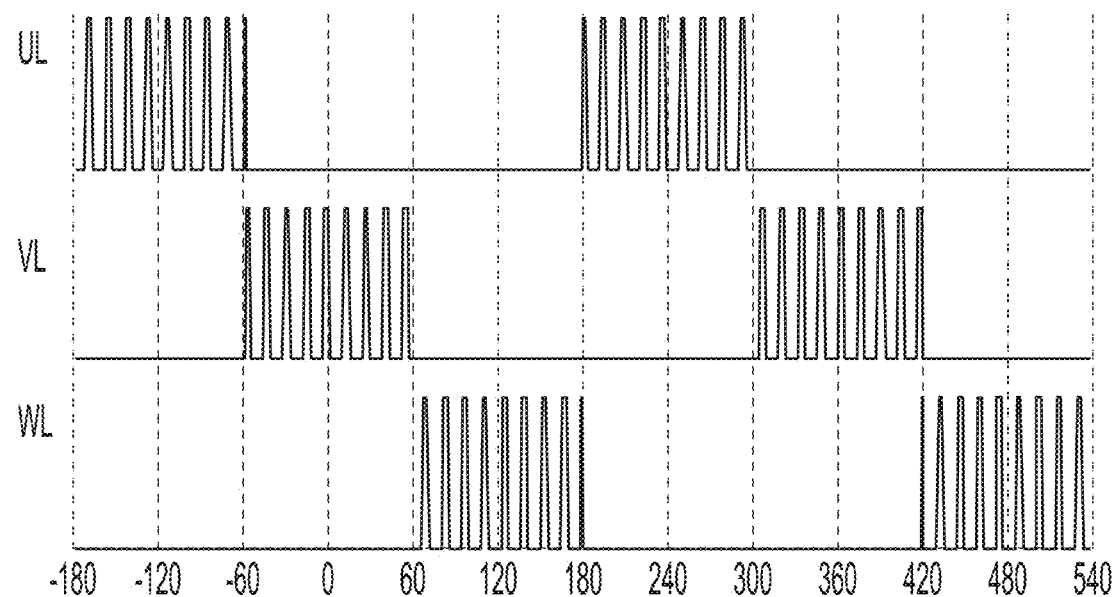
FIG. 34 depicts a waveform diagram of low-side gate driver signals driven with PWM control, according to an embodiment.
Figure 35:
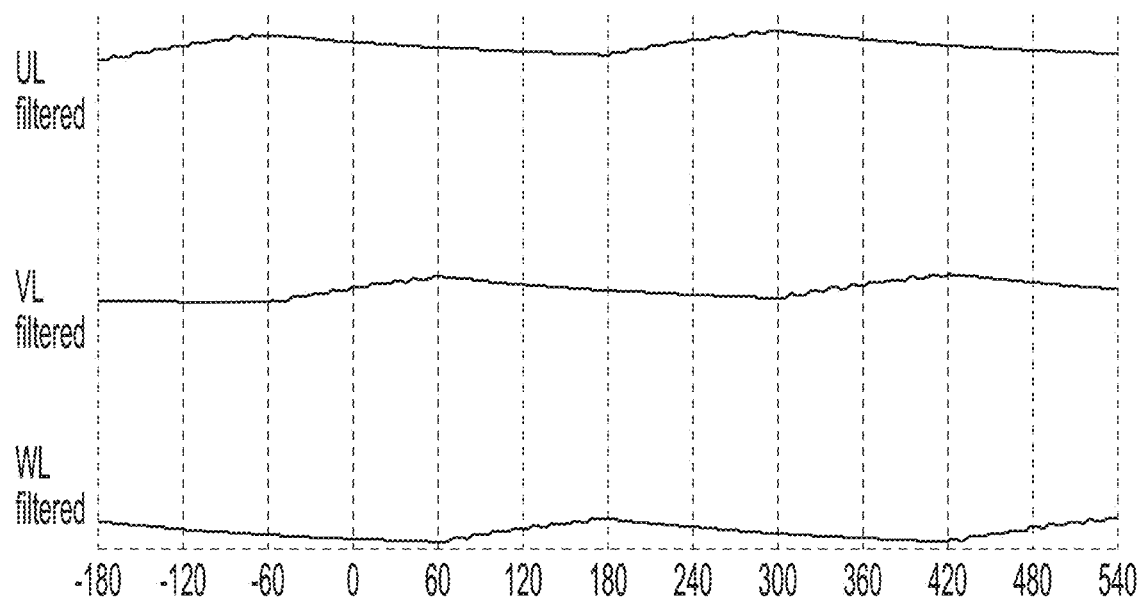
FIG. 35 depicts a waveform diagram of the low-side gate drive signals after low-pass filtration, according to an embodiment.
Figure 36:
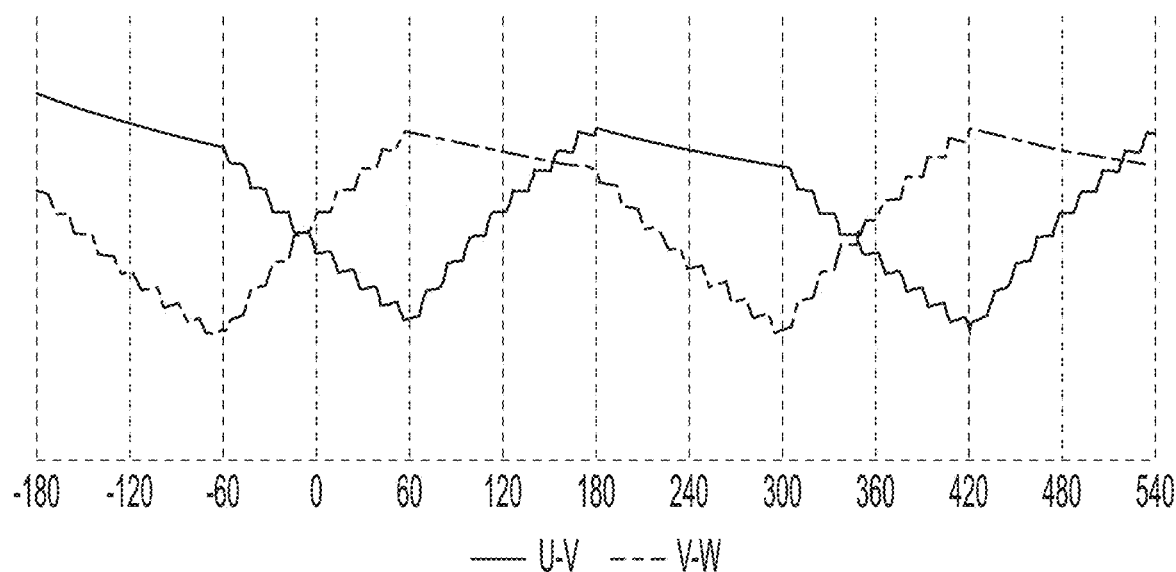
FIG. 36 depicts a waveform diagram of the two sinusoidal waveforms obtained from the three low-side gate drive signals, according to an embodiment.

FIG. 34 depicts a waveform diagram of gate driver signals UL, VL and WL driven with PWM control, according to an embodiment. In an embodiment, these voltage signals are divided down through a voltage divider (not shown) to obtain voltage levels compatible with the secondary controller 250. Further, an analog low-pass filter (not shown) similar to LPF 242 is used remove significant portions of high frequencies from the gate drive signals UL, VL and WL. FIG. 35 depicts a waveform diagram showing the analog-filtered signals UL, VL and WL. Secondary controller 250 further processes these signals by subtracting the drive signals from one another, e.g., UL−VL, and VL−WL, to obtain two analog waveforms. This is shown in FIG. 36 by way of example. In an embodiment, any two independent subtractions of U, V, and W, will suffice for this implementation.

Subtracting the successive drive signals from one another is particularly beneficial in sensorless control schemes such as field-oriented control (FOC). In such schemes, for improved operation of a three-phase brushless motor, a technique called field weakening is often employed. Field weakening is accomplished by introducing a small quantity of a third harmonic of the fundamental frequency into the fundamental drive signal. The third harmonic has a frequency three times the frequency of the fundamental frequency. Each phase receives the same amount of third harmonic injection. Because each phase is separated by 120 degrees, or one-third, of the period of the fundamental frequency, and because the third harmonic has a period of one-third of the period of the fundamental frequency, subtracting two phases has the effect of exactly cancelling out the injected third harmonic, thus rendering the resultant a more pure fundamental sinewave. If there is no third harmonic injection, the subtraction scheme described above still acts the construct two resultant waveforms from the three drive signals.

Figure 37:
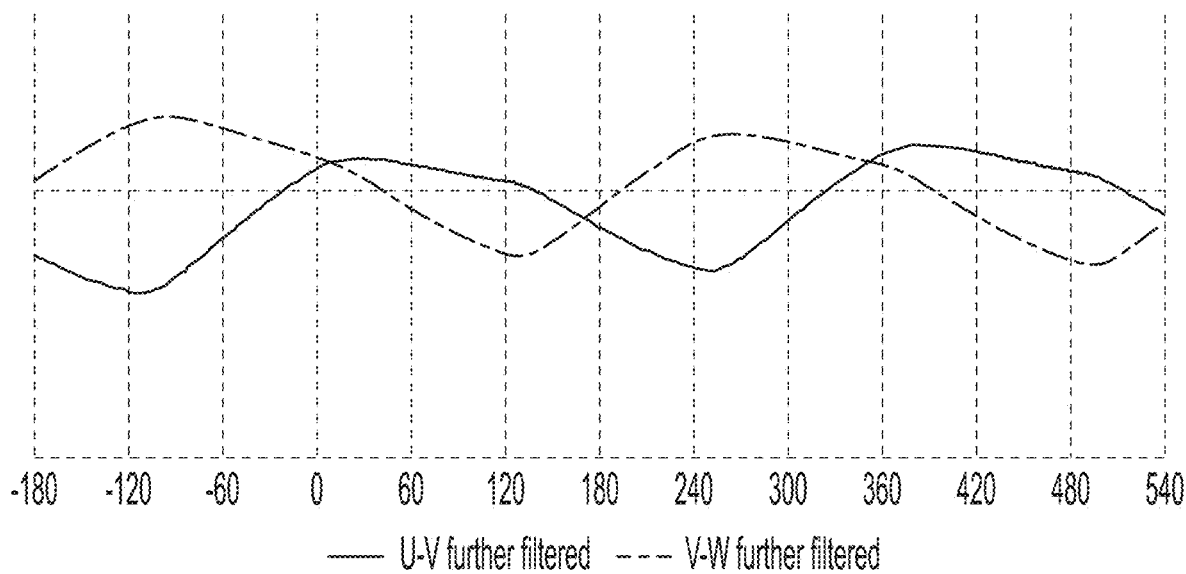
FIG. 37 depicts a waveform diagram of the two sinusoidal waveforms after further filtration used for speed and direction detection, according to an embodiment.

In an embodiment, secondary controller 250 further processes the two resultant waveforms with additional digital filtering to improve the sinusoidal quality of the analog waveforms, as shown in FIG. 37 by way of example. In an embodiment, secondary controller 250 uses these sinusoidal waveforms to determine the speed and direction of rotation of the motor 16. In an embodiment, secondary controller 250 may calculate speed by examining a frequency of upward-sloping zero-crossing of the one of the waveform signals. Similarly, secondary controller 250 may calculate direction of rotation by examining the sequence of upward-sloping zero-crossings of the two waveform signals. The resultant sinusoidal waveforms provide the secondary controller 250 with reliable means to detect speed and rotation of direction as compared to unprocessed gate drive signals.

While examples provided herein depict and describe sensorless brushless motor control systems, it should be understood that the embodiments executed by secondary controller 250 described here may also be employed in a system where controller 250 detects rotor position uses position sensors (e.g., Hall sensors). In other words, while secondary controller 250 of this disclosure detects speed and rotation direction of the motor 16 without positional sensors, controller 230 may execute either a sensor or sensorless control execution.

Figure 38:
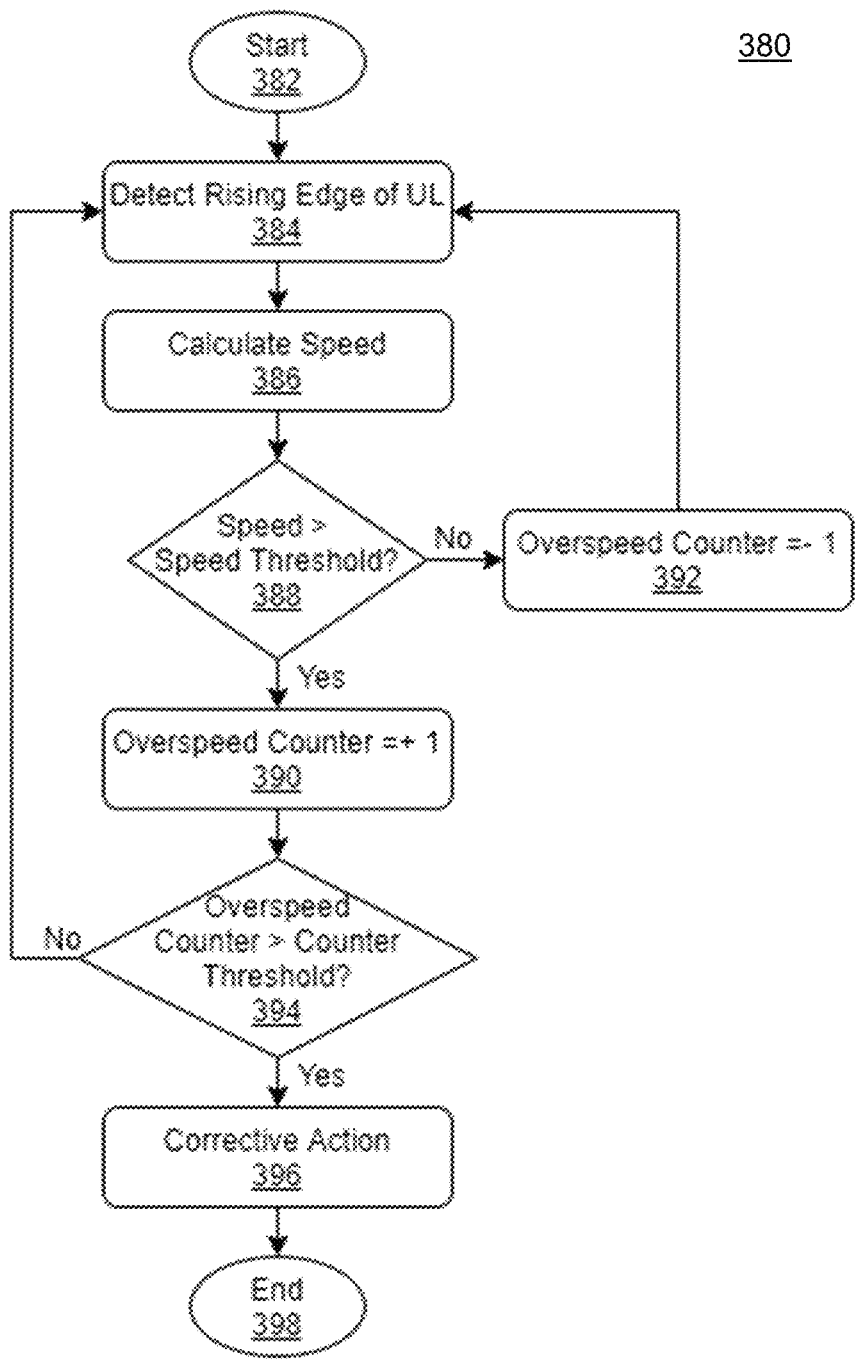
FIG. 38 depicts an exemplary flow diagram for process executed by the secondary controller to determine motor speed, according to an embodiment.

FIG. 38 depicts an exemplary flow diagram for process 380 executed by secondary controller 250 to determine motor speed. In an embodiment, in process 380, starting with 382, secondary controller 250 detects monitors the UL signal to detect the rising edge within each rotation of the motor at 384. Secondary controller 250 calculates the speed of the motor based on the frequency of the rising edge of the UL signal at 386. The shorter the time between consecutive rising edges of the UL signal, the faster the speed of rotation. Secondary controller 250 compares the calculated speed to a speed threshold at 388. Each time secondary controller 250 determines that an overspeed has taken place, it increments an overspeed counter at 390 (overspeed counter is set to 0 at start point 382). If an overspeed event is not detected at 388, the overspeed counter is decremented until it reaches 0. This is done to ensure that a certain number of overspeed events are detected before corrective action is initiated by secondary controller. After the overspeed counter is incremented at 390, the overspeed counter is compared to a counter threshold at 394. If the overspeed counter is greater than the counter threshold, secondary controller 250 determines that an overspeed condition has occurred continuously over at least several rotations of the motor and initiates corrective action at 396. The process ends at 398.

In an embodiment, corrective action by the secondary controller 250 may be to disable the gate driver 232, disable the controller 230, disable the power supply regulator 234, or disable supply of power to the motor by shutting off a switch (not shown) along the current path. Alternatively, corrective action may entail braking the motor as will be described later in detail.

In an embodiment, both gate driver signals are used for determining the direction of rotation of the rotor. For example, secondary controller 250 may be programmed to monitor the rising edges of the UL and VL signals and determine the direction of rotation of the rotor based on the sequence of the monitored rising edges.

Figure 39:
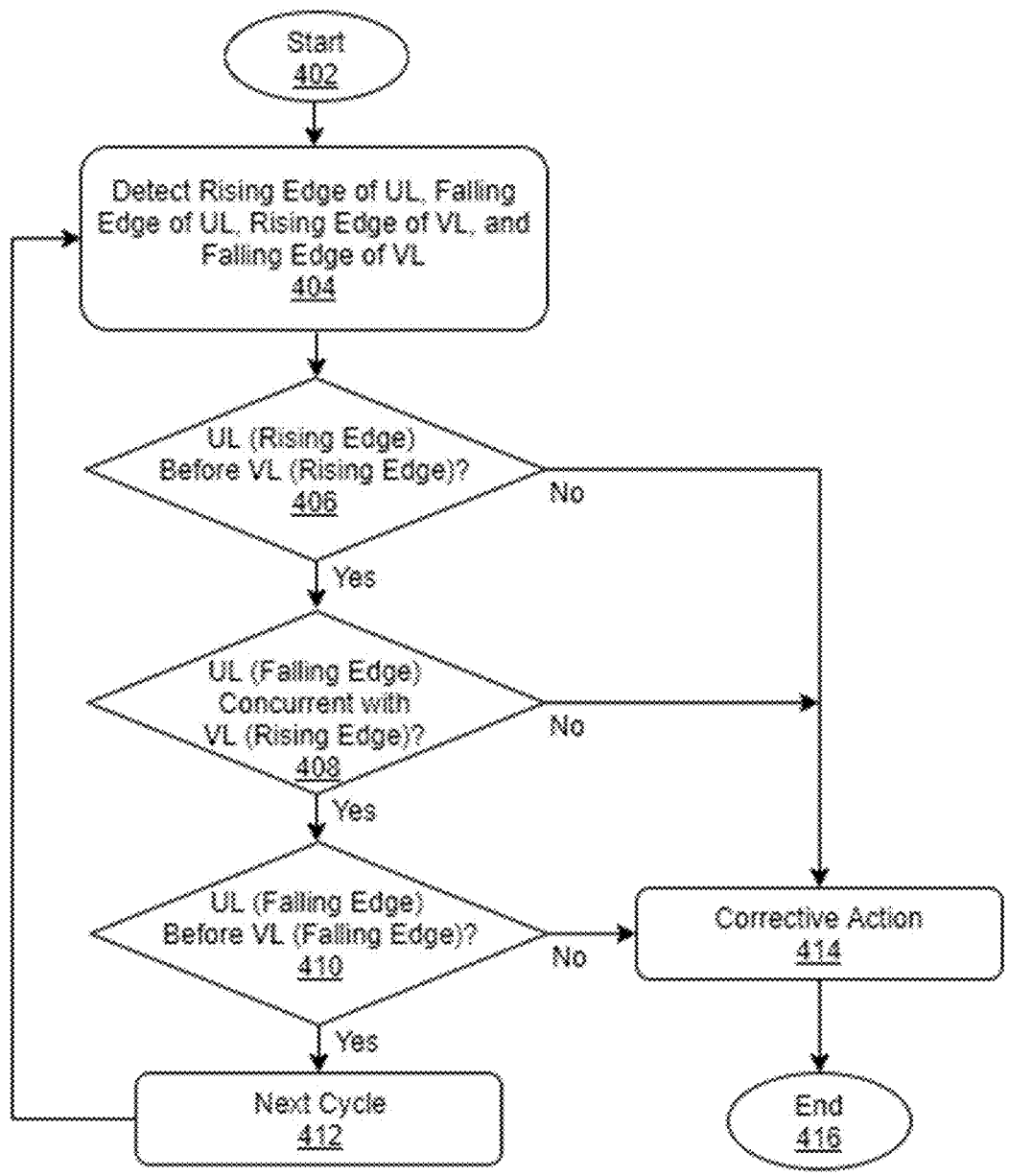
FIG. 39 depicts an exemplary flow diagram for process executed by the secondary controller to determine whether the rotor is rotating in an incorrect direction, according to an embodiment.

FIG. 39 depicts an exemplary flow diagram for process 400 executed by secondary controller 250 to determine whether the rotor is rotating in an incorrect direction. In an embodiment, in process 400, starting with 402, secondary controller 250 detects monitors the rising and falling edges of the UL and VL signals within each rotation of the motor at 404. If the rising edge of UL is detected before the rising edge of VL (step 406); the falling edge of UL is detected approximately simultaneously with the rising edge of VL (step 408); and the falling edge of UL is detected before the falling edge of VL (step 410), the secondary controller 250 proceeds as normal to the next cycle at 412 and repeats this process at 404. Otherwise, the secondary controller 250 determines that the rotor is rotating in an incorrect direction and takes corrective action at 414. Once again, corrective action may be disabling one of the circuit components, shutting off supply of power to the motor, or braking the motor. The process ends at 416.

In an embodiment, similarly to overspeed detection, secondary controller 250 may implement a counter used to ensure that a reverse rotation event has occurred for several cycles before it takes corrective action at 414. The counter may be incremented every time a reverse rotation event is detected and decremented every time a reverse rotation even is not detected. Corrective action is taken only if the counter passes a counter threshold.

As previously described, motor commutation may be controlled with a conduction band different from the baseline value of 120° to control power output and speed for a given torque amount. Controlling motor commutation with a conduction band of 120° ensures that within each sector, the rising edge of one phase and the falling edge of another phase are significantly inline. However, when controller 230 executes control motor commutation with a variable conduction band, the rising edge of the next sector does not align with the falling edge of the present sector. To take this into account, according to an embodiment, secondary controller 250 adopts an alternative process 500 for detecting incorrect rotor direction, as described here.

Figure 40:
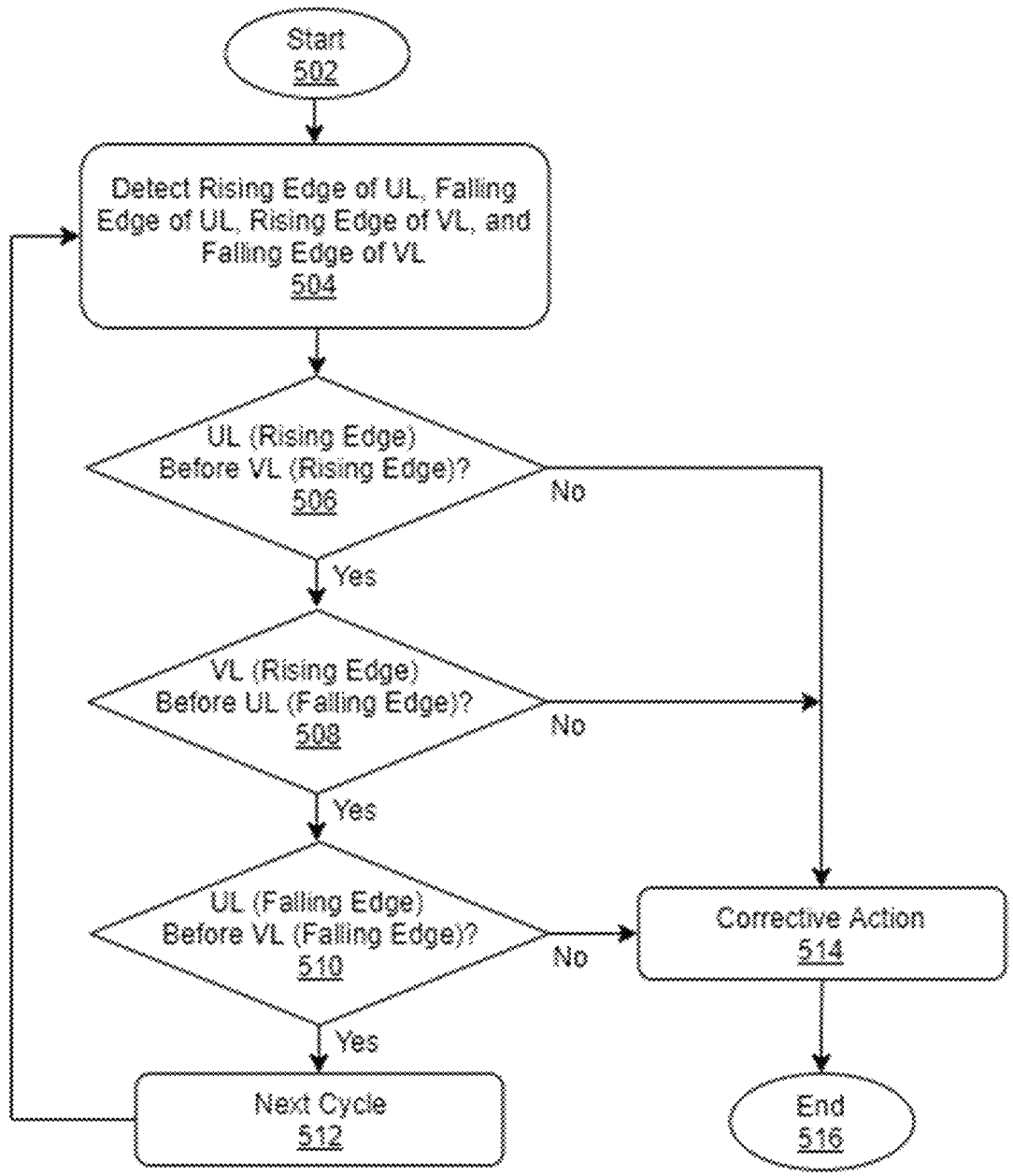
FIG. 40 depicts an exemplary flow diagram for process executed by the secondary controller to determine whether the rotor is rotating in an incorrect direction when controlling motor commutation with variable conduction band, according to an embodiment.

FIG. 40 depicts an exemplary flow diagram for process 500 executed by secondary controller 250 to determine whether the rotor is rotating in an incorrect direction, when controller 230 executes control motor commutation with a variable conduction band, according to an embodiment. In an embodiment, in process 500, starting with 502, secondary controller 250 detects monitors the rising and falling edges of the UL and VL signals within each rotation of the motor at 504. If the rising edge of UL is detected before the rising edge of VL (step 506); the rising edge of VL is detected before the falling edge of UL (step 508); and the falling edge of UL is detected before the falling edge of VL (step 510), the secondary controller 250 proceeds as normal to the next cycle at 512 and repeats this process at 504. Otherwise, the secondary controller 250 determines that the rotor is rotating in an incorrect direction and takes corrective action at 514. Once again, corrective action may be disabling one of the circuit components, shutting off supply of power to the motor, or braking the motor.

Figure 41:
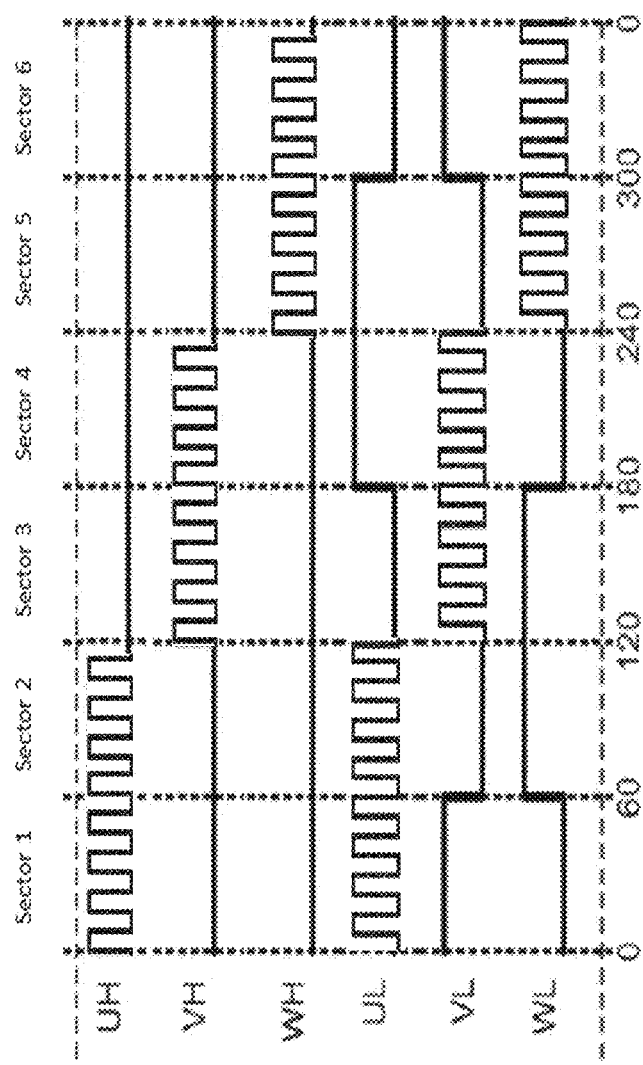
FIG. 41 depicts an exemplary waveform diagram of a pulse-width modulation (PWM) drive sequence using synchronous rectification (also referred to as active freewheeling) within a full 360-degree conduction cycle, according to an embodiment.
Figure 42:
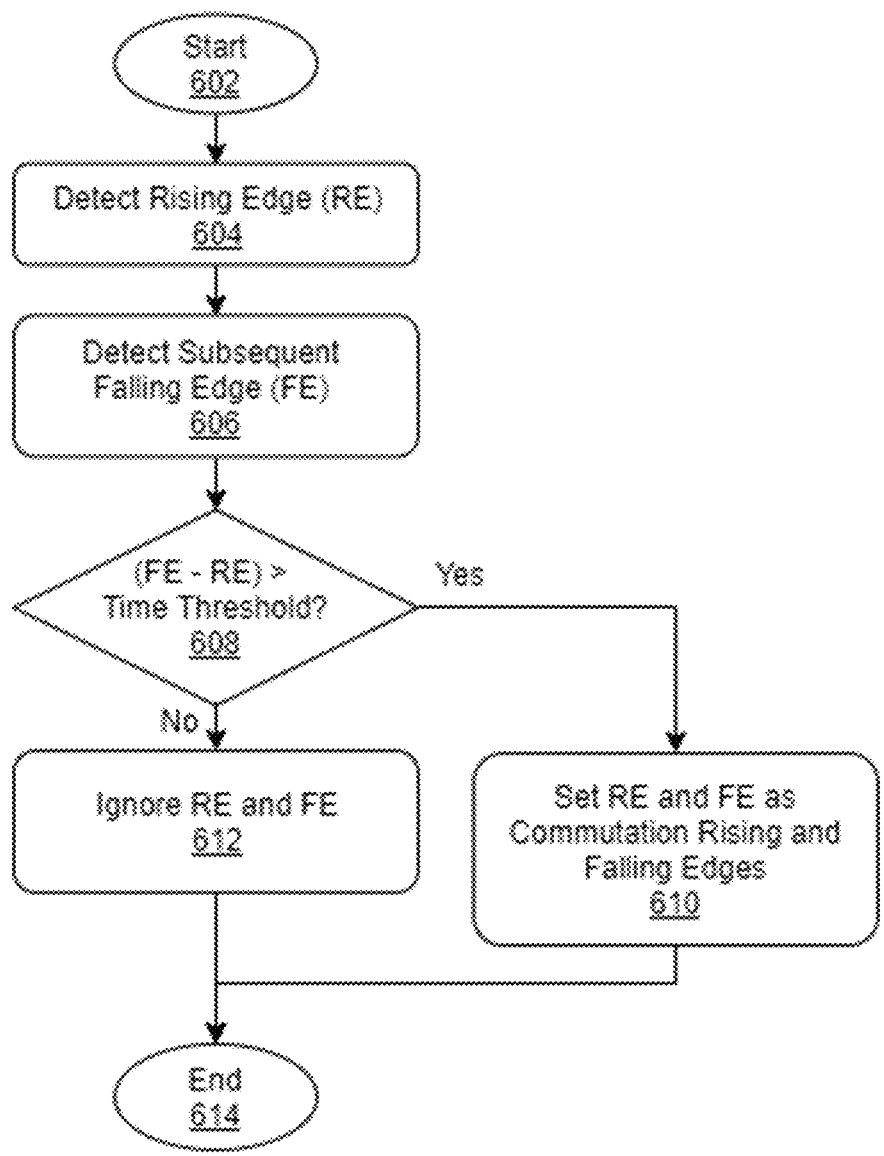
FIG. 42 depicts an exemplary flow diagram for process executed by the secondary controller for proper detection of commutation signal rising and falling edges commutation used for speed and rotation detection when controlling motor commutation with active freewheeling, according to an embodiment.

An alternative embodiment of the invention is described herein with reference to FIGS. 41 and 42, where motor commutation is controlled using synchronous rectification.

FIG. 41 depicts an exemplary waveform diagram of a pulse-width modulation (PWM) drive sequence using synchronous rectification (also referred to as active freewheeling) within a full 360-degree conduction cycle, according to an embodiment. In an embodiment, controller 230 controls power switch circuit 226 to supply trapezoidal voltage waveforms to each phase of the motor 16 by applying pulse-width modulated (PWM) drive signals UH, VH and WH to the high-side power switches. In non-synchronous rectification, the flyback diodes (see FIG. 6) are disposed in parallel to the low-side power switches S1b-S3b to eliminate flyback voltage spikes. Each flyback diode has an internal resistance, which generates a considerable amount of heat. Synchronous rectification reduces the amount of heat generated by each flyback diode by providing an alternative (parallel) current path for freewheeling (flyback) current. Specifically, in synchronous rectification, the low-side power switch corresponding to the actively-driven high-side power switch is also driven using a PWM signal that is mirror opposite to the high-side PWM drive signal. For example, in sectors 1 and 2, controller 230 applies a PWM drive signal to UL that is the mirror opposite of the PWM drive signal that it applies to UH.

As described above with reference to FIGS. 38-40, secondary controller 250 relies on edge transition detection of low-side drive signals VL and UL to detect speed and direction of rotation of the motor. When using synchronous rectification, however, the PWM drive signal exhibits numerous edge transitions within each full rotation of the rotor that should not be relied on for speed and direction measurement.

To overcome this problem, according to an embodiment, secondary controller 250 is configured to compare the detected rising edges of the low-side drive signals VL and UL to their subsequent falling edges and ignore the detected edges if the elapsed time between the rising and falling edges is too small. Since PWM drive signals have very short pulses, a rising edge that is followed too closely by a falling edge is deemed to be part of an active freewheeling PWM drive signal rather than a commutation signal.

FIG. 42 depicts an exemplary flow diagram 600 for process executed by the secondary controller 250 for proper detection of commutation signal rising and falling edges commutation used for speed and rotation detection when controlling motor commutation with active freewheeling, according to an embodiment. In other words process 600 is executed by secondary controller 250 in steps 404 and 504 of flow diagrams 400 (FIG. 39) and 500 (FIG. 40) respectively to determine whether detected rising and falling edges are part of a commutation signal that can be relied on for speed and rotation detection, or are part of an active freewheeling PWM drive signal, according to an embodiment. In an embodiment, in process 600, starting with 602, secondary controller 250 detects monitors a rising edge of either a UL or VL signal within each rotation of the motor at 604. Next, secondary controller 250 waits to detect a subsequent falling edge of the same signal UL or VL at 606. Secondary controller 250 measures the time between the detected rising and falling edges. If the time lapse between the rising and falling edges is greater than a time threshold at 608, secondary controller 250 determines that the detected rising and falling edges are the commutation rising and falling edges needed for speed and rotation direction detection at 610. The detected rising and falling edges are utilizes in processes 400 and 500 described above. Otherwise, at 612, the secondary controller 250 ignores the detected rising and falling edges. The process edges at 614.

In an embodiment, the time threshold is greater than the time it takes to complete a full PWM cycle at any motor speed, but smaller than the time it takes for a full rotor rotation at maximum speed. In an exemplary embodiment, the time threshold is between 20 to 500 microseconds, preferably between 50 to 200 microseconds.

In an embodiment, where controller 230 is configured to electronically brake the motor upon trigger release or upon detection of a fault condition. This is normally done by, for example, simultaneously driving the three low-side power switches to short the motor windings and cause the inductive current of the motor to stop the rotation of the rotor. In the event of a brake, the rising edges of UL, VL and WL occur simultaneously.

Similarly, during motor start-up, controller 230 may execute a bootstrapping algorithm to charge a series of bootstrap capacitors within the gate driver 232 used to drive the high-side power switches. This is also performed by applying pulses to the power switches simultaneously.

To account for braking and bootstrapping, according to an embodiment, secondary controller 250 is configured to ignore simultaneous rising edges or simultaneous falling edges of the low-side gate drive signals. For example, where secondary controller 250 monitors VL and UL signals, it compares the rising edges of VL and UL and ignores them for purposes of speed and direction detection if they are simultaneous or within a time threshold (e.g., several microseconds) of one another.

Figure 43:
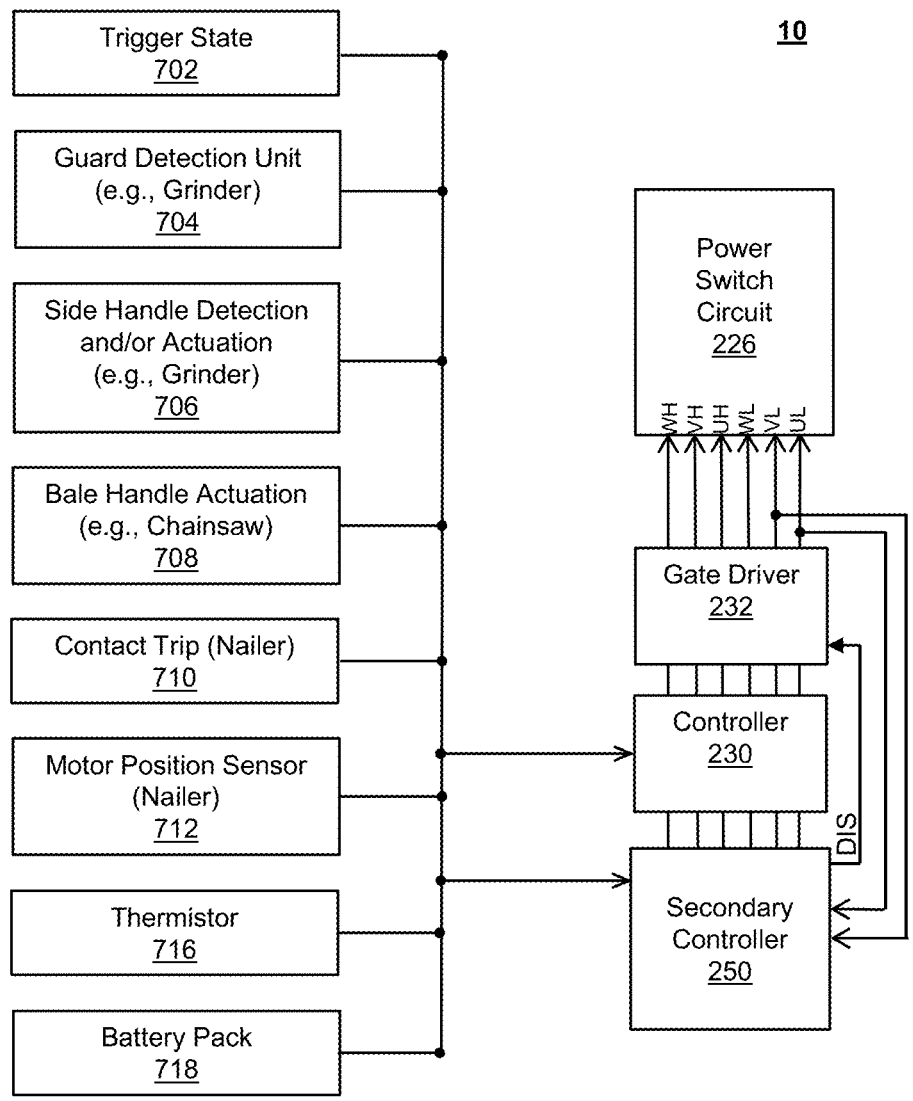
FIG. 43 depicts a partial block circuit diagram of power tool as previously described wherein the secondary controller is utilized as secondary tool fault detection and protection, according to an embodiment.

Another embodiment of the invention is described herein with reference to FIG. 43.

FIG. 43 depicts a partial block circuit diagram of power tool 10 as previously described, of which the power switch circuit 226, gate driver 232, controller 230, and secondary controller 250 are only shown here, according to an embodiment. In this embodiment, secondary controller 250 is utilized as a secondary check against the fault detection and protection provided by the controller 230. This arrangement a single fault tolerance mechanism for power tool 10 to meet regulatory safety standards. Some examples of these secondary safety checks are described herein.

In an embodiment, controller 230 and secondary controller 250 receive a signal from a Trigger State Unit 702, which changes the signal whenever the trigger switch is pressed or released. In an embodiment, the secondary controller 250 makes corrective action if it detects that the motor is being driven (e.g. by detecting that the gate drive signals are being sequentially activated) while the trigger has not been pressed. In an embodiment, secondary controller 250 may be used for self-reset protection by ensuring that controller 230 alone cannot restart the motor, for example due to faulty code or outside electromagnetic interference. In self-reset protection, secondary controller 250 issues start and stop signals based on the signal from the Trigger State Unit 702, and the motor is prevented from being powered unless both controller 230 and secondary controller 250 are in agreement on motor start.

In an embodiment, controller 230 and secondary controller 250 receive a signal from a Guard Detection Unit 704 indicative of whether a safety guard has been detected around the output spindle of a power tool such as a grinder. Some safety standards require that tools such as grinders be prevented from being operated if no safety guard is installed by the user. In an embodiment, the secondary controller 250 makes corrective action if it detects that the motor is being driven while no safety guard has been detected.

In an embodiment, controller 230 and secondary controller 250 receive a signal from a Side Handle Detection and/or Actuation Unit 706 indicative of whether a safety side handle has been attached to a side of a power tool such as a grinder. In a further embodiment, a second signal may be provided indicative of whether the side handle is in fact being gripped by the user. Once again, side handle detection and/or grip detection are safety features that may be desirable if not required for power tools such as grinders. In an embodiment, the secondary controller 250 makes corrective action if it detects that the motor is being driven while no side handle has been detected and/or the side handle is not being gripped by the user.

In an embodiment, controller 230 and secondary controller 250 receive a signal from a Bale Handle Actuation Unit 708 indicative of whether a bale handle is being actuated by a user on a tool such as a chain saw. In an embodiment, the secondary controller 250 makes corrective action if it detects that the motor is being driven while the bale handle is not being actuated by the user.

In an embodiment, in a power tool such as nailer, controller 230 and secondary controller 250 receive a signal from a Contact Trip unit 710. Many nailers require the trigger switch and the contact trip to be actuated in sequence for the tool to operate safely. In an embodiment, the secondary controller 250 can monitor the inputs from the Trigger State Unit 702 and the Contact Trip unit 710 to determine that the trigger switch and the contact trip have been engaged in the correct sequence and take corrective action if the correct sequence has not been followed.

In an embodiment, once again for a power tool such as a nailer, controller 230 and secondary controller 250 receive a signal from a Motor Position Sensor 712. Many nailers require that the motor run for a limited number of revolutions per trigger press. In an embodiment, Motor Position Sensor 712 detects a linear position of the motor. The secondary controller 250 receives this signal and the input from the Trigger State Unit 702 to determine the motor travel distance from the time of the trigger press. In an embodiment, the secondary controller 250 makes corrective action if it detects that the motor has traveled too far relative to the trigger press.

In an embodiment, controller 230 and secondary controller 250 receive other fault signals from the power tool (for example, from a thermistor 716 disposed near the motor, the power electronics, transmission components, etc.) or from a battery pack 718 (e.g., battery under-voltage, over-current, over-temperature, or other fault conditions). In an embodiment, the secondary controller 250 makes corrective action upon receipt of any of these fault conditions.

In an embodiment, as described above, corrective action taken by the secondary controller 250 includes, but is not limited to, disabling the gate driver 232, disabling the controller 230, disabling the power supply regulator 234, or shutting off a switch (not shown) along the current path to the motor. Alternatively, corrective action may entail electronically braking the motor. Electronic braking of the motor is particularly desirable where the motor may take too long to coast due to high inertia of the output accessory and/or where allowing the motor to coast may be too dangerous to the user. In an embodiment, electronic braking by secondary controller 250 may be self-executing, e.g., when secondary controller 250 detects an over-speed or incorrect rotation condition or based on tool or battery pack fault conditions examples of which were described above.

Figure 44:
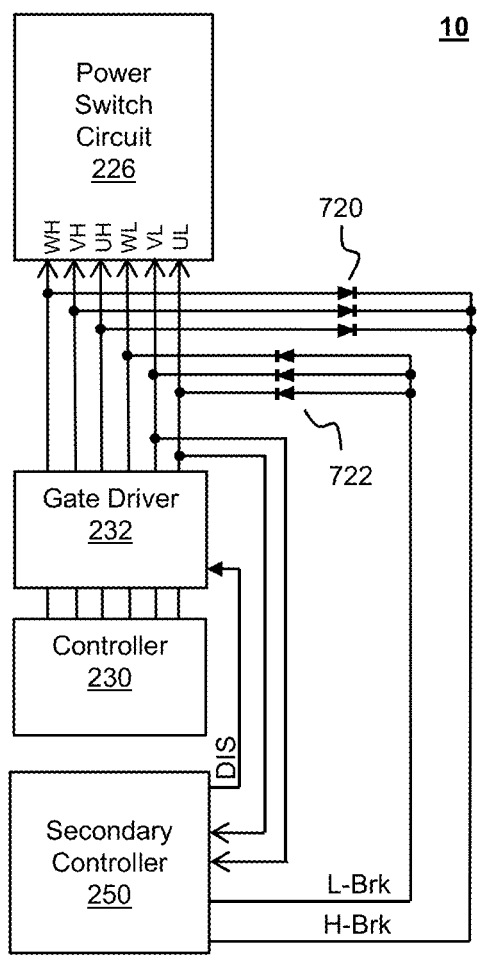
FIG. 44 depicts a partial block circuit diagram of power tool as previously described wherein the secondary controller is provided with override of drive and braking control, according to an embodiment.

FIG. 44 depicts a partial block circuit diagram of power tool 10 as previously described, of which the power switch circuit 226, gate driver 232, controller 230, and secondary controller 250 are only shown here. FIG. 44 further illustrates the secondary controller 250 being configured to override the drive signals to the power switch circuit 226 to electronically brake the motor 16, according to an embodiment. In an embodiment, secondary controller 250 outputs two signals H-Brk and L-Brk. H-Brk is coupled to the high-side drive signals UH, VH and WH via diodes 720. L-Brk is coupled to the low-side drive signals UL, VL and WL via diodes 722. In an embodiment, controller 230 electronically braking the motor 16 by turning off the high-side power switches (i.e., by grounding the gate drive signals UH, VH and WH) and simultaneously turning on the low-side power switches (i.e., by activating the gate drive signals UL, VL and WL) to short the motor windings. This allow the inductive current of the motor to magnetically stop the rotation of the rotor. As a secondary check against software or hardware failure of controller 230, secondary controller 250 also electronically brakes the motor by grounding the H-Brk signal and driving the L-Brk signal to ensure that the high-side power switches are simultaneously turned off and the low-side power switches are simultaneously turned on.

In an embodiment, secondary controller 250 may be configured to execute soft-braking by applying a pulse-width modulated (PWM) signal to the L-Brk signal. The duty cycle of the PWM signal controls the soft-braking force applied to the motor and accordingly the amount of time it takes for the motor to come to a stop. In an embodiment, secondary controller 250 may be configured to apply various braking profiles, examples of which are disclosed in US Patent Publication No. 2017/0234484, which is incorporated herein by reference in its entirety.

In an embodiment, secondary controller 250 may output six signals individually coupled to UH, VH, WH, UL, VL and WL drive signals. This arrangement would require more output pins from the secondary controller 250 chip, but dispose of diodes 720 and 722. In yet another embodiment, a logic block may be utilized (including, for example, AND logic for the high-side drive signals and OR logic for low-side drive signals) that receives drive signals from controller 230 and secondary controller 250 and concurrently drives the gate signals.

Referring once again to FIG. 33, in an embodiment, in addition to sensing the three lower gate drive signals, secondary controller 250 may also sense the ON/OFF status of the power tool based on, for example, the position of the power switch 236 of FIG. 33, or based on a signal from the power tool trigger switch. In an embodiment, secondary controller 250 may be configured to prevent dangerous self-restart by controller 230. Dangerous restart of a power tool takes place when a tool is coupled to a power source while the tool switch or trigger is in an ON position. In an embodiment, if controller 230 takes a corrective action resulting in all low-side drive signals simultaneously inactive—for example, by allowing the motor to coast—while the power switch 236 is still ON, the secondary controller 250 will assert its corrective action and will continue to disable supply of power to the motor 16 unless it senses power switch 236 change to OFF, and then to ON again. Similarly, in a system where controller 230 and/or secondary controller 250 are configured to electronically brake the motor 16 by simultaneously activating the low-side drive signals, when secondary controller 250 senses that the three low-side drive signals are simultaneously activated with the power switch in the ON position, it will assert its corrective action and will continue to disable supply of power to the motor 16 unless it senses power switch 236 change to OFF, and then to ON again. These actions by the secondary controller 250 prevent the motor 16 from restarting, after a corrective action, so long as the power tool trigger or power switch remains ON, even if the condition responsible for the corrective action has passed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A power tool comprising:
   a brushless motor having a stator defining a plurality of phases, a rotor rotatable relative to the stator, and a plurality of power terminals electrically connected to the plurality of phases;
   a power unit having a plurality of power switches connected electrically between a power source and the plurality of motor terminals and operable to deliver power to the motor; and
   a control unit interfaced with the power unit to output a drive signal to one or more of the plurality of motor switches to drive the plurality of phases of the motor over a plurality of sectors of the rotor rotation, the control unit being configured to detect an initial position of the rotor, commutate the motor beginning at the initial position of the rotor using a low-speed motor commutation scheme until an output speed of the rotor exceeds a speed threshold, and commutate the motor based on a back-electromotive force (back-EMF) voltage of the motor after the output speed of the rotor exceeds the speed threshold,
   wherein in the low-speed commutation scheme, the control unit applies a first plurality of voltage pulses to a present sector of the plurality of sectors and a second plurality of voltage pulses to a next sector of the plurality of sectors, and detects a transition of the rotor from the present sector to the next sector based on motor current measurements associated with the first plurality of voltage pulses and the second plurality of voltage pulses, wherein the control unit is configured to compare slopes of the motor current measurements and detect the transition of the rotor from the present sector to the next sector when the current measurement associated with one of the first plurality of voltage pulses has a larger slope than the current measurement associated with a corresponding one of the second plurality of voltage pulses.

2. The power tool of claim 1, wherein the control unit is configured to measure the time it takes for each of the motor current measurements associated with the first and second pluralities of voltage pulses to reach a preset threshold, and compares the time measurements to detect the transition from the present sector to the next sector.

3. The power tool of claim 1, wherein the control unit is configured to transition commutation from the present sector to a previous sector of the plurality of sectors by applying a third plurality of voltage pulses to the previous sector, measuring motor currents associated with the first and third plurality of voltage pulses, and comparing corresponding motor current measurements to detect a transition of the rotor from the present sector to the previous sector.

4. The power tool of claim 3, wherein the control unit is configured to detect an incorrect rotation of the motor when it detects the transition of the rotor from the present sector to the previous sector.

5. The power tool of claim 1, wherein the control unit is configured to calculate the output speed of the motor based on frequency of commutation transitions of the rotor from the present sector to the next sector.

6. The power tool of claim 1, wherein, after the output speed of the rotor exceeds the speed threshold, the control unit is configured to measure the back-electromotive force (back-EMF) voltage of the motor on an open phase of the plurality of motor terminals and transition commutation from the present sector to the next sector in relation to the back-EMF voltage.

7. The power tool of claim 1, wherein the motor has a speed range of zero to at least 18,000 rotations-per-minute.

8. The power tool of claim 1, wherein the control unit is configured to set a conduction band to a baseline value that is greater than 120 degrees, the conduction band corresponding to an angle within which one of the plurality of phases of the motor is commutated, and
   wherein, after the output speed of the rotor exceeds the speed threshold, the control unit is configured to set at least one commutation transition point as a function of the set conduction band, and within each sector of the plurality of sectors of the rotor rotation, monitor an open-phase voltage of the motor to detect the back electromotive force (back-EMF) voltage of the motor and control commutation of at least one phase based on the open-phase voltage of the motor in relation to the at least one commutation transition point.

9. The power tool of claim 8, wherein the at least one commutation transition point includes a first transition point associated with a leading edge of a commutation cycle of the at least one phase and a second transition point associated with a trailing edge of a commutation cycle of the at least one phase.

10. The power tool of claim 9, wherein the first transition point is a voltage threshold set as a fraction of a maximum open-phase voltage, and the control unit starts the commutation cycle when the open-phase voltage exceeds the voltage threshold.

11. The power tool of claim 1, wherein the control unit is configured to set a conduction band and an advance angle, the conduction band corresponding to an angle within which one of the plurality of phases of the motor is commutated, and the advance angle corresponding to an angle by which the conduction band is shifted relative to the corresponding phase, and
    wherein, after the output speed of the rotor exceeds the speed threshold, the control unit is configured to set at least one commutation transition point as a function of the set advance angle, and within each sector of the plurality of sectors of the rotor rotation, monitor an open-phase voltage of the motor to detect the back electromotive force (back-EMF) voltage of the motor and control commutation of at least one phase based on the open-phase voltage of the motor in relation to the at least one commutation transition point.

12. The power tool of claim 11, wherein the at least one commutation transition point includes a first transition point associated with a leading edge of a commutation cycle of the at least one phase and a second transition point associated with a trailing edge of a commutation cycle of the at least one phase.

13. The power tool of claim 12, wherein the first transition point is a voltage threshold set as a fraction of a maximum open-phase voltage, and the control unit starts the commutation cycle when the open-phase voltage exceeds the voltage threshold.

14. A power tool comprising:
    a brushless motor having a stator defining a plurality of phases, a rotor rotatable relative to the stator, and a plurality of power terminals electrically connected to the plurality of phases;
    a power unit having a plurality of power switches connected electrically between a power source and the plurality of motor terminals and operable to deliver power to the motor; and
    a control unit interfaced with the power unit to output a drive signal to one or more of the plurality of motor switches to drive the plurality of phases of the motor over a plurality of sectors of the rotor rotation, the control unit being configured to detect an initial position of the rotor, commutate the motor beginning at the initial position of the rotor using a low-speed motor commutation scheme until an output speed of the rotor exceeds a speed threshold, and commutate the motor based on a back-electromotive force (back-EMF) voltage of the motor after the output speed of the rotor exceeds the speed threshold,
    wherein in the low-speed commutation scheme, the control unit applies a first plurality of voltage pulses to a present sector of the plurality of sectors and a second plurality of voltage pulses to a next sector of the plurality of sectors, and detects a transition of the rotor from the present sector to the next sector based on motor current measurements associated with the first plurality of voltage pulses and the second plurality of voltage pulses, wherein the first plurality of voltage pulses and the second plurality of voltage pulses have the same pulse widths, the control unit being configured to compare amplitudes of motor current measurements and detect the transition from the present sector to the next sector when the current measurement associated with one of the first plurality of voltage pulses has a larger amplitude than the current measurement associated with a corresponding one of the second plurality of voltage pulses.

* * * * *